(12) United States Patent
Takano

(10) Patent No.: US 10,517,086 B2
(45) Date of Patent: Dec. 24, 2019

(54) DEVICE AND ASSOCIATED METHODOLOGY FOR MANAGEMENT OF RESOURCE POOLS OF RESOURCES USED IN DEVICE-TO-DEVICE COMMUNICATIONS

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/966,871

(22) Filed: Apr. 30, 2018

(65) Prior Publication Data
US 2018/0255535 A1 Sep. 6, 2018

Related U.S. Application Data

(63) Continuation of application No. 15/116,835, filed as application No. PCT/JP2015/003566 on Jul. 14, 2015, now Pat. No. 10,021,678.

(30) Foreign Application Priority Data

Jul. 30, 2014 (JP) .................................. 2014-154714

(51) Int. Cl.
*H04W 72/04* (2009.01)
*H04W 76/14* (2018.01)
(Continued)

(52) U.S. Cl.
CPC ......... *H04W 72/042* (2013.01); *H04W 8/005* (2013.01); *H04W 56/001* (2013.01); *H04W 72/10* (2013.01); *H04W 76/14* (2018.02)

(58) Field of Classification Search
CPC . H04W 72/042; H04W 72/10; H04W 76/023; H04W 8/005; H04W 56/001
See application file for complete search history.

(56) References Cited

U.S. PATENT DOCUMENTS 9,622,282 B2 4/2017 Takano
2013/0225184 A1 8/2013 Liu et al.
(Continued)

FOREIGN PATENT DOCUMENTS

JP 2017-523666 A 8/2017
WO 2012/159270 11/2012
(Continued)

OTHER PUBLICATIONS

"3GPP TR 36.843 V12.0.0; 3rd Generation Partnership Project; Technical Specification Group Radio Access Network; Study on LTE device to device proximity services; Radio aspects (Release 12)," 2014, 49 pages.
(Continued)

*Primary Examiner* — Gary Mui
(74) *Attorney, Agent, or Firm* — Xsensus LLP

(57) ABSTRACT

The present application relates to a device including circuitry configured to acquire information indicating one or more resource pools serving as radio resources available for device-to-device communication, and notify a terminal device of the one or more resource pools. The one or more resource pools are resource pools that are selected from among a resource pool set including multiple resource pools, and the multiple resource pools are determined in advance as candidates for radio resources available for device-to-device communication.

20 Claims, 35 Drawing Sheets

(51) Int. Cl.
*H04W 8/00* (2009.01)
*H04W 56/00* (2009.01)
*H04W 72/10* (2009.01)

(56) References Cited

U.S. PATENT DOCUMENTS

| | | |
|---|---|---|
| 2015/0071207 A1 | 3/2015 | Seo et al. |
| 2015/0215903 A1* | 7/2015 | Zhao ............... H04W 72/04 370/329 |
| 2015/0223204 A1 | 8/2015 | Cao |
| 2015/0230226 A1 | 8/2015 | Yoshizawa |
| 2015/0271720 A1 | 9/2015 | Yamada |
| 2015/0382324 A1 | 12/2015 | Sheng |
| 2016/0095131 A1 | 3/2016 | Seo |
| 2016/0174175 A1* | 6/2016 | Adachi ............... H04W 76/10 370/350 |
| 2016/0302252 A1 | 10/2016 | Wang |
| 2016/0323869 A1 | 11/2016 | Xu |
| 2016/0345307 A1 | 11/2016 | Huang |
| 2016/0345337 A1 | 11/2016 | Seo |
| 2016/0353499 A1 | 12/2016 | Takano |
| 2017/0064704 A1* | 3/2017 | Seo ............... H04W 72/02 |

FOREIGN PATENT DOCUMENTS

| | | |
|---|---|---|
| WO | 2013/157870 A1 | 10/2013 |
| WO | 2014/087720 A1 | 6/2014 |

OTHER PUBLICATIONS

International Search Report dated Jan. 7, 2016 in PCT/JP2015/003566 filed Jul. 14, 2015.

Office Action dated Dec. 5, 2017 in corresponding Japanese Patent Application No. 2014-154714, 4 pages.

Search Report and Written Opinion dated Jan. 25, 2018 in Singapore Patent Application No. 11201606340W, 10 pages.

ZTE Corporation, "Resource pools for D2D communication", 3GPP TSG-RAN WG2 Meeting #85bis, R2-141483, Mar. 31-Apr. 4, 2014, 5 pages.

InterDigital Communications, "Mode Selection and Resource Pool Selection for D2D UEs", 3GPP TSG-RAN WG2 #85bis, Tdoc R2-141695, Mar. 31-Apr. 4, 2014, 5 pages.

CATT, "D2D Communication Resource Allocation Mode 2", 3GPP TSG-RAN WG2 Meeting #85bis, R2-141196, Mar. 31-Apr. 4, 2014, 3 pages.

Qualcomm Incorporated, "Work item proposal on LTE Device to Device Proximity Services", 3GPP TSG RAN Meeting #63, RP-140518, Mar. 3-6, 2014, 7 pages.

ZTE, "D2D communication resource mode configuration", 3GPP TSG-RAN WG2 Meeting #86, R2-142146, May 19-23, 2014, 5 pages.

Sharp, "Aspects of resource pool configuration for D2D communication", 3GPP TSG RAN WG2 Meeting #86, R2-142141, May 19-23, 2014, 3 pages.

European Office Action dated Jul. 24, 2018 in European Application No. 15747849.6-1215.

CATT: "Design of D2DSS and PD2DSCH", 3GPP Draft; R1-142007, 3rd Generation Partnership Project (3GPP), Mobile Competence Centre ; 650, Route Des Lucioles ; F-06921 Sophia-Antipolis Cedex ; France, vol. RAN WG1, No. Seoul, Korea; May 19, 2014-May 23, 2014 May 18, 2014 (May 18, 2014), XP050787604, Retrieved from the Internet: URL:http://www.3gpp.org/ftp/ Meetings_3GPP _SYNC/RAN1/Docs/ [retrieved on May 18, 2014].

European Communication pursuant to Article 94(3) EPC dated Jan. 29, 2019, issued in corresponding European Patent Application No. 15747849.6.

ZTE, "On Efficient SA Resource Monitoring", 3GPP TSG-RAN2#86, R2-142148, May 19-23, 2014.

Samsung, "Mode 2 Resource Allocation for D2D Broadcast Communication", 3GPP TSG RAN WG1 Meeting #76bis, R1-141306, Mar. 31-Apr. 4, 2014.

NTT Docomo, Inc., "Discussion on Inter-Cell and Inter-Carrier D2D", TSG RAN WG1 Meeting #77, R1-142270, May 19-23, 2014.

Qualcomm Incorporated, "Signaling Details for ProSe Direct Discovery", 3GPP TSG-RAN WG2#86, R2-142540, May 19-23, 2014.

* cited by examiner

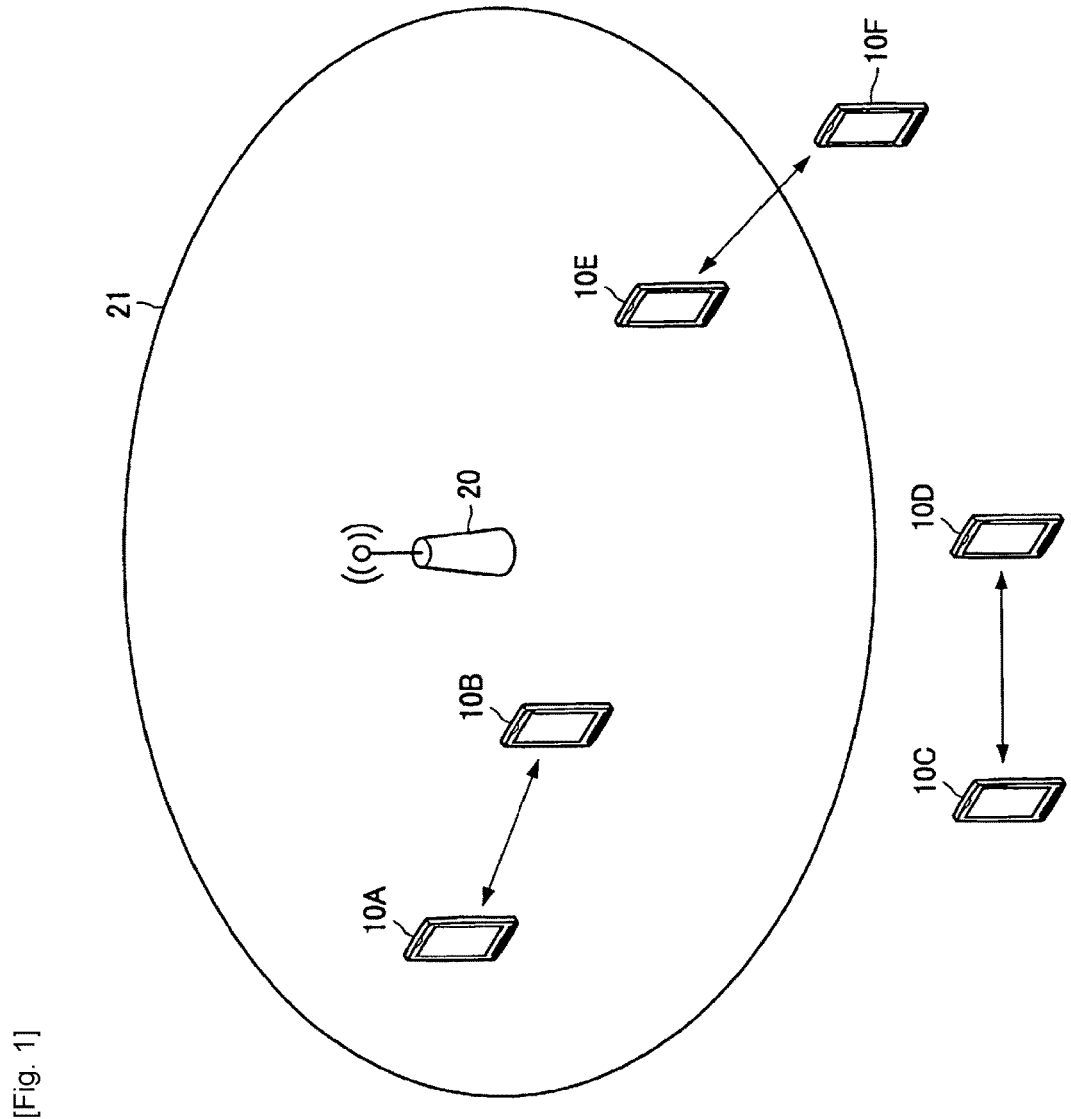
[Fig. 1]

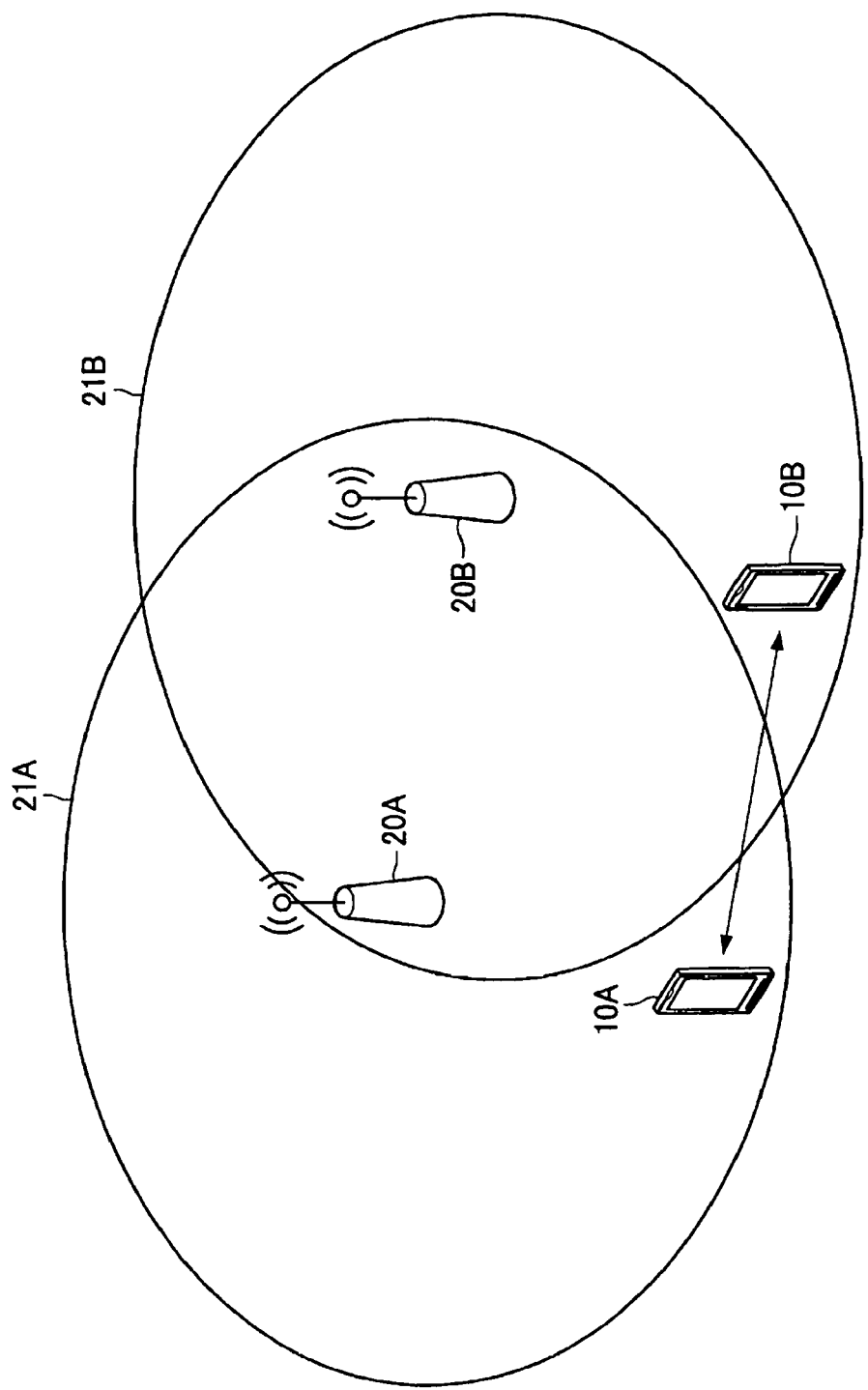
[Fig. 2]

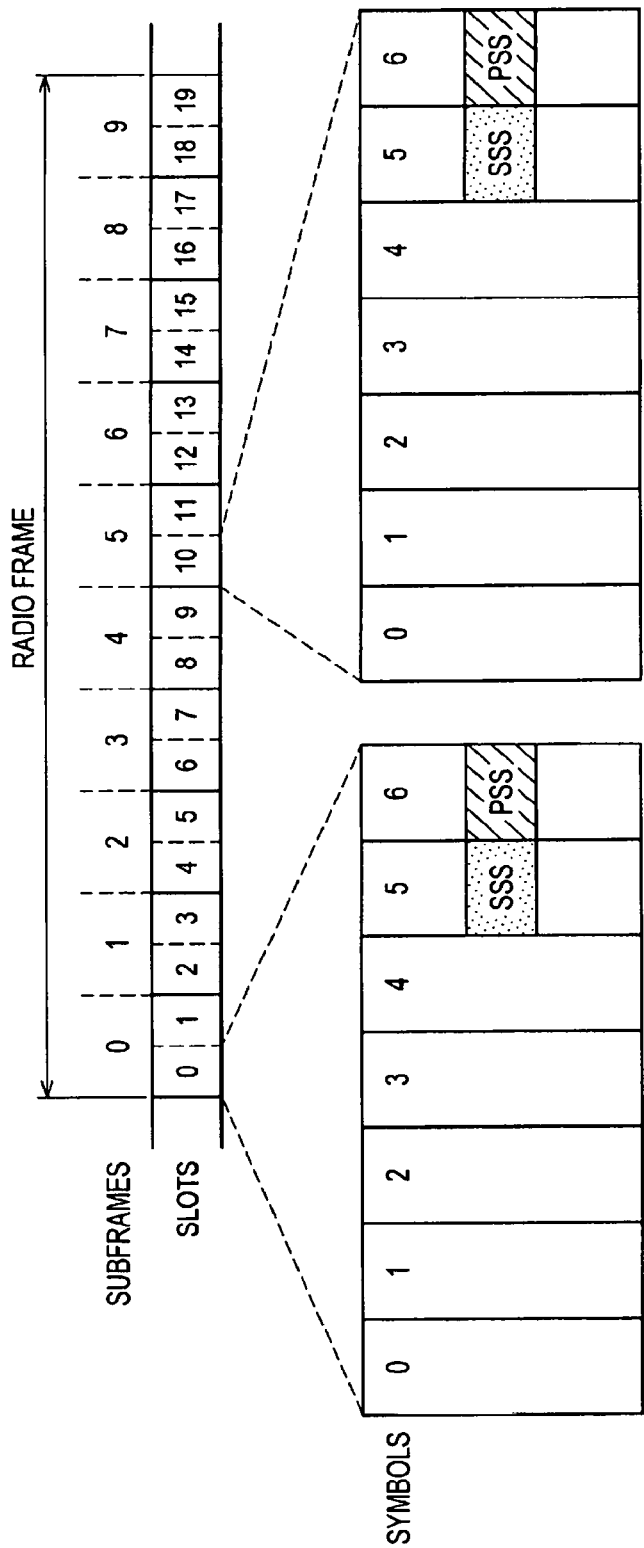
[Fig. 3]

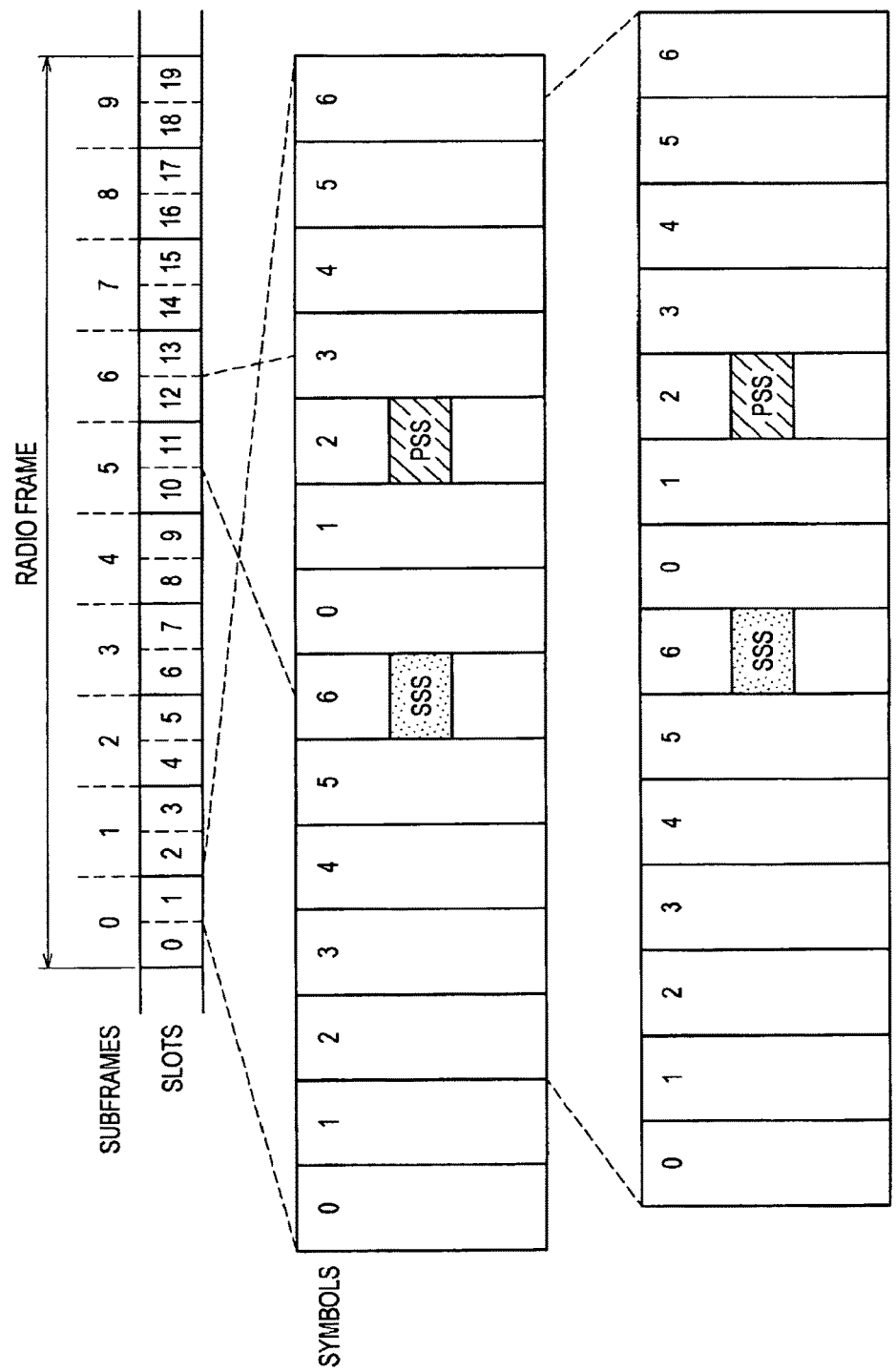
[Fig. 4]

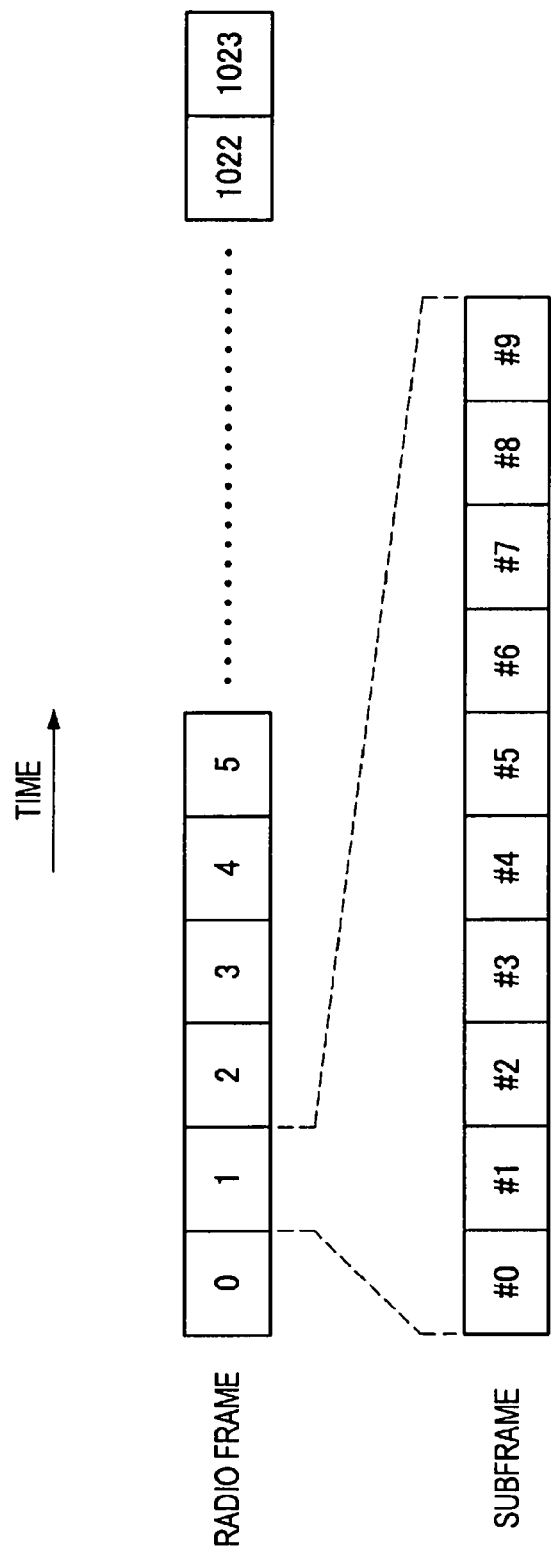
[Fig. 5]

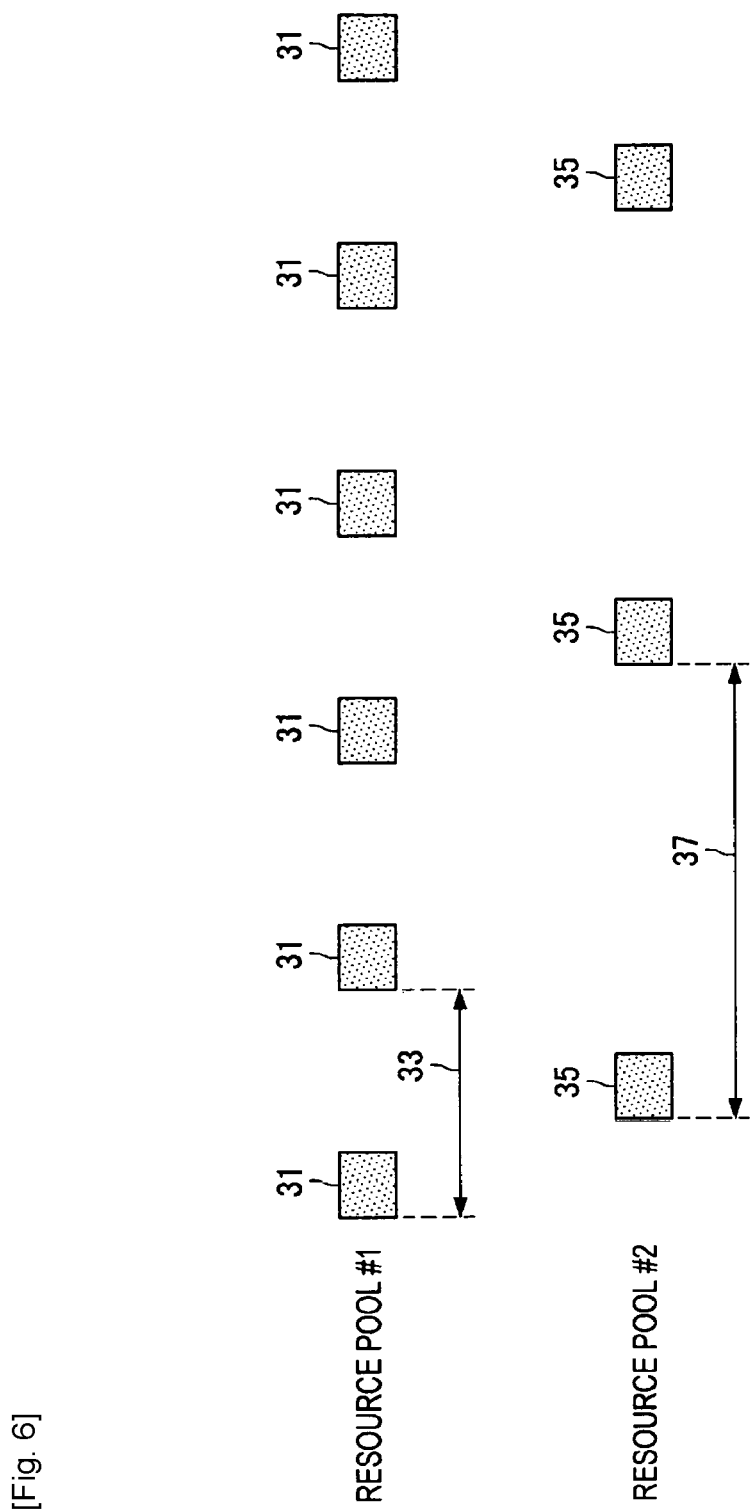

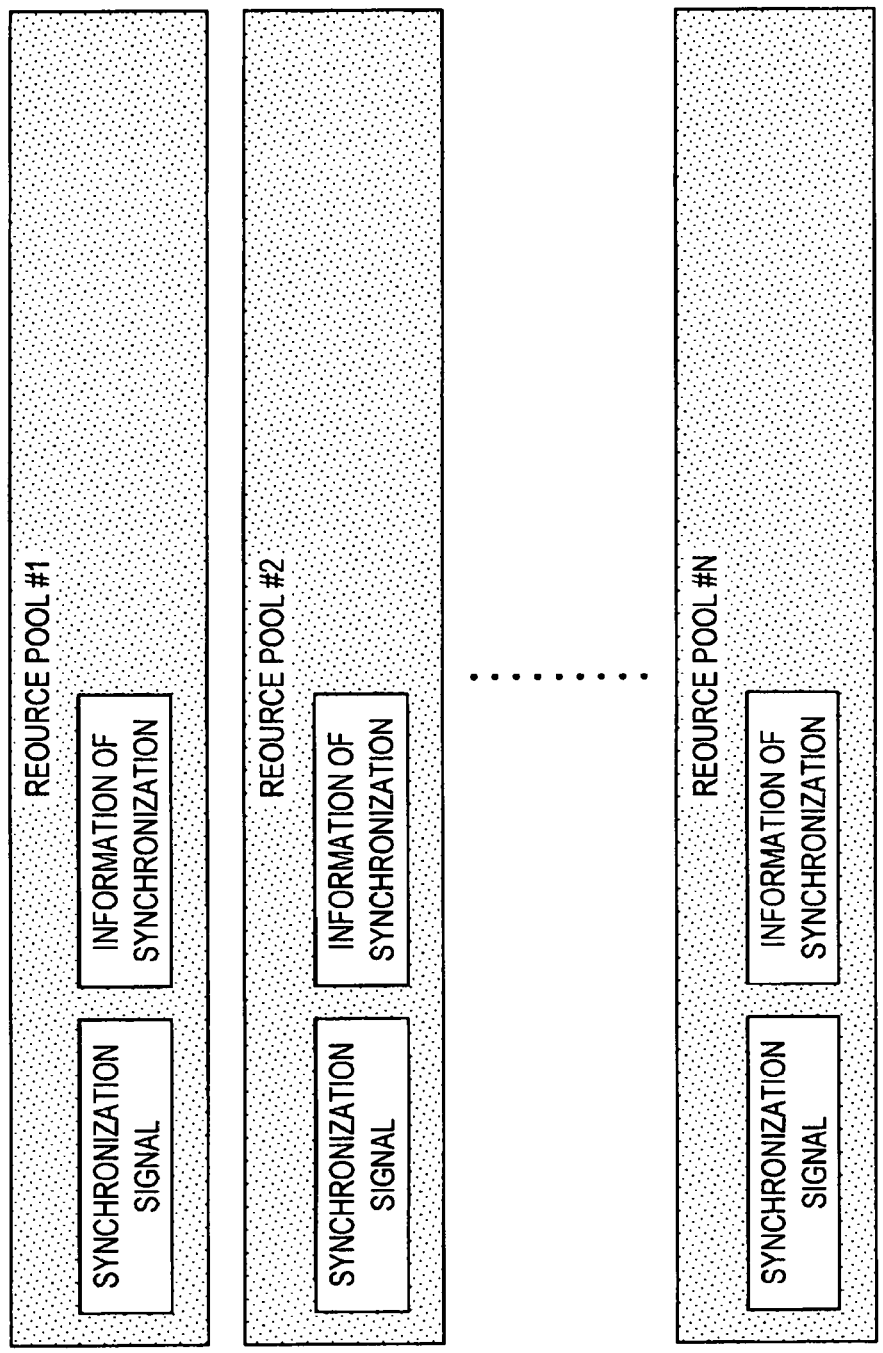
[Fig. 7]

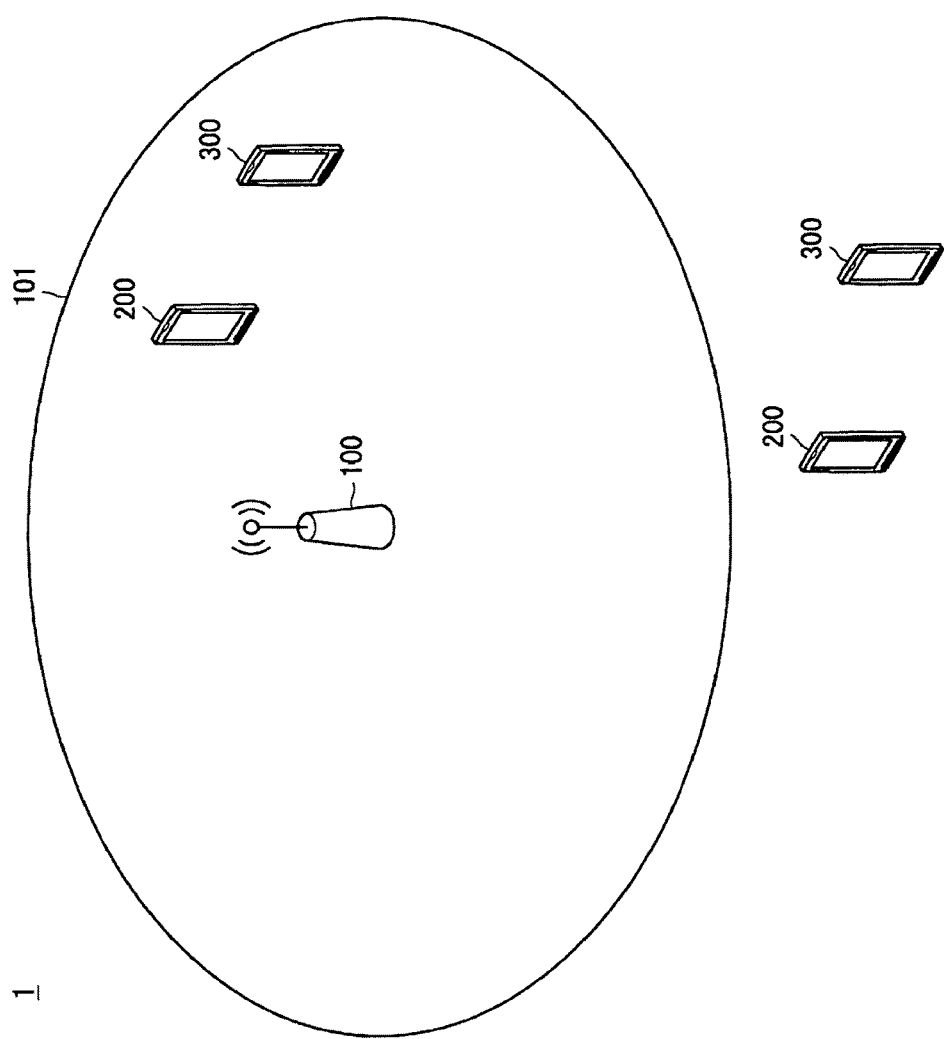
[Fig. 8]

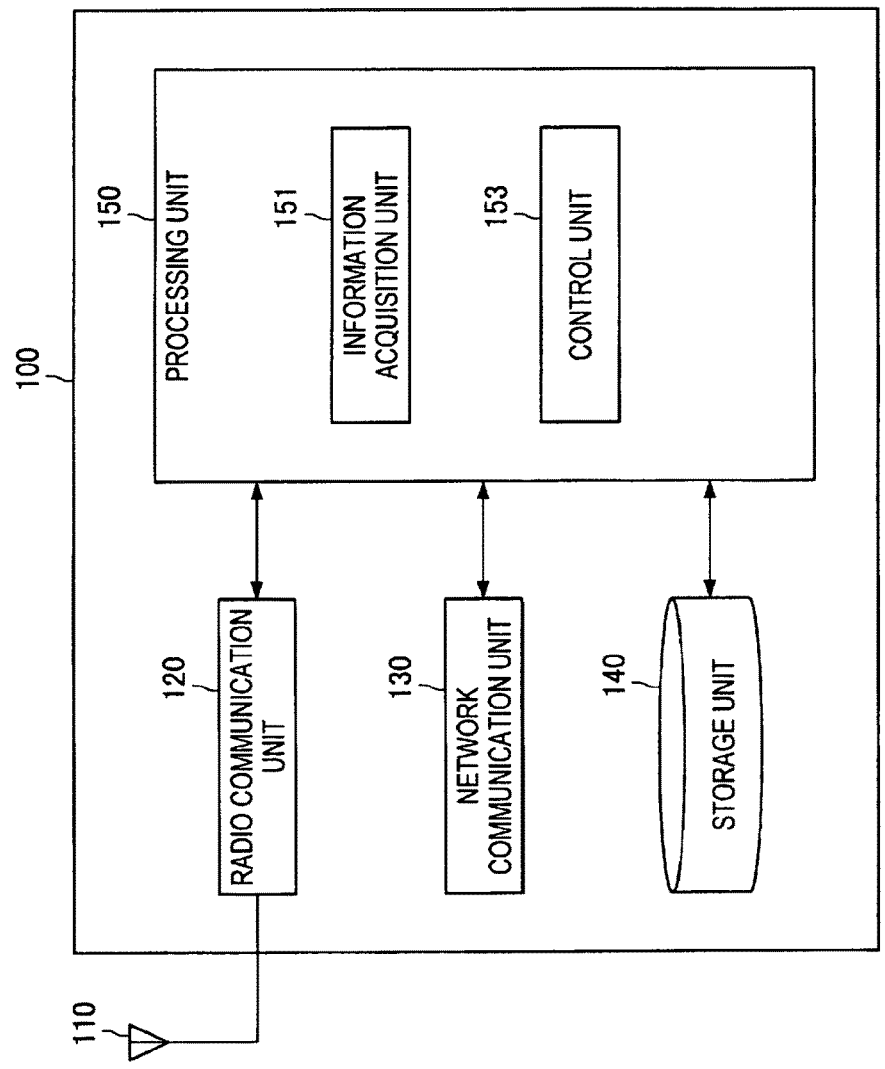
[Fig. 9]

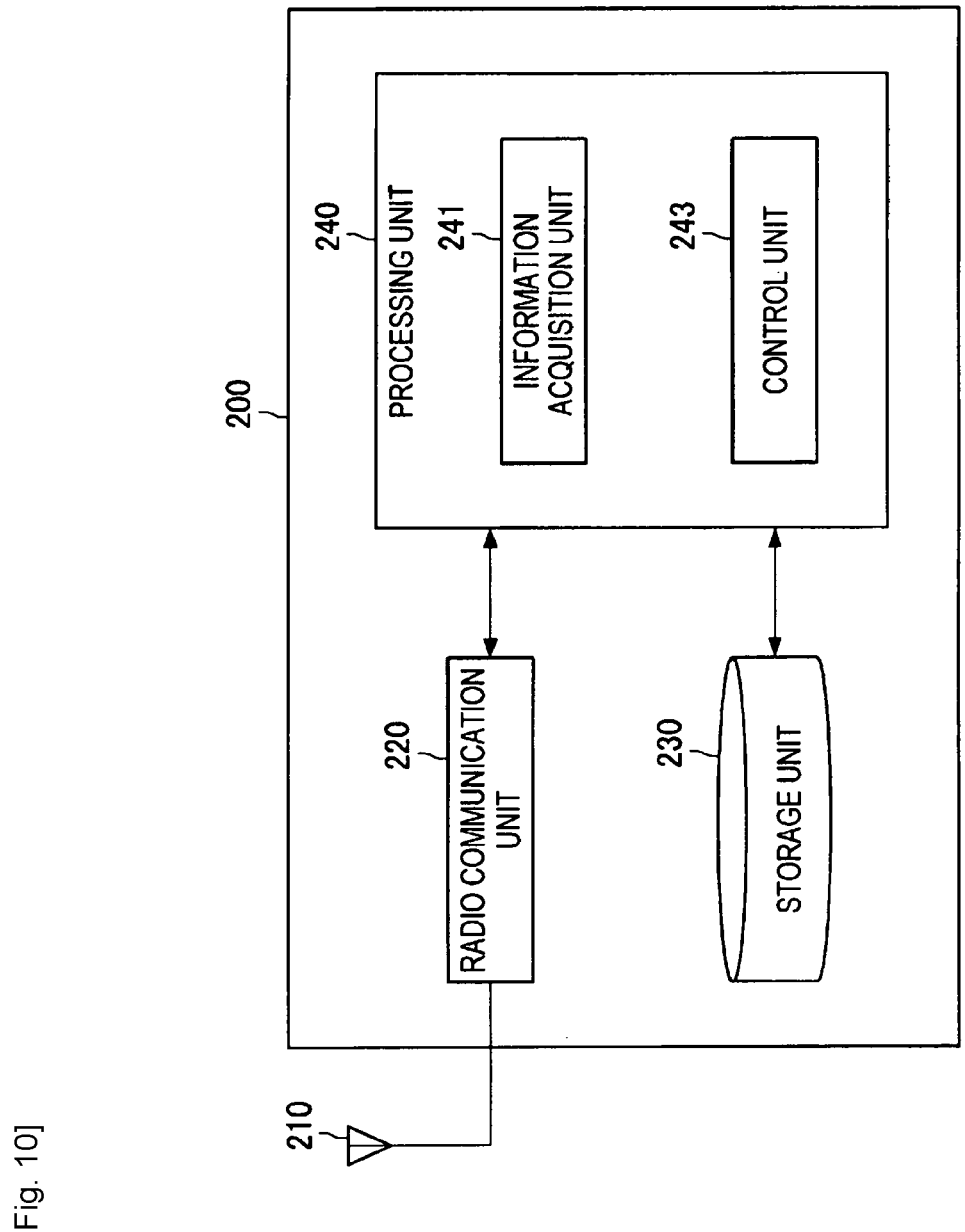
[Fig. 10]

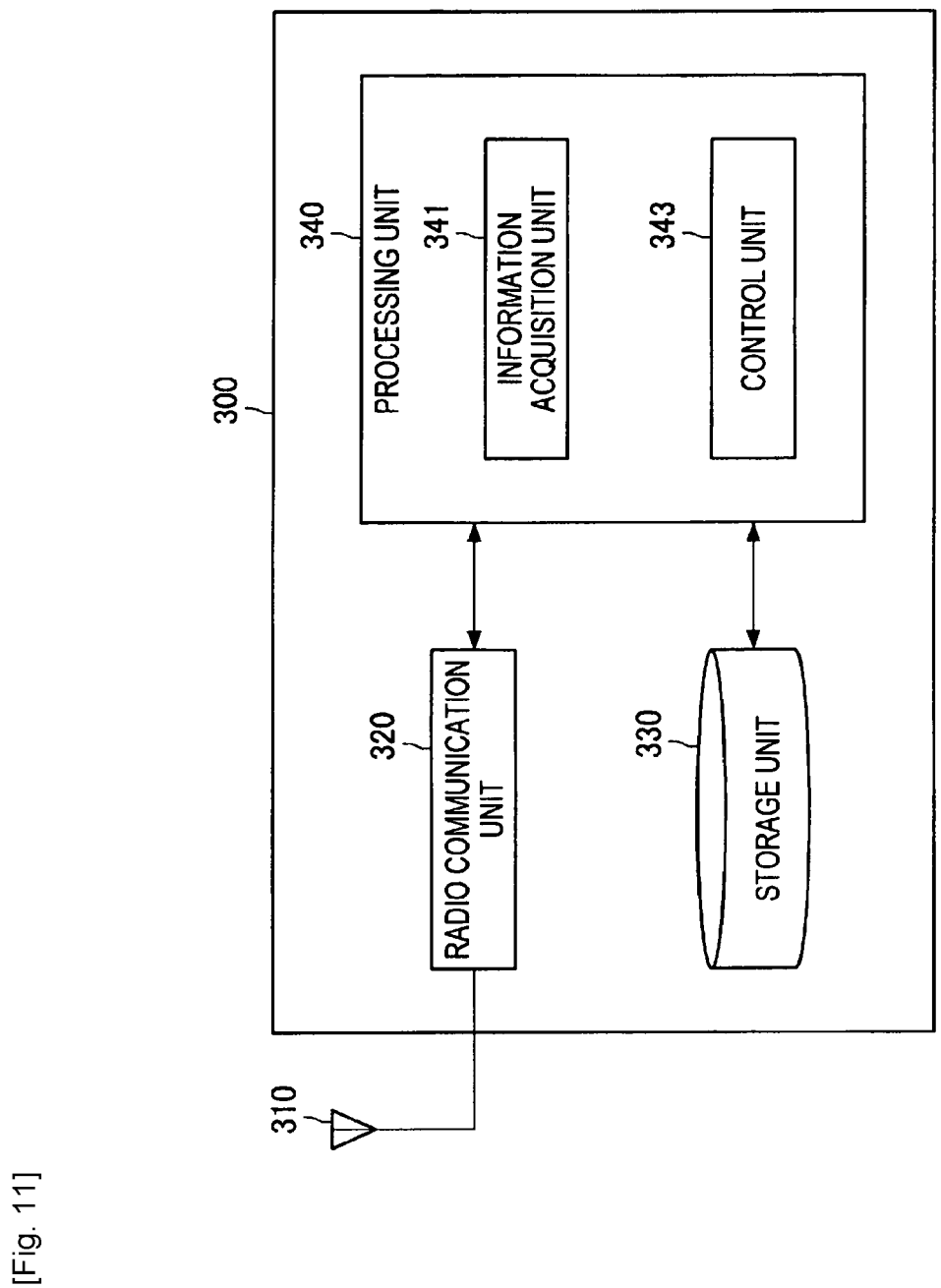
[Fig. 11]

[Fig. 12]

| ID | RADIO FRAME | | SUBFRAME | DEFAULT |
| --- | --- | --- | --- | --- |
| | PERIOD (RF) | OFFSET (RF) | | |
| #1 | 20 | 0 | #2 | DEFAULT |
| #2 | 40 | 10 | #2 | |
| #3 | 10 | 2 | #2, #3 | |
| ... | ... | ... | ... | |
| #N | X RF | Y RF | #Z | |

[Fig. 13]
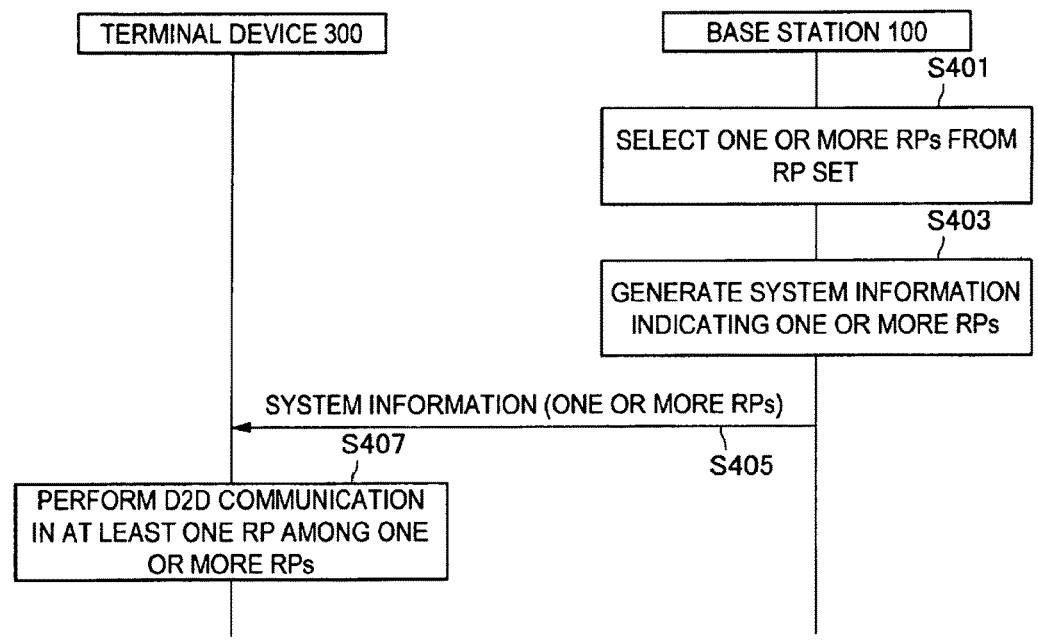

[Fig. 14]
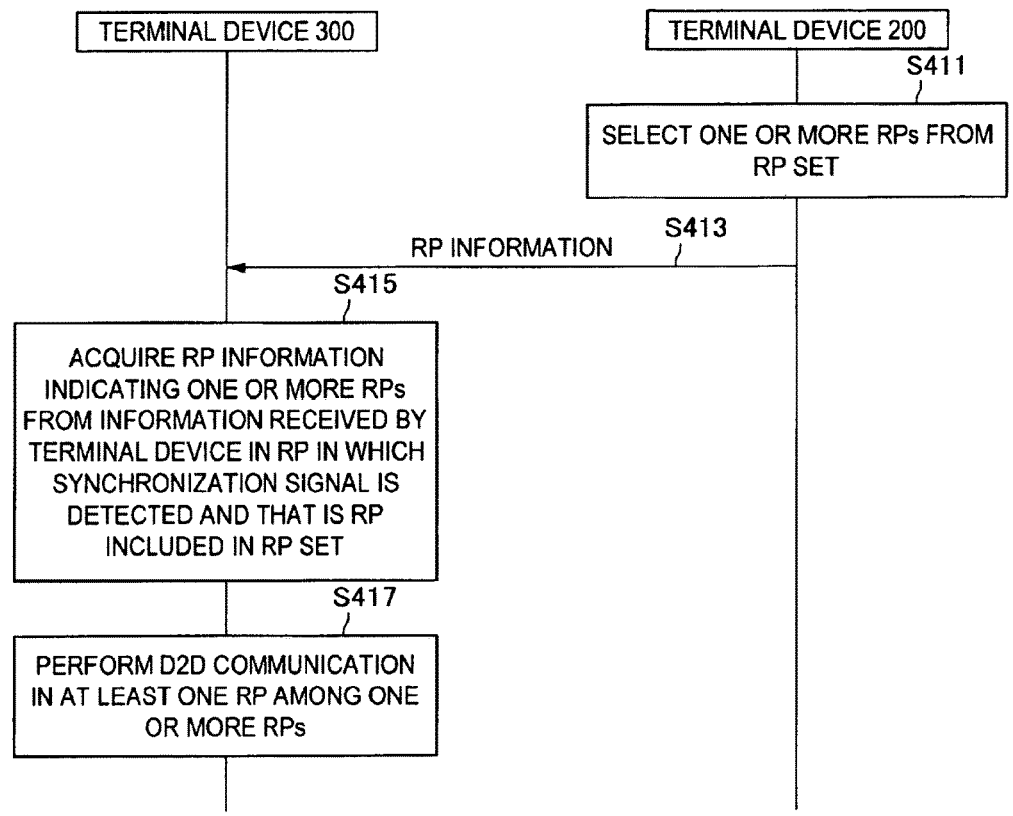

[Fig. 15]
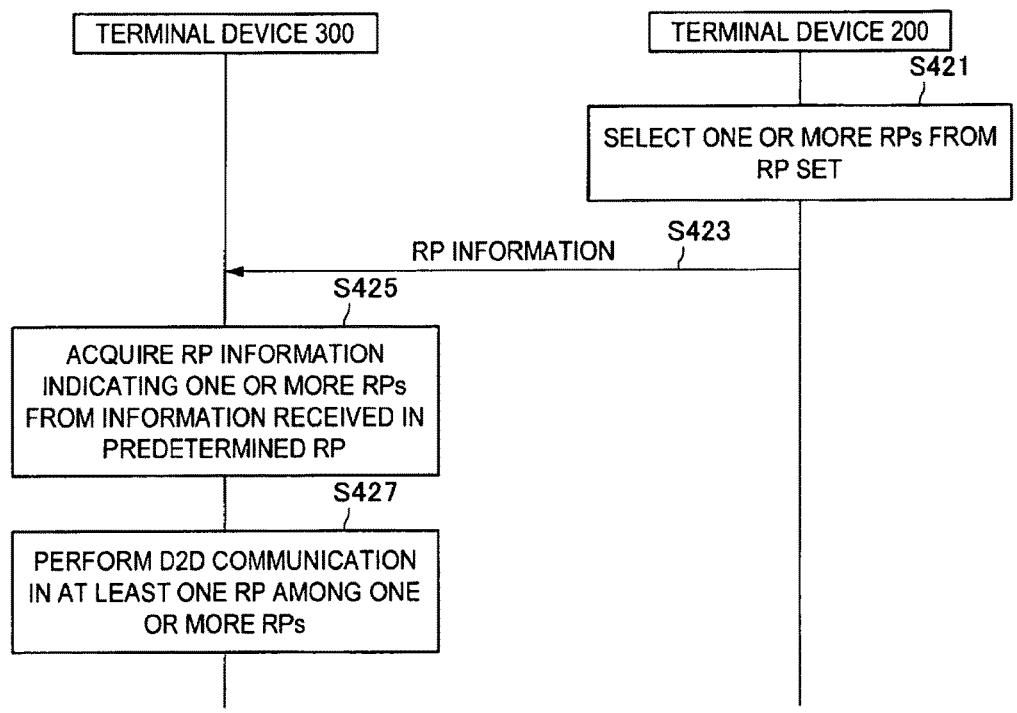

[Fig. 16]
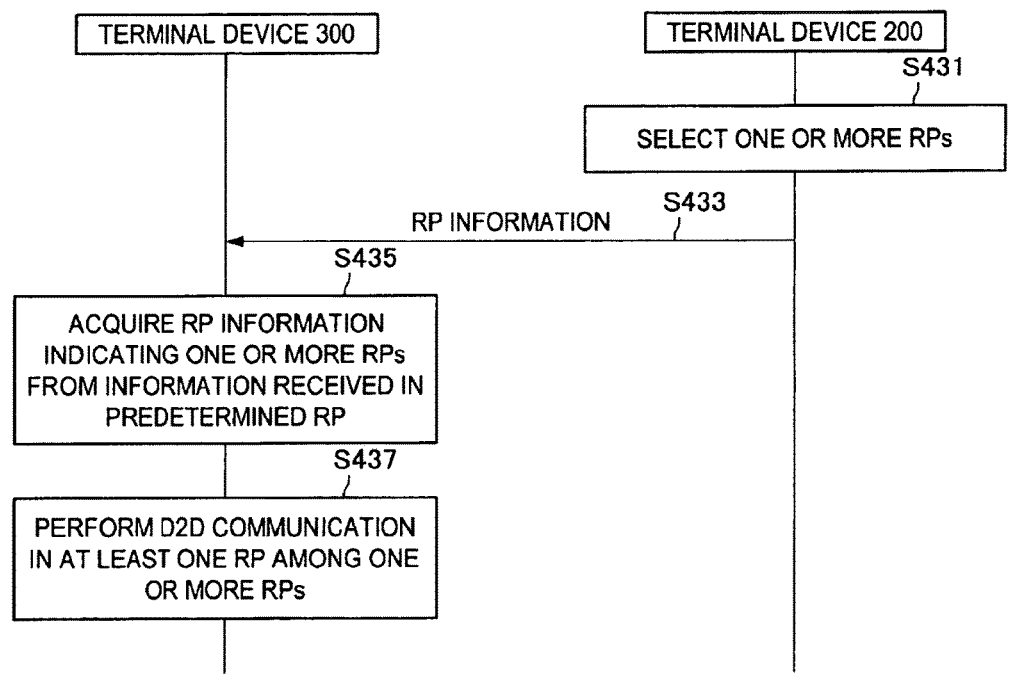

[Fig. 17]
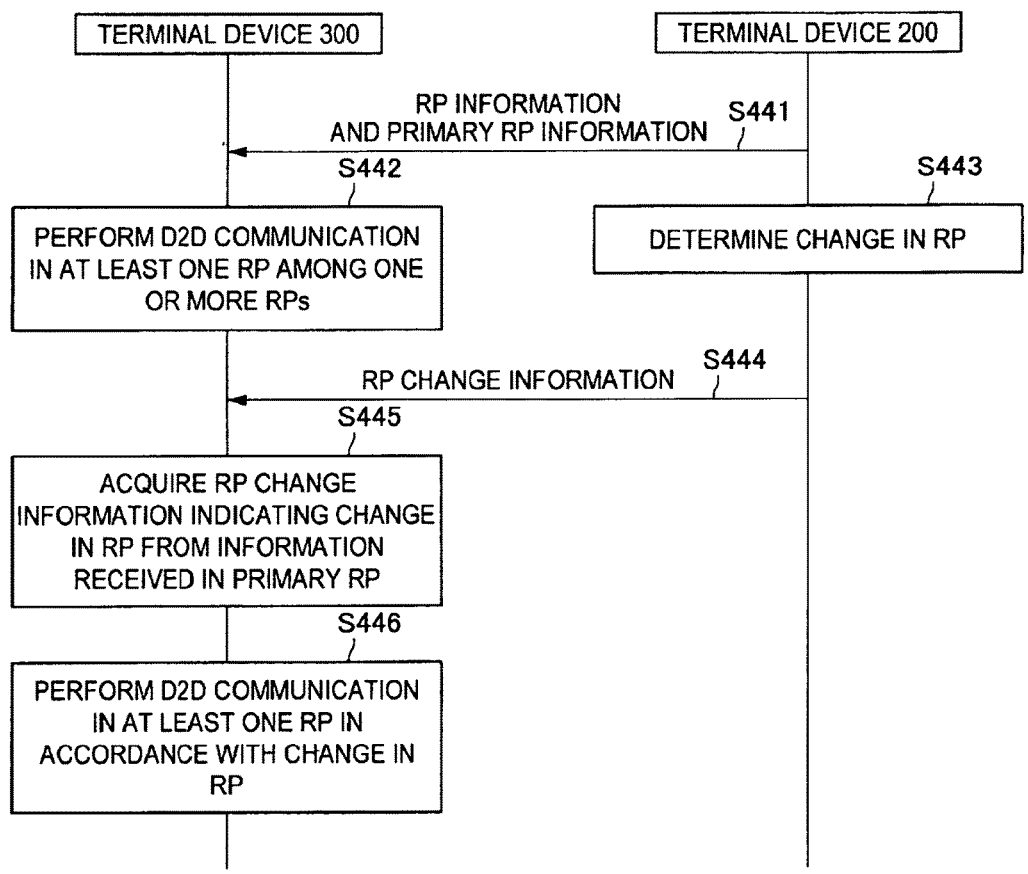

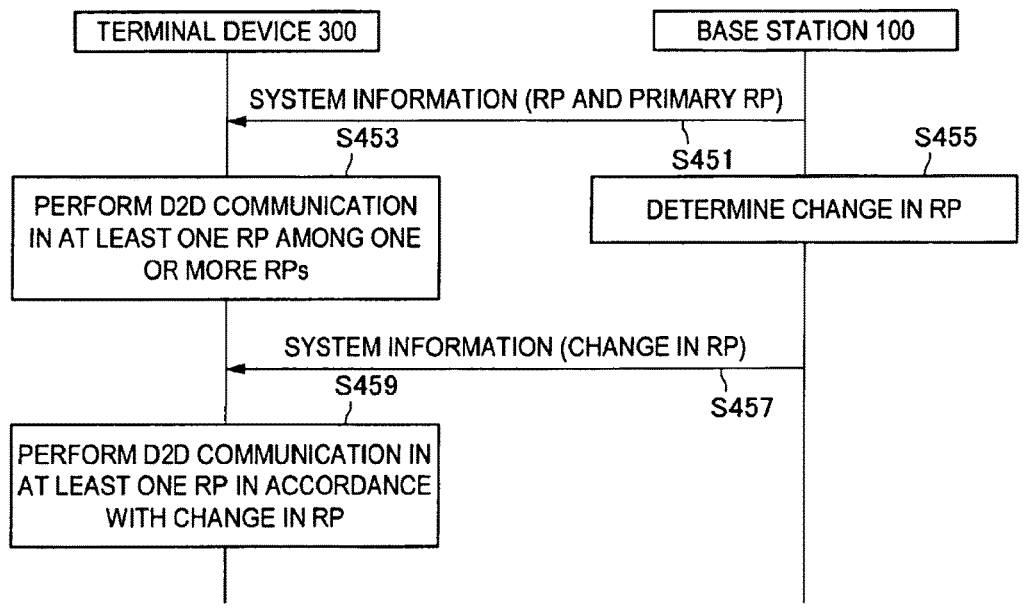
[Fig. 18]

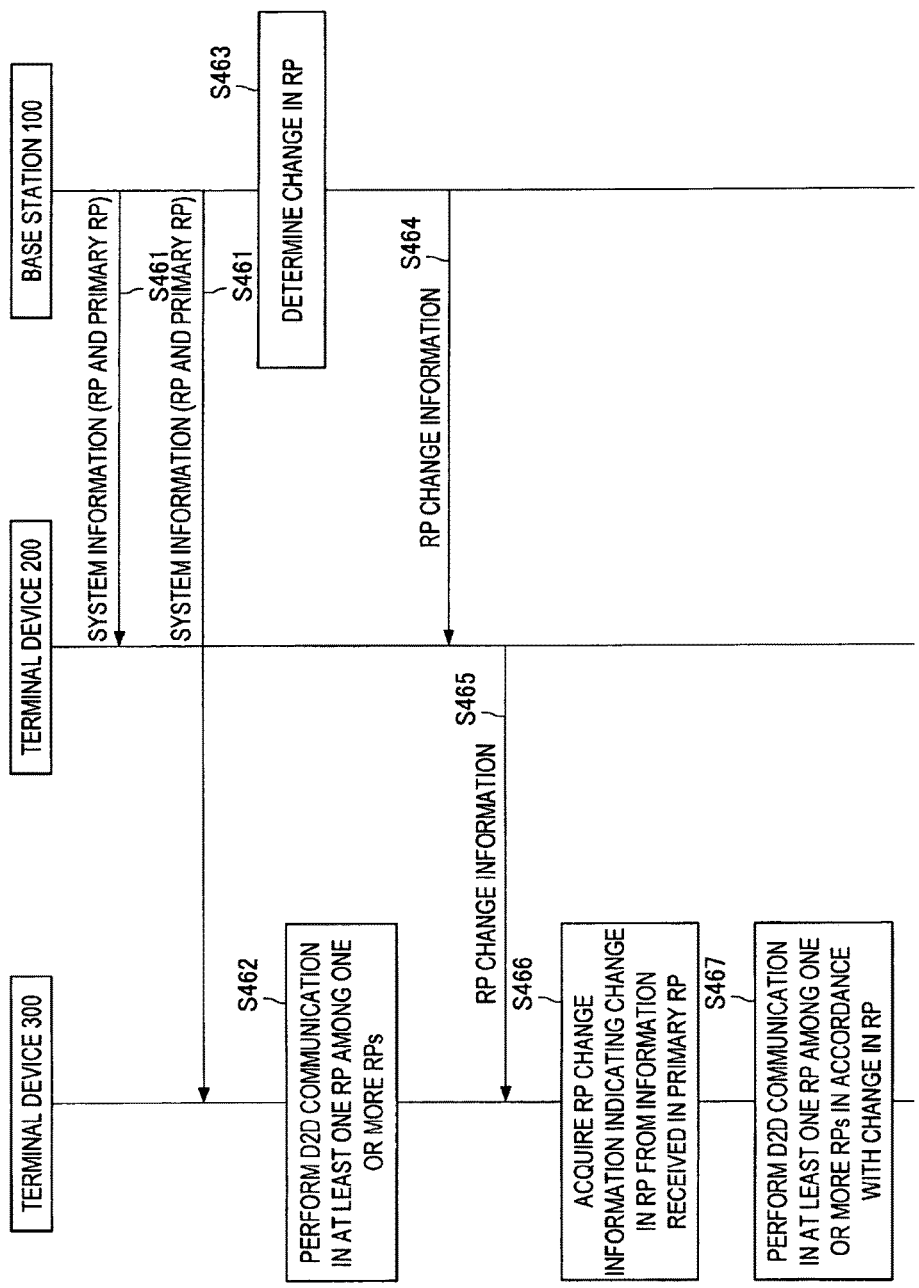
[Fig. 19]

[Fig. 20]
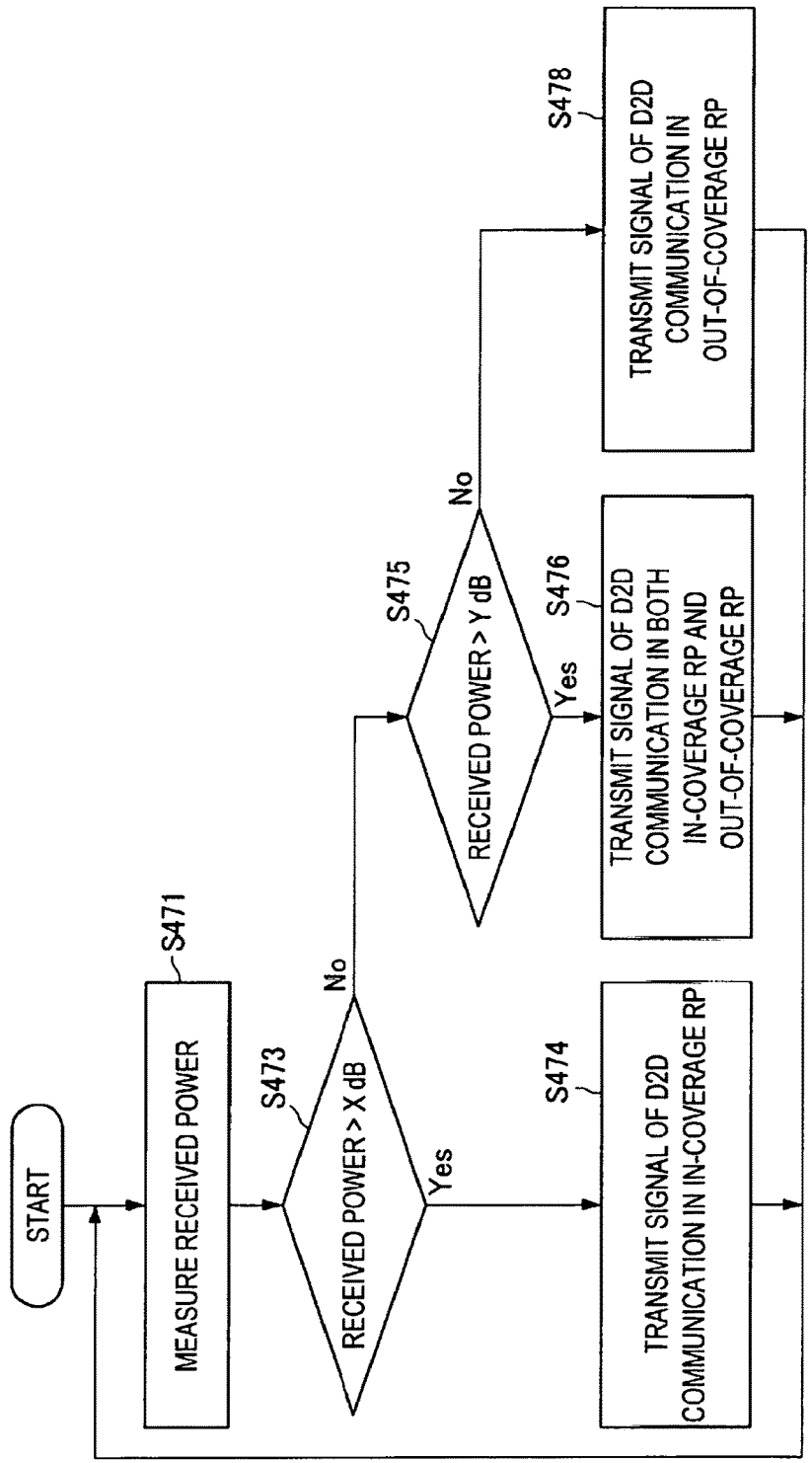

[Fig. 21]
| RESOURCE POOL ID | RESOURCE POOL GROUP ID |
|---|---|
| #1 | #1 |
| #2 | #2 |
| #3 | #2 |
| #4 | #1 |
| #5 | #3 |
| ⋮ | ⋮ |
| #N | #1 |
[Fig. 22]
| RESOURCE POOL ID | RESOURCE POOL GROUP ID |
|---|---|
| #1 | #1 |
| #4 | #1 |
| #N | #1 |
[Fig. 23]
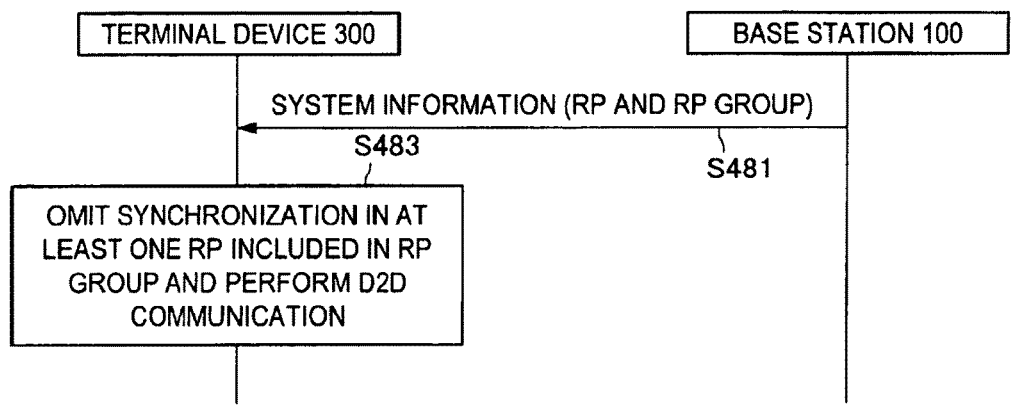

[Fig. 24]
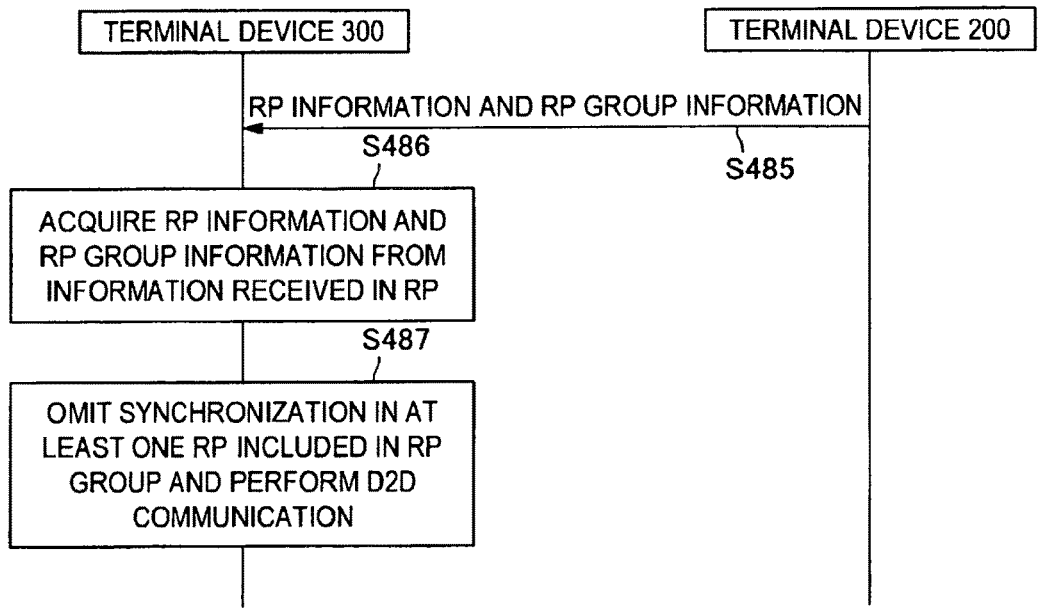
[Fig. 25]
| RESOURCE POOL ID | USE CASE |
|---|---|
| #1 | 1 |
| #2 | 3 |
| #3 | 2 |
| #4 | 1 |
| #5 | 5 |
| ⋮ | ⋮ |
| #N | 2 |

[Fig. 26]
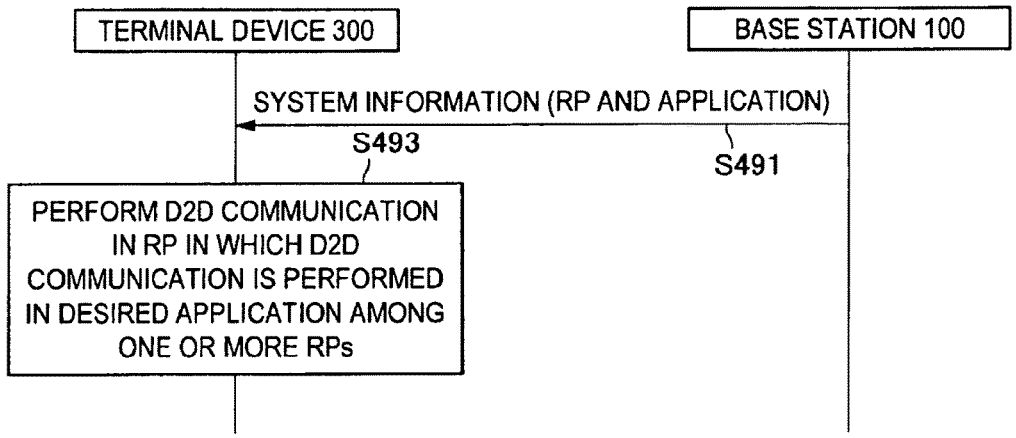
[Fig. 27]
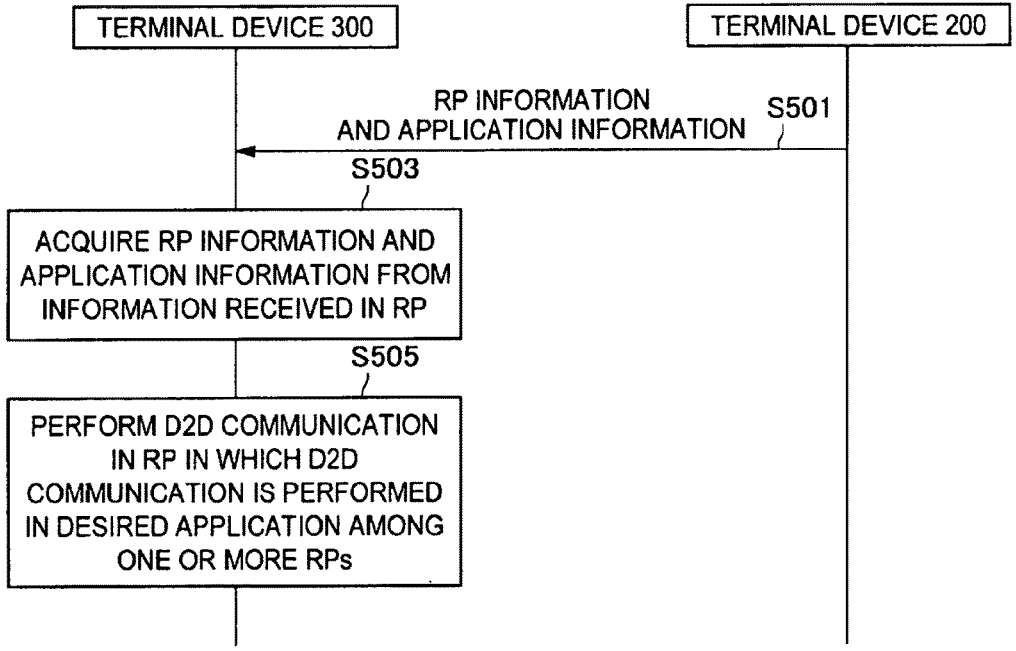

[Fig. 28]
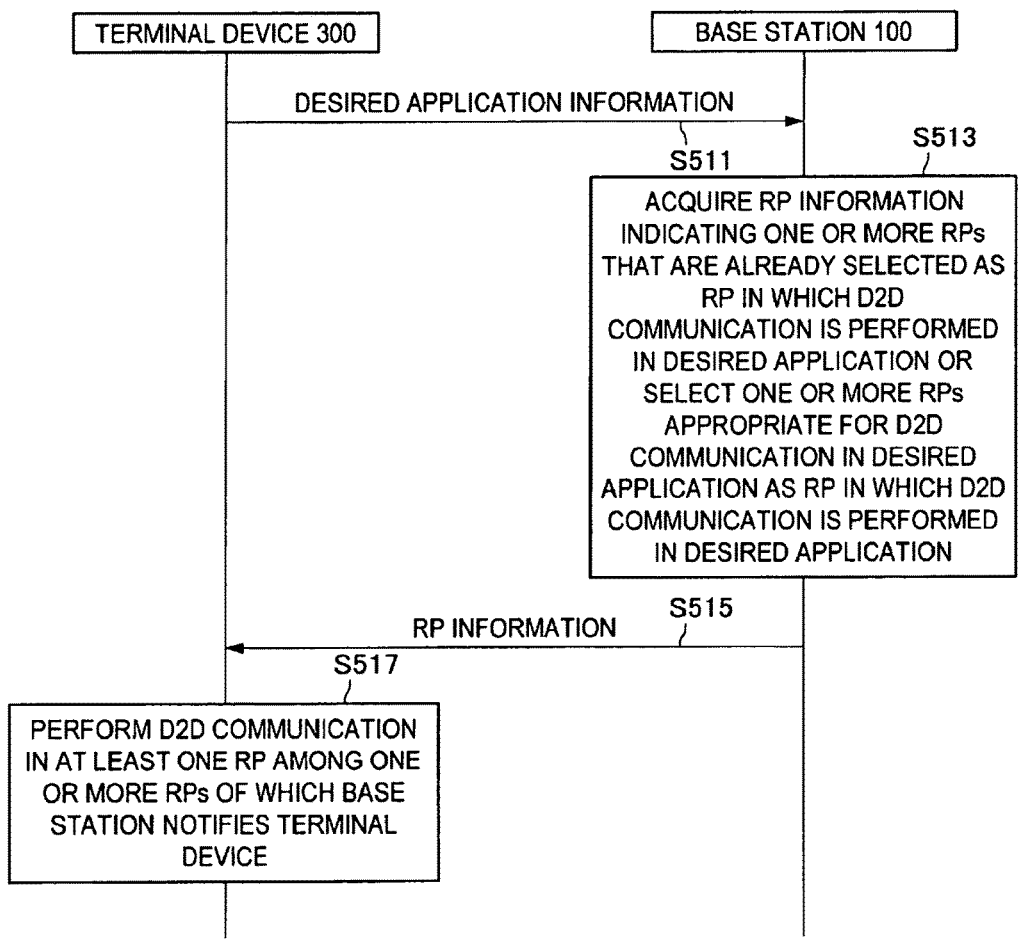

[Fig. 29]
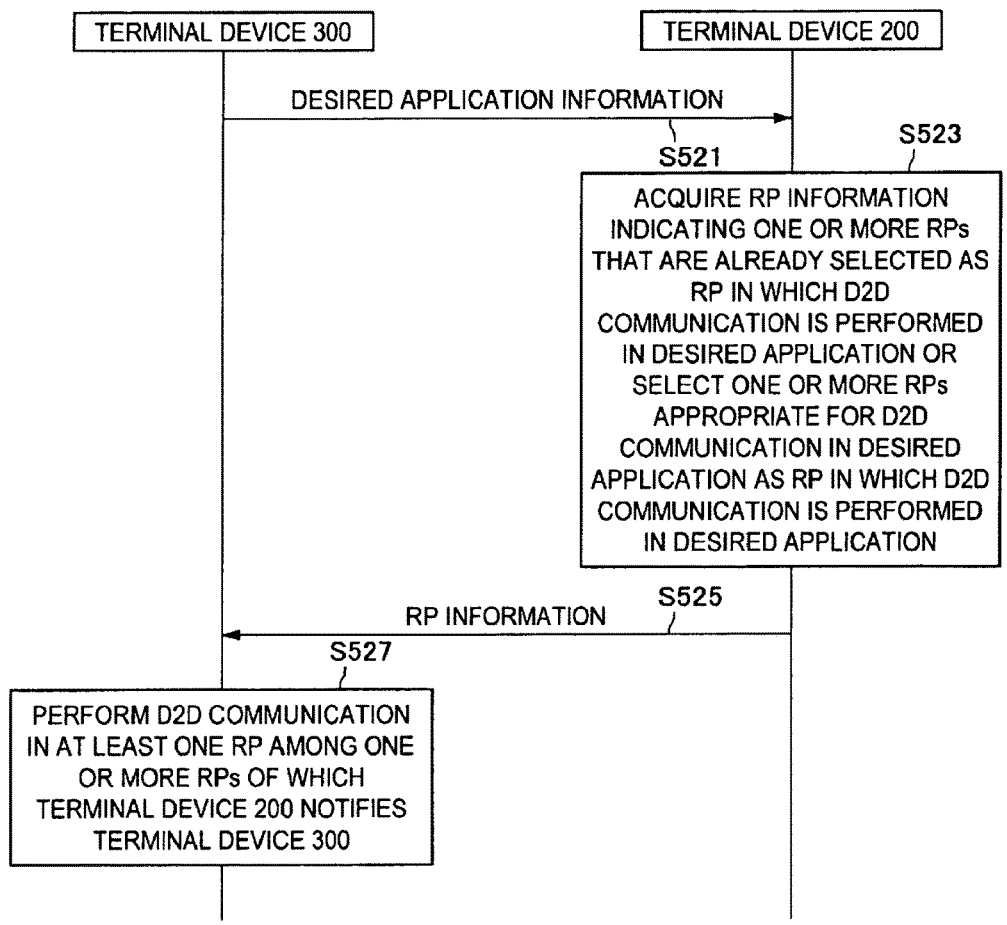

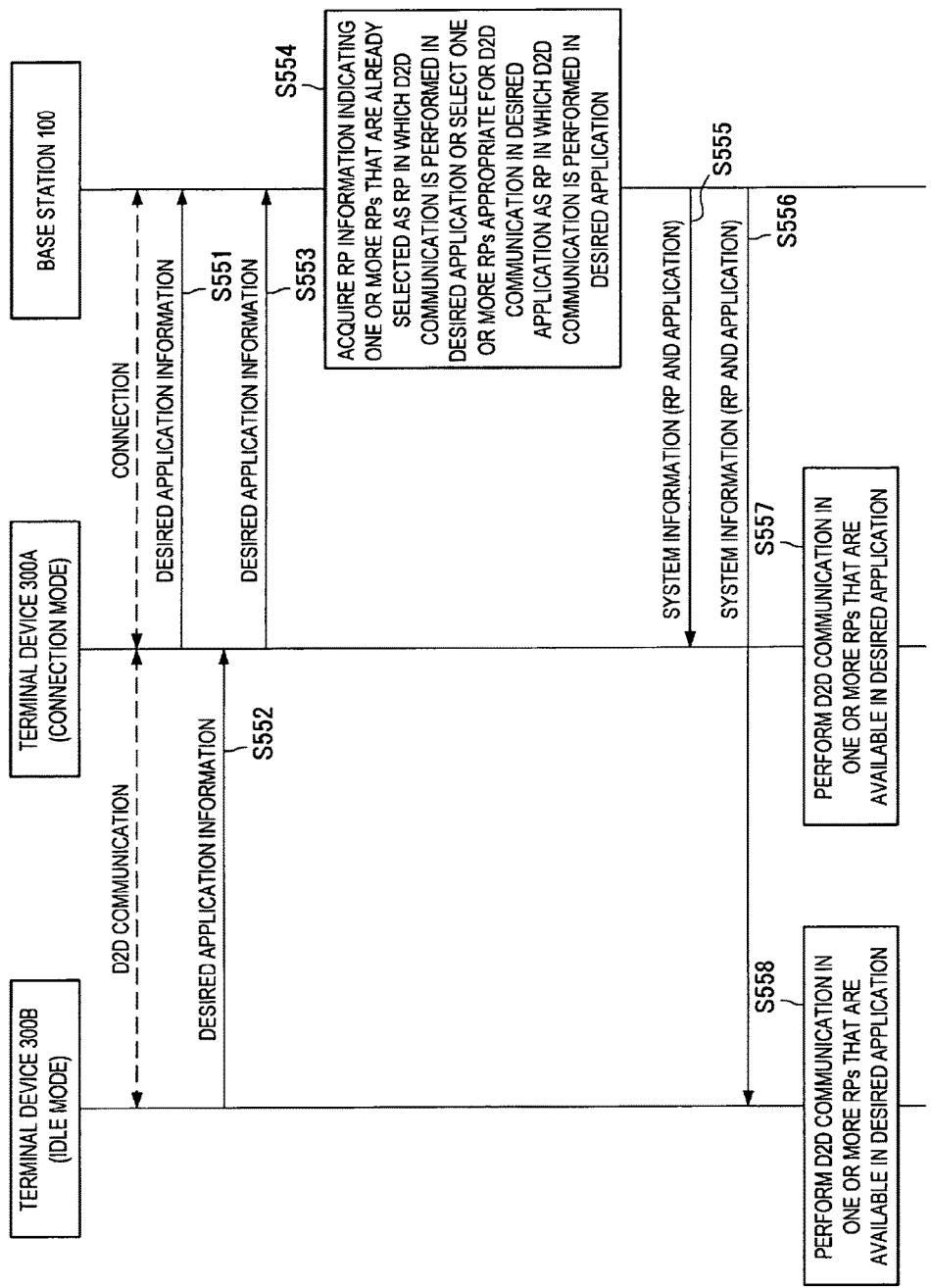

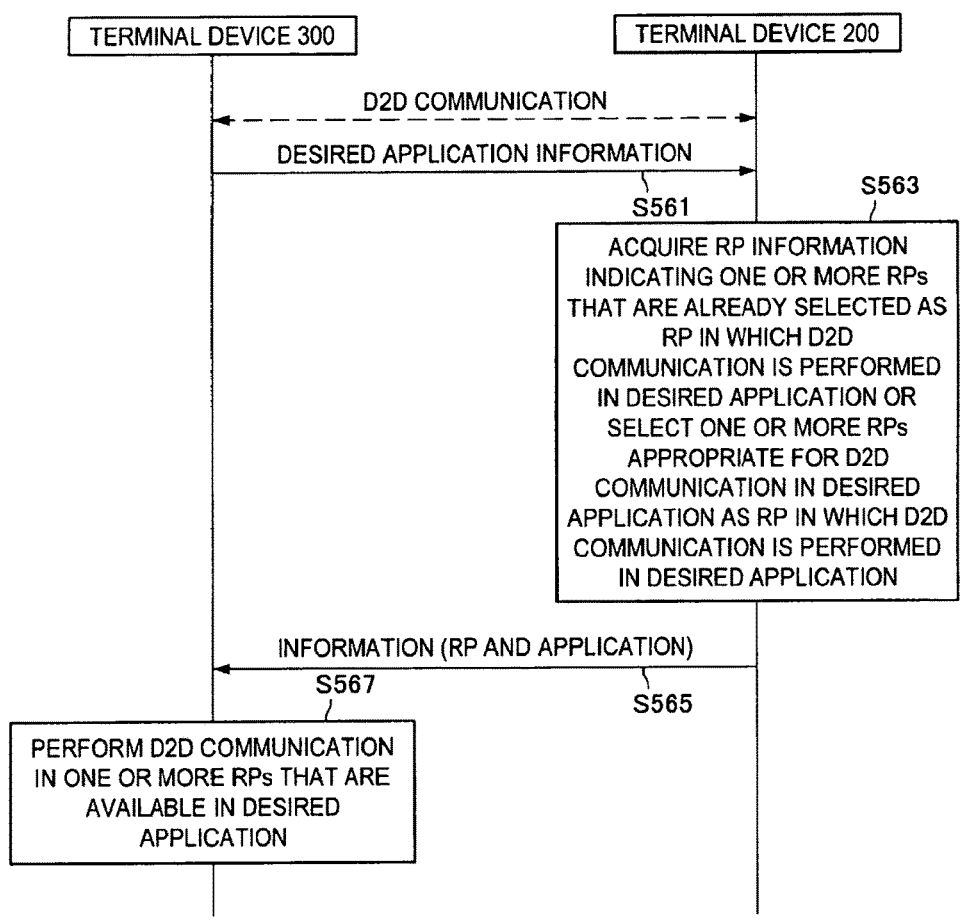
[Fig. 31]

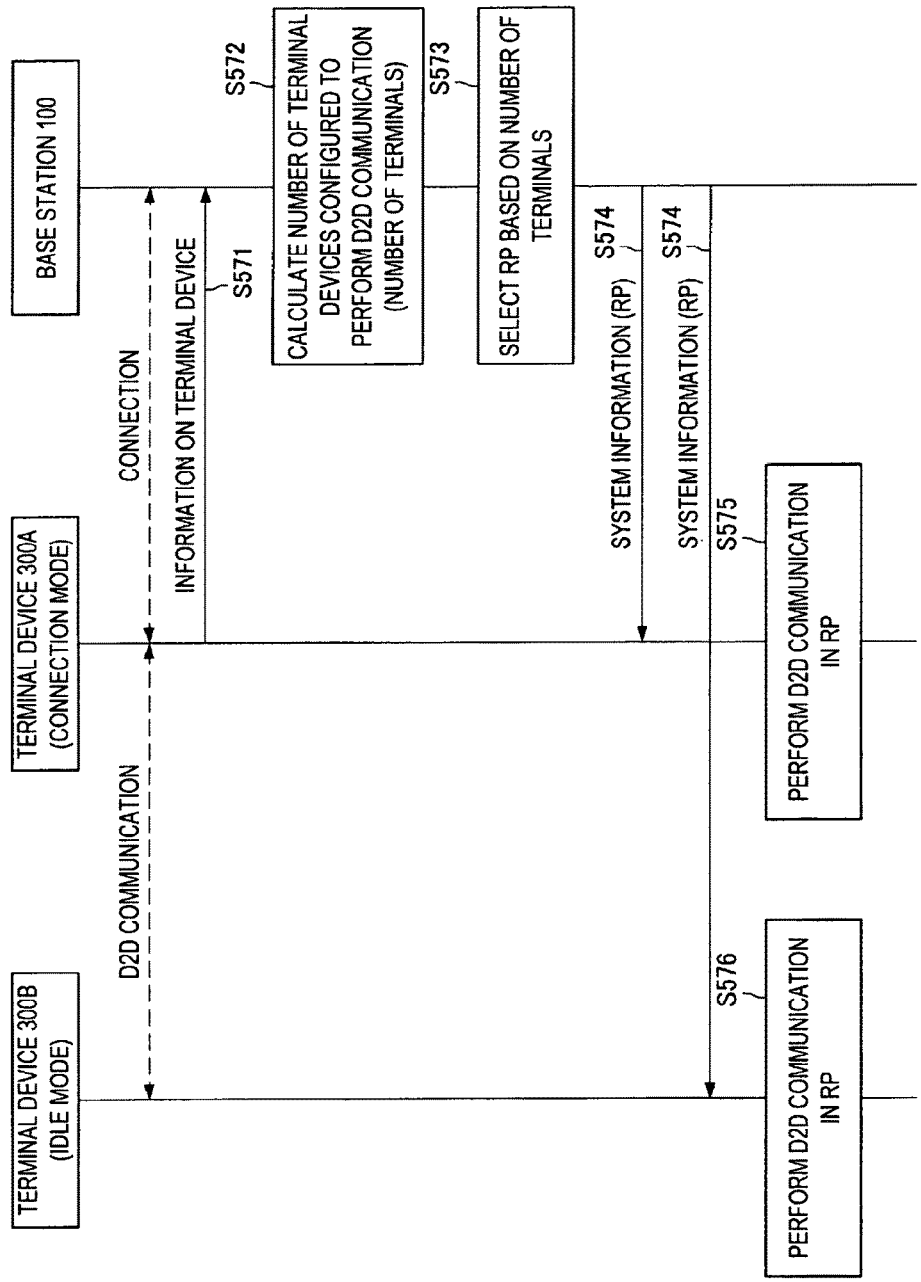

[Fig. 33]
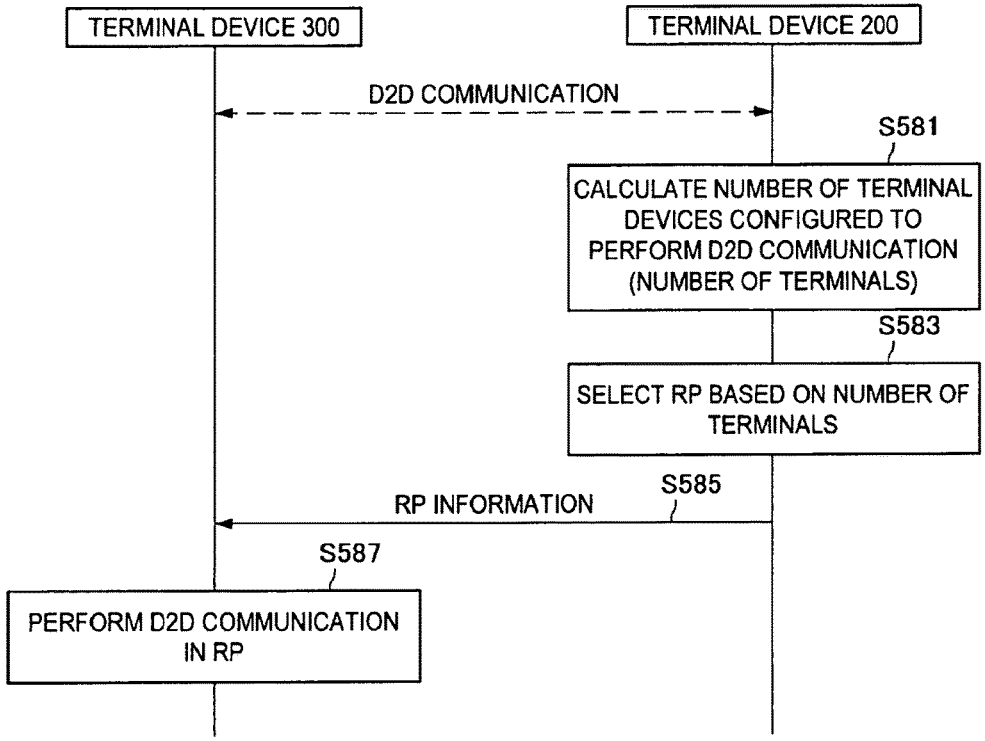
[Fig. 34]
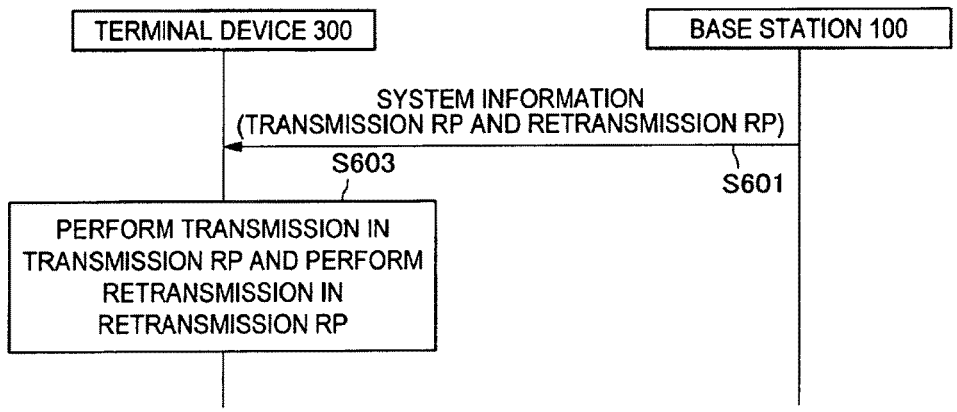

[Fig. 35]
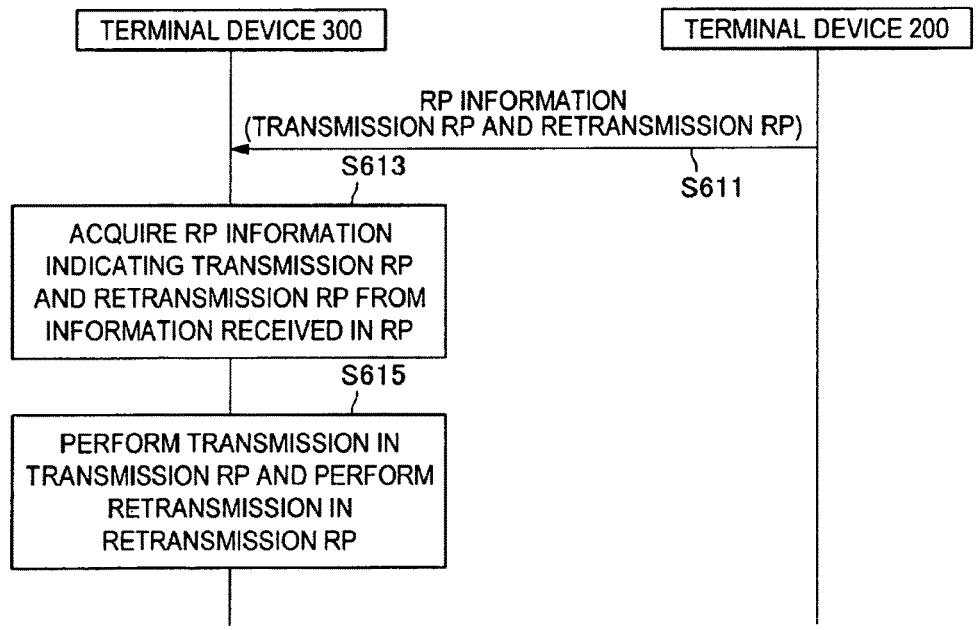
[Fig. 36]
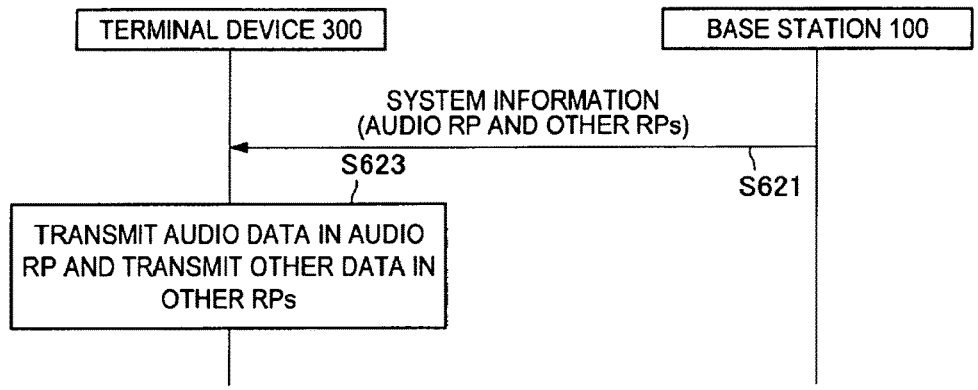

[Fig. 37]
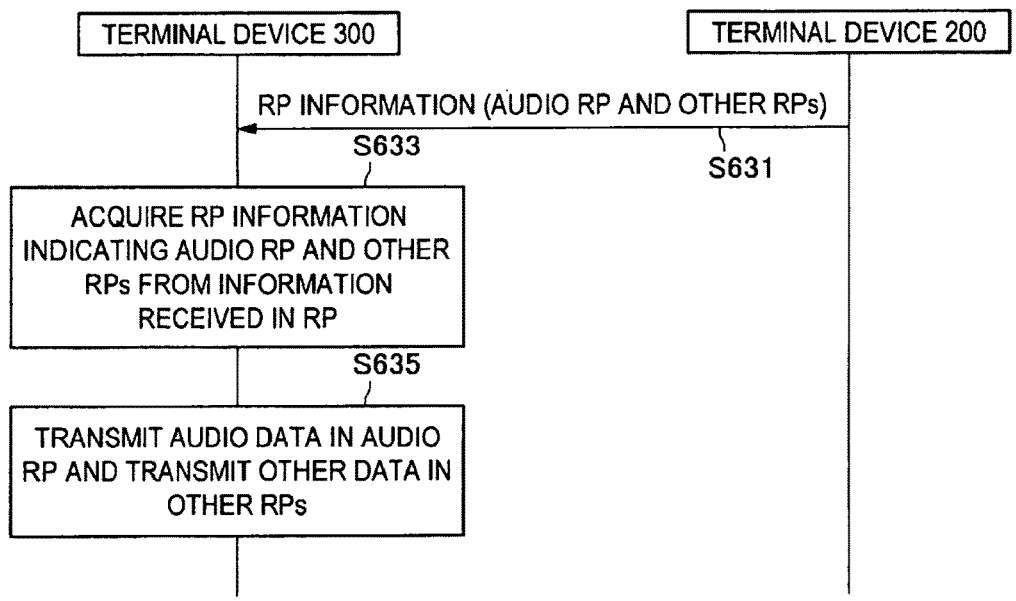

[Fig. 38]
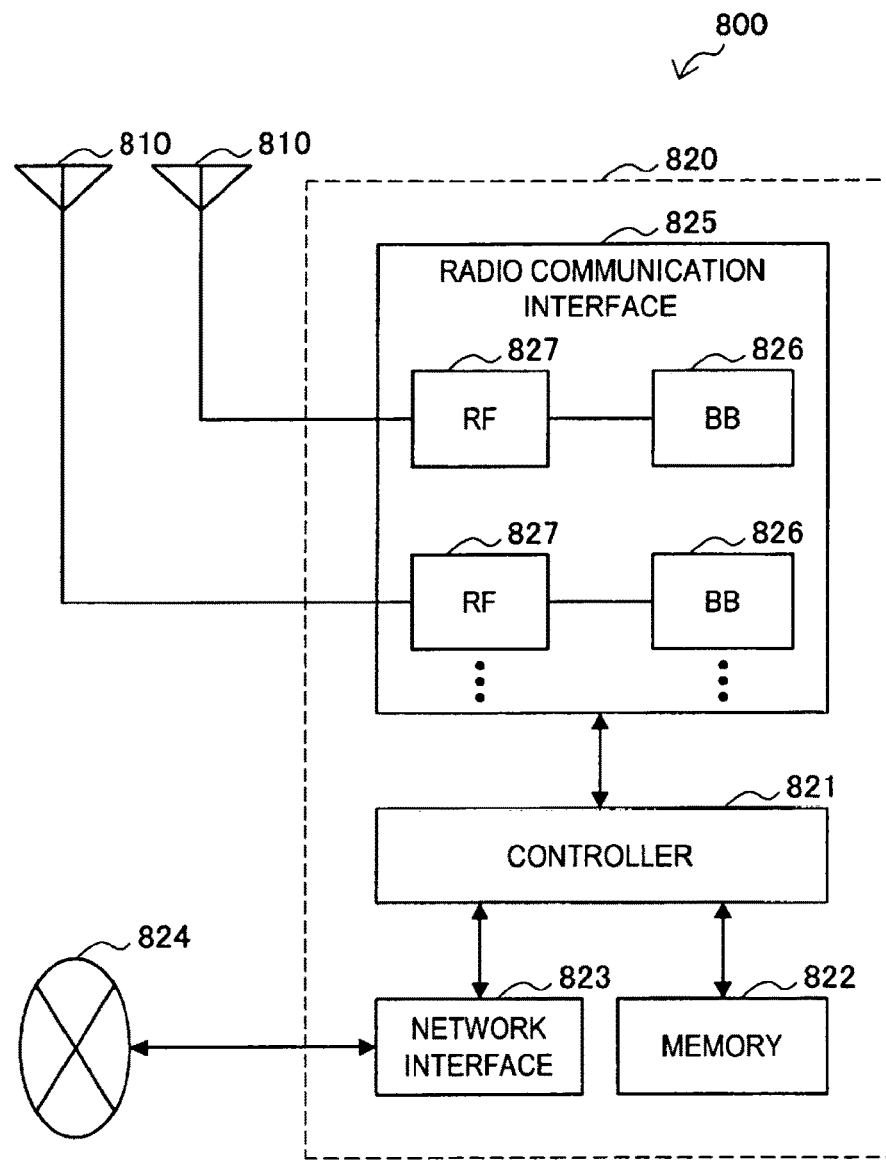

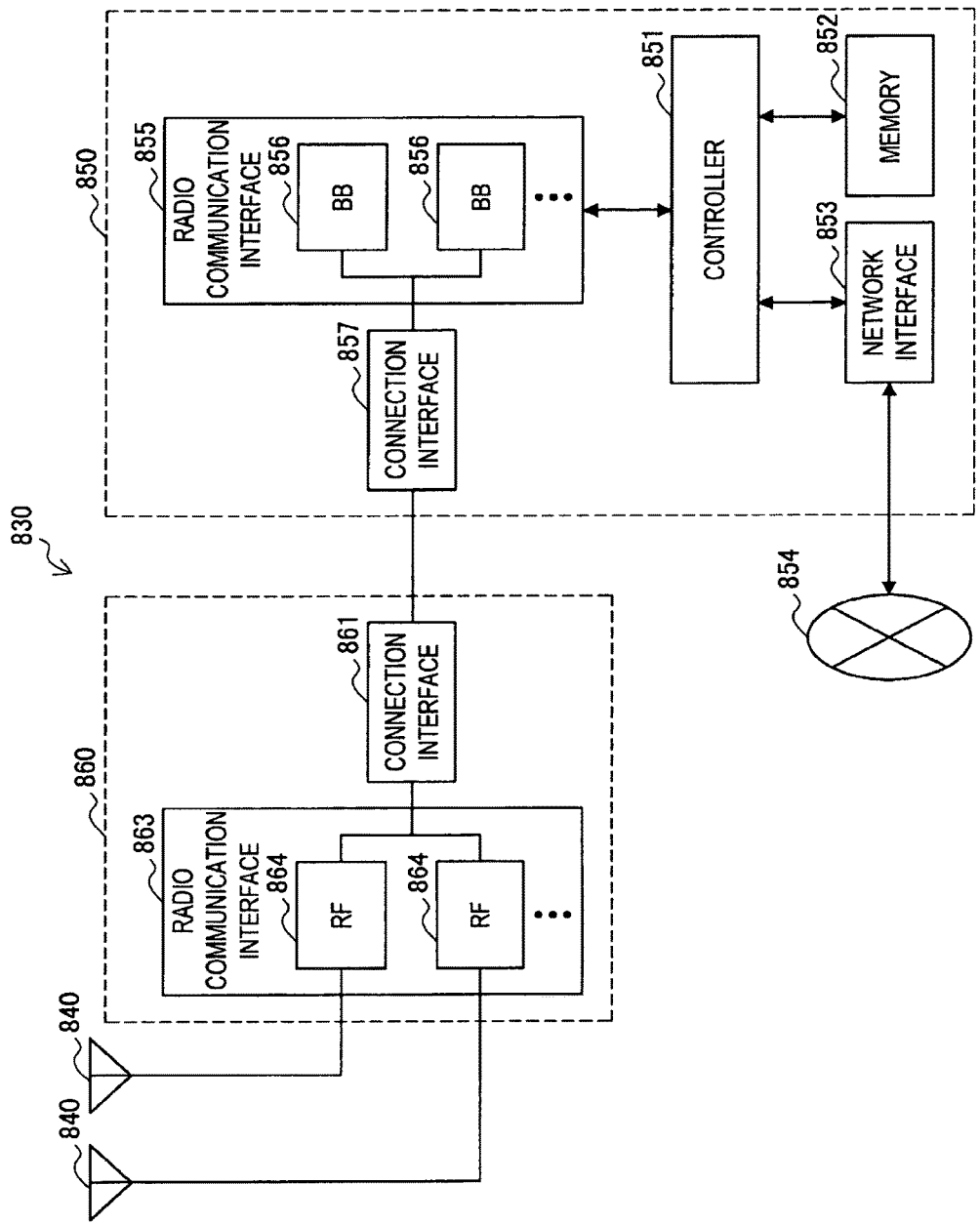
[Fig. 39]

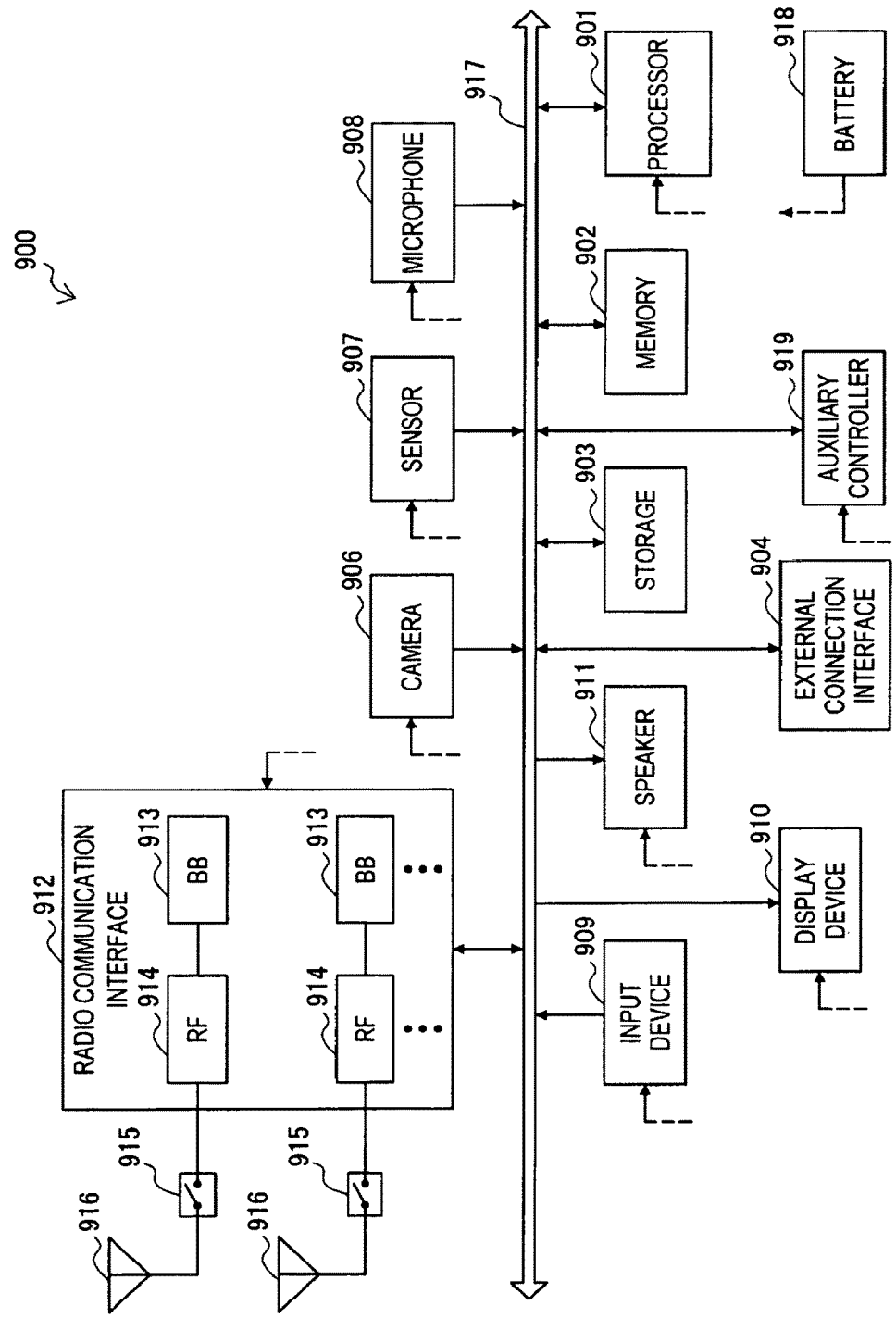
[Fig. 40]

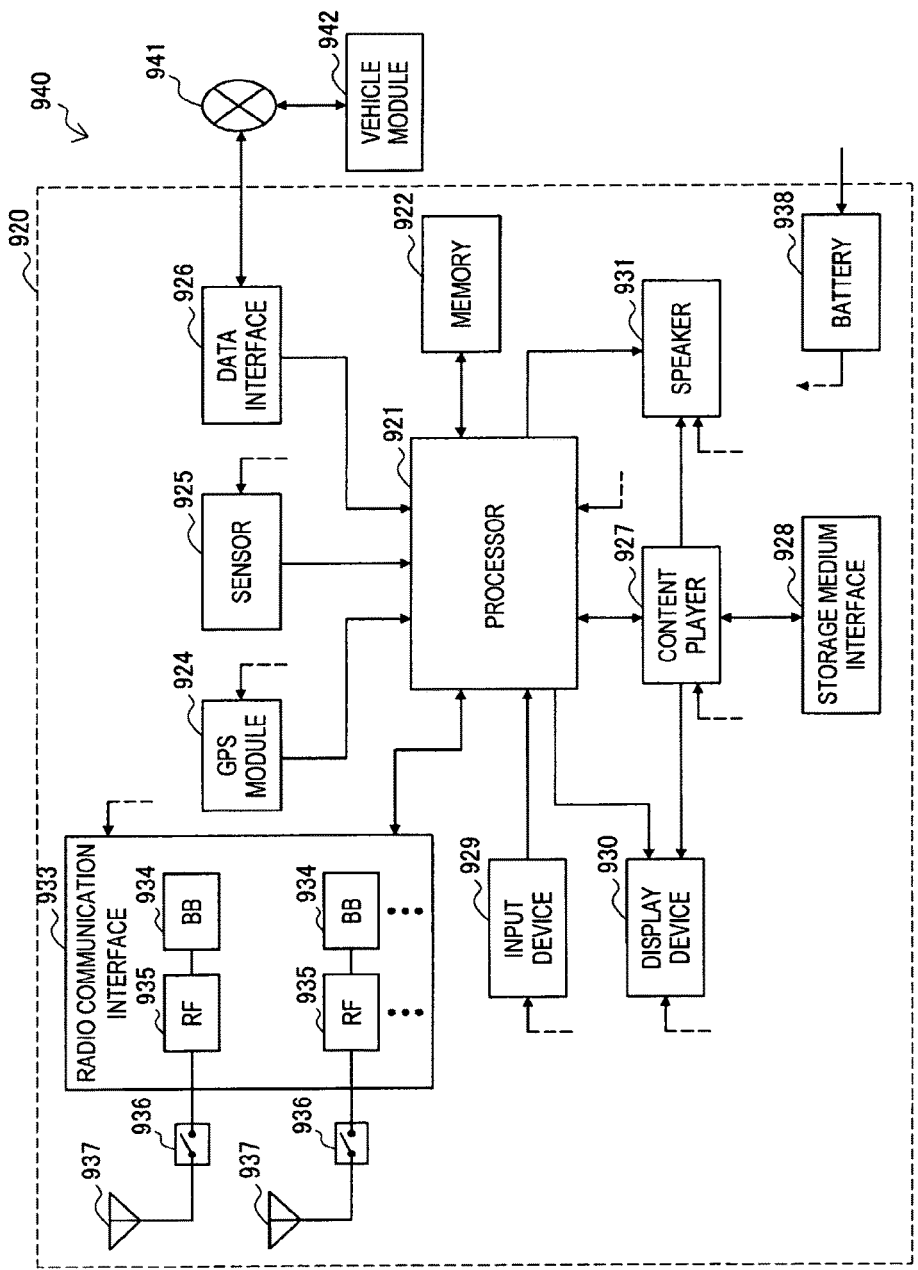
[Fig. 41]

DEVICE AND ASSOCIATED METHODOLOGY FOR MANAGEMENT OF RESOURCE POOLS OF RESOURCES USED IN DEVICE-TO-DEVICE COMMUNICATIONS

CROSS REFERENCE TO RELATED APPLICATIONS

This application is a continuation of U.S. application Ser. No. 15/116,835 filed Aug. 5, 2016, which is a National Phase of PCT/JP2015/003566 filed Jul. 14, 2015 and claims the benefit of Japanese Priority Patent Application JP 2014-154714 filed Jul. 30, 2014, the entire contents of each of which are incorporated herein by reference.

TECHNICAL FIELD

The present disclosure relates to a device.

BACKGROUND ART

Device-to-device communication (D2D communication) is communication in which two or more terminal devices transmit and receive signals directly, unlike typical cellular communication in which a base station and a terminal device transmit and receive signals. For this reason, it is anticipated that D2D communication will be used to create new usage scenarios for terminal devices that differ from the typical cellular communication above. For example, various applications are conceivable, such as information sharing by data communication between nearby terminal devices or among a group of nearby terminal devices, distribution of information from an installed terminal device, and autonomous communication between machines, called machine-to-machine (M2M) communication.

Additionally, it is conceivable that D2D communication will be put to effective use in data offloading in response to the significant increase in data traffic due to the recent increase in smartphones. For example, in recent years, there has been a sharp rise in the necessity to transmit and receive video image streaming data. However, since video images typically have large data sizes, there is a problem of consuming many resources on a radio access network (RAN). Consequently, if terminal devices are in a state suitable for D2D communication with each other, such as when the terminal devices are a short distance away from each other, video image data may be offloaded to D2D communication, thereby moderating the resource consumption and processing load on a RAN. In this way, D2D communication provides value to both telecommunications carriers and users. For this reason, D2D communication is currently recognized as one crucial technology area for Long Term Evolution (LTE), and is receiving attention from the 3rd Generation Partnership Project (3GPP) standards committee.

For example, Non Patent Literature 1 discloses technology such as synchronization and discovery of D2D communication.

CITATION LIST

Non Patent Literature

[NPL 1] 3GPP TR 36.843 V12.0.0 (March 2014)

SUMMARY

Technical Problem

In Non Patent Literature 1, a method of a terminal device recognizing radio resources available for D2D communication is not disclosed.

For example, radio resources (a resource pool) available for D2D communication are selected by a base station in the case of in-coverage and is selected by a representative terminal device in the case of out-of-coverage.

In the case of in-coverage, the base station may notify the terminal device of the radio resources available for D2D communication. However, when the base station freely selects the radio resources available for D2D communication without constraints, the base station may use many radio resources in order to notify the radio resources available for D2D communication. As a result, from the viewpoint of the radio resources, a load on the base station may become large.

In the case of out-of-coverage, the representative terminal device may notify another terminal device of the radio resources available for D2D communication. However, since the other terminal device does not recognize radio resources that are used by the representative terminal device to notify the radio resources available for D2D communication, a trial and error search (for example, a synchronization signal and/or synchronization information (information of synchronization) is detected by trial and error) may be performed. As a result, a load on the other terminal device may become large. In addition, similar to the case of in-coverage, in the case of out-of-coverage, from the viewpoint of the radio resources, a load on the representative terminal device may become large.

Therefore, it is preferable to provide a mechanism in which a load necessary for a terminal device to recognize the radio resources available for D2D communication can be reduced.

Solution to Problem

According to an exemplary embodiment of the present disclosure, there is provided a device including: an acquisition unit configured to acquire information indicating one or more resource pools serving as radio resources available for device-to-device communication; and a control unit configured to notify a terminal device of the one or more resource pools. The one or more resource pools are resource pools that are selected from among a resource pool set including multiple resource pools, which are determined in advance as candidates for radio resources available for device-to-device communication.

According to another exemplary embodiment of the present disclosure, there is provided a device including: an acquisition unit configured to acquire information indicating one or more resource pools serving as radio resources available for device-to-device communication; and a control unit configured to control device-to-device communication by a terminal device in at least one resource pool among the one or more resource pools. The one or more resource pools are resource pools that are selected from among a resource pool set including multiple resource pools, which are determined in advance as candidates for radio resources available for device-to-device communication.

According to another exemplary embodiment of the present disclosure, there is provided a device including: an acquisition unit configured to acquire information indicating one or more resource pools serving as radio resources available for device-to-device communication; and a control unit configured to notify a terminal device of the one or more resource pools in a predetermined resource pool.

According to another exemplary embodiment of the present disclosure, there is provided a device including: an acquisition unit configured to acquire information indicating one or more resource pools serving as radio resources available for device-to-device communication from information received by a terminal device in a predetermined resource pool; and a control unit configured to control device-to-device communication by the terminal device in at least one resource pool among the one or more resource pools.

According to another exemplary embodiment of the present disclosure, there is provided a device including: an acquisition unit configured to acquire information indicating a change in a resource pool serving as a radio resource available for device-to-device communication; and a control unit configured to notify a terminal device of the change in a primary resource pool among one or more resource pools serving as radio resources available for device-to-device communication.

According to another exemplary embodiment of the present disclosure, there is provided a device including: an acquisition unit configured to acquire information indicating a change in a resource pool serving as a radio resource available for device-to-device communication from information received by a terminal device in a primary resource pool among one or more resource pools serving as radio resources available for device-to-device communication; and a control unit configured to control device-to-device communication by the terminal device in at least one resource pool in accordance with the change.

According to another exemplary embodiment of the present disclosure, there is provided a device including: an acquisition unit configured to acquire information indicating a change in a resource pool serving as a radio resource available for device-to-device communication; and a control unit configured to notify a terminal device of the change by at least one of reporting of system information indicating the change and separate signaling.

According to another exemplary embodiment of the present disclosure, there is provided a device including: an acquisition unit configured to acquire information indicating an in-coverage resource pool serving as a radio resource available for device-to-device communication within a network coverage area and an out-of-coverage resource pool serving as a radio resource available for device-to-device communication outside of the network coverage area; and a control unit configured to control device-to-device communication by a terminal device in a manner that the terminal device transmits a signal of device-to-device communication in both of the in-coverage resource pool and the out-of-coverage resource pool when received power in the terminal device of a signal transmitted by a base station is less than first power and is greater than second power which is less than the first power.

According to another exemplary embodiment of the present disclosure, there is provided a device including: an acquisition unit configured to acquire information indicating an in-coverage resource pool serving as a radio resource available for device-to-device communication within a network coverage area and an out-of-coverage resource pool serving as a radio resource available for device-to-device communication outside of the network coverage area; and a control unit configured to notify a terminal device of the in-coverage resource pool and the out-of-coverage resource pool.

According to another exemplary embodiment of the present disclosure, there is provided a device including: an acquisition unit configured to acquire information indicating a resource pool group that is used by a synchronized terminal device and includes one or more resource pools serving as radio resources available for device-to-device communication; and a control unit configured to notify a terminal device of the resource pool group.

According to another exemplary embodiment of the present disclosure, there is provided a device including: an acquisition unit configured to acquire information indicating a resource pool group that is used by a synchronized terminal device and includes one or more resource pools serving as radio resources available for device-to-device communication; and a control unit configured to control device-to-device communication by a terminal device in a manner that the terminal device omits synchronization based on a synchronization signal transmitted in at least one resource pool included in the resource pool group.

According to another exemplary embodiment of the present disclosure, there is provided a device including: an acquisition unit configured to acquire information indicating an application of device-to-device communication that is performed in each of one or more resource pools serving as radio resources available for device-to-device communication; and a control unit configured to notify a terminal device of the application.

According to another exemplary embodiment of the present disclosure, there is provided a device including: an acquisition unit configured to acquire information indicating an application of device-to-device communication that is performed in each of one or more resource pools serving as radio resources available for device-to-device communication; and a control unit configured to control device-to-device communication by a terminal device in a manner that the terminal device performs device-to-device communication in a desired application in a resource pool in which device-to-device communication is performed in the desired application among the one or more resource pools.

According to another exemplary embodiment of the present disclosure, there is provided a device including: an acquisition unit configured to acquire information indicating a desired application of device-to-device communication of a terminal device; and a control unit configured to notify the terminal device of one or more resource pools in which device-to-device communication is performed in the desired application and which are one or more resource pools serving as radio resources available for device-to-device communication.

According to another exemplary embodiment of the present disclosure, there is provided a device including: an acquisition unit configured to acquire information indicating a desired application of device-to-device communication of a terminal device; and a control unit configured to notify a base station or another terminal device of the desired application. The control unit controls device-to-device communication in the desired application by the terminal device in at least one resource pool among one or more resource pools of which the base station or the other terminal device notifies the terminal device. The one or more resource pools are radio resources available for device-to-device communication and are resource pools in which device-to-device communication is performed in the desired application.

According to another exemplary embodiment of the present disclosure, there is provided a device including: an acquisition unit configured to acquire information indicating the number of terminal devices configured to perform device-to-device communication; and a control unit configured to select a resource pool serving as a radio resource available for device-to-device communication based on the number of terminal devices configured to perform device-to-device communication. The control unit notifies the terminal device of the resource pool.

According to another exemplary embodiment of the present disclosure, there is provided a device including: an acquisition unit configured to acquire information indicating a transmission resource pool serving as a radio resource available for transmission in device-to-device communication and a retransmission resource pool serving as a radio resource available for retransmission in device-to-device communication; and a control unit configured to notify a terminal device of the transmission resource pool and the retransmission resource pool.

According to another exemplary embodiment of the present disclosure, there is provided a device including: an acquisition unit configured to acquire information indicating a transmission resource pool serving as a radio resource available for transmission in device-to-device communication and a retransmission resource pool serving as a radio resource available for retransmission in device-to-device communication; and a control unit configured to control device-to-device communication of a terminal device in a manner that the terminal device performs transmission in the transmission resource pool in device-to-device communication and the terminal device performs retransmission in the retransmission resource pool in device-to-device communication.

According to another exemplary embodiment of the present disclosure, there is provided a device including: an acquisition unit configured to acquire information indicating an audio resource pool serving as a radio resource available for transmitting audio data in device-to-device communication and another resource pool serving as a radio resource available for transmitting another data in device-to-device communication; and a control unit configured to notify a terminal device of the audio resource pool and the another resource pool.

According to another exemplary embodiment of the present disclosure, there is provided a device including: an acquisition unit configured to acquire information indicating an audio resource pool serving as a radio resource available for transmitting audio data in device-to-device communication and another resource pool serving as a radio resource available for transmitting another data in device-to-device communication; and a control unit configured to control device-to-device communication of a terminal device in a manner that the terminal device transmits audio data in the audio resource pool in device-to-device communication and the terminal device transmits another data in the another resource pool in device-to-device communication.

According to another exemplary embodiment of the present disclosure, a device includes circuitry configured that acquires information indicating one or more resource pools serving as radio resources available for device-to-device communication, and that notifies a terminal device of the one or more resource pools, wherein the one or more resource pools are resource pools that are selected from among a resource pool set including multiple resource pools. The multiple resource pools are determined in advance as candidates for radio resources available for device-to-device communication.

According to another exemplary embodiment of the present disclosure, a device includes circuitry that acquires information indicating one or more resource pools serving as radio resources available for device-to-device communication, and that controls device-to-device communication by a terminal device in at least one resource pool among the one or more resource pools. The one or more resource pools are resource pools that are selected from among a resource pool set including multiple resource pools, which are determined in advance as candidates for radio resources available for device-to-device communication.

According to another exemplary embodiment of the present disclosure, a device includes circuitry that acquires information indicating one or more resource pools serving as radio resources available for device-to-device communication, and notifies a terminal device of the one or more resource pools in a predetermined resource pool.

According to another exemplary aspect of the present disclosure, a device includes circuitry that acquires information indicating one or more resource pools serving as radio resources available for device-to-device communication from information received by a terminal device in a predetermined resource pool, and controls device-to-device communication by the terminal device in at least one resource pool among the one or more resource pools.

According to another exemplary embodiment of the present disclosure, a device includes circuitry that acquires information indicating a change in a resource pool serving as a radio resource available for device-to-device communication, and notifies a terminal device of the change in a primary resource pool among one or more resource pools serving as radio resources available for device-to-device communication.

According to another exemplary embodiment of the present disclosure, a device includes circuitry that acquires information indicating a change in a resource pool serving as a radio resource available for device-to-device communication from information received by a terminal device in a primary resource pool among one or more resource pools serving as radio resources available for device-to-device communication, and controls device-to-device communication by the terminal device in at least one resource pool in accordance with the change.

According to another exemplary embodiment of the present disclosure, a device includes circuitry that acquires information indicating a change in a resource pool serving as a radio resource available for device-to-device communication, and notifies a terminal device of the change by at least one of reporting of system information indicating the change and separate signaling.

According to another exemplary embodiment of the present disclosure, a device includes circuitry that acquires information indicating an in-coverage resource pool serving as a radio resource available for device-to-device communication within a network coverage area and an out-of-coverage resource pool serving as a radio resource available for device-to-device communication outside of the network coverage area.

According to another exemplary embodiment of the present disclosure, a device includes circuitry that acquires information indicating an in-coverage resource pool serving as a radio resource available for device-to-device communication within a network coverage area and an out-of-coverage resource pool serving as a radio resource available for device-to-device communication outside of the network coverage area, and notifies a terminal device of the in-coverage resource pool and the out-of-coverage resource pool.

According to another exemplary embodiment of the present disclosure, a device includes circuitry that acquires information indicating a resource pool group that is used by a synchronized terminal device and includes one or more resource pools serving as radio resources available for device-to-device communication, and notifies a terminal device of the resource pool group.

According to another exemplary embodiment of the present disclosure, a device includes circuitry that acquires information indicating a resource pool group that is used by a synchronized terminal device and includes one or more resource pools serving as radio resources available for device-to-device communication, and controls device-to-device communication by a terminal device in a manner that the terminal device omits synchronization based on synchronization information transmitted in at least one resource pool included in the resource pool group.

According to another exemplary embodiment, a device includes circuitry that acquires information indicating an application of device-to-device communication that is performed in each of one or more resource pools serving as radio resources available for device-to-device communication, and notifies a terminal device of the application.

According to another exemplary embodiment of the present disclosure, a device includes circuitry that acquires information indicating an application of device-to-device communication that is performed in each of one or more resource pools serving as radio resources available for device-to-device communication; and controls device-to-device communication by a terminal device in a manner that the terminal device performs device-to-device communication in a desired application in a resource pool in which device-to-device communication is performed in the desired application among the one or more resource pools.

According to another exemplary embodiment of the present disclosure, a device includes circuitry that acquires information indicating a desired application of device-to-device communication of a terminal device, and notifies the terminal device of one or more resource pools in which device-to-device communication is performed in the desired application and which are one or more resource pools serving as radio resources available for device-to-device communication.

According to another exemplary embodiment of the present disclosure, a device includes circuitry that acquires information indicating a desired application of device-to-device communication of a terminal device, notifies a base station or another terminal device of the desired application, and controls device-to-device communication in the desired application by the terminal device in at least one resource pool among one or more resource pools of which the base station or the other terminal device notifies the terminal device. The one or more resource pools are radio resources available for device-to-device communication and are resource pools in which device-to-device communication is performed in the desired application.

According to another exemplary embodiment of the present disclosure, a device includes circuitry that acquires information indicating the number of terminal devices configured to perform device-to-device communication, selects a resource pool serving as a radio resource available for device-to-device communication based on the number of terminal devices configured to perform device-to-device communication, and notifies the terminal device of the resource pool.

According to another exemplary embodiment of the present disclosure, a device includes circuitry that acquires information indicating a transmission resource pool serving as a radio resource available for transmission in device-to-device communication and a retransmission resource pool serving as a radio resource available for retransmission in device-to-device communication, and notifies a terminal device of the transmission resource pool and the retransmission resource pool.

According to another exemplary embodiment of the present disclosure, a device includes circuitry that acquires information indicating a transmission resource pool serving as a radio resource available for transmission in device-to-device communication and a retransmission resource pool serving as a radio resource available for retransmission in device-to-device communication, and that controls device-to-device communication of a terminal device in a manner that the terminal device performs transmission in the transmission resource pool in device-to-device communication and the terminal device performs retransmission in the retransmission resource pool in device-to-device communication.

According to another exemplary embodiment of the present disclosure, a device includes circuitry that acquires information indicating an audio resource pool serving as a radio resource available for transmitting audio data in device-to-device communication and another resource pool serving as a radio resource available for transmitting another data in device-to-device communication, and notifies a terminal device of the audio resource pool and the another resource pool.

According to another exemplary embodiment of the present disclosure, a device includes circuitry that acquires information indicating an audio resource pool serving as a radio resource available for transmitting audio data in device-to-device communication and another resource pool serving as a radio resource available for transmitting another data in device-to-device communication, and that controls device-to-device communication of a terminal device in a manner that the terminal device transmits audio data in the audio resource pool in device-to-device communication and the terminal device transmits another data in the another resource pool in device-to-device communication.

Advantageous Effects of Invention

According to one or more of embodiments of the present disclosure described above, it is possible to reduce a load necessary for a terminal device to recognize the radio resources available for D2D communication. Also, the above effects are not necessarily limited, but along with the effects or instead of the effects, any effect shown in this specification or other effects that may be understood from this specification may be achieved.

BRIEF DESCRIPTION OF DRAWINGS

FIG. 1 is a first explanatory diagram illustrating a specific example of a use case of D2D communication.

FIG. 2 is a second explanatory diagram illustrating a specific example of a use case of D2D communication.

FIG. 3 is an explanatory diagram illustrating exemplary timings of a PSS and an SSS in FDD.

FIG. 4 is an explanatory diagram illustrating exemplary timings of a PSS and an SSS in TDD.

FIG. 5 is an explanatory diagram illustrating a radio frame and subframes in a cellular system.

FIG. 6 is an explanatory diagram illustrating an exemplary resource pool.

FIG. 7 is an explanatory diagram illustrating an example of a signal and information transmitted in a resource pool.

FIG. 8 is an explanatory diagram illustrating an example of a schematic configuration of a communication system according to an embodiment of the present disclosure.

FIG. 9 is a block diagram illustrating an exemplary configuration of a base station according to the embodiment.

FIG. 10 is a block diagram illustrating an exemplary configuration of a first terminal device according to the embodiment.

FIG. 11 is a block diagram illustrating an exemplary configuration of a second terminal device according to the embodiment.

FIG. 12 is an explanatory diagram illustrating an exemplary resource pool set.

FIG. 13 is a sequence diagram schematically illustrating an exemplary flow of a first process according to a first embodiment.

FIG. 14 is a sequence diagram schematically illustrating a first exemplary flow of a second process according to the first embodiment.

FIG. 15 is a sequence diagram schematically illustrating a second exemplary flow of a second process according to the first embodiment.

FIG. 16 is a sequence diagram schematically illustrating an exemplary flow of a process according to a second embodiment.

FIG. 17 is a sequence diagram schematically illustrating an exemplary flow of a first process according to a third embodiment.

FIG. 18 is a sequence diagram schematically illustrating an exemplary flow of a second process according to the third embodiment.

FIG. 19 is a sequence diagram schematically illustrating an exemplary flow of a third process according to the third embodiment.

FIG. 20 is a flowchart schematically illustrating an exemplary flow of a process according to a fourth embodiment.

FIG. 21 is an explanatory diagram illustrating a first example of a resource pool group.

FIG. 22 is an explanatory diagram illustrating a second example of a resource pool group.

FIG. 23 is a sequence diagram schematically illustrating an exemplary flow of a first process according to a fifth embodiment.

FIG. 24 is a sequence diagram schematically illustrating an exemplary flow of a second process according to the fifth embodiment.

FIG. 25 is an explanatory diagram illustrating an exemplary application of D2D communication performed in each resource pool.

FIG. 26 is a sequence diagram schematically illustrating an exemplary flow of a first process according to a sixth embodiment.

FIG. 27 is a sequence diagram schematically illustrating an exemplary flow of a second process according to the sixth embodiment.

FIG. 28 is a sequence diagram schematically illustrating an exemplary flow of a first process according to a seventh embodiment.

FIG. 29 is a sequence diagram schematically illustrating an exemplary flow of a second process according to the seventh embodiment.

FIG. 30 is a sequence diagram schematically illustrating an exemplary flow of a first process according to an eighth embodiment.

FIG. 31 is a sequence diagram schematically illustrating an exemplary flow of a second process according to the eighth embodiment.

FIG. 32 is a sequence diagram schematically illustrating an exemplary flow of a first process according to a ninth embodiment.

FIG. 33 is a sequence diagram schematically illustrating an exemplary flow of a second process according to the ninth embodiment.

FIG. 34 is a sequence diagram schematically illustrating an exemplary flow of a first process according to a tenth embodiment.

FIG. 35 is a sequence diagram schematically illustrating an exemplary flow of a second process according to the tenth embodiment.

FIG. 36 is a sequence diagram schematically illustrating an exemplary flow of a first process according to an eleventh embodiment.

FIG. 37 is a sequence diagram schematically illustrating an exemplary flow of a second process according to the eleventh embodiment.

FIG. 38 is a block diagram illustrating a first example of a schematic configuration of an eNB.

FIG. 39 is a block diagram illustrating a second example of a schematic configuration of an eNB.

FIG. 40 is a block diagram illustrating an example of a schematic configuration of a smartphone.

FIG. 41 is a block diagram illustrating an example of a schematic configuration of a car navigation device.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, in this specification and the appended drawings, elements having substantially the same function and structure may in some cases be distinguished by different letters appended to the same sign. For example, multiple elements having substantially the same function and structure are distinguished as terminal devices 10A, 10B, 10C, and so on as appropriate. On the other hand, when not particularly distinguishing each of multiple elements having substantially the same function and structure, only the same sign will be given. For example, the terminal devices 10A, 10B, 10C will be simply designated the terminal device 10 when not being particularly distinguished.

Hereinafter, the description will proceed in the following order.

1. Introduction
2. Schematic Configuration of Communication System
3. Configuration of Respective Devices
3.1. Base Station Configuration
3.2. First Terminal Device Configuration
3.2. Second Terminal Device Configuration 4. First Embodiment
4.1 Outline
4.2 Operation of Base Station
4.3 Operation of First Terminal Device
4.4 Operation of Second Terminal Device
4.5 Process Flow
5. Second Embodiment
5.1 Outline
5.2 Operation of First Terminal Device
5.3 Operation of Second Terminal Device
5.4 Process Flow
6. Third Embodiment
6.1 Outline
6.2 Operation of First Terminal Device
6.3 Operation of Second Terminal Device
6.4 Operation of Base Station
6.5 Process Flow
7. Fourth Embodiment
7.1 Outline
7.2 Operation of Base Station
7.3 Operation of First Terminal Device
7.4 Operation of Second Terminal Device
7.5 Process Flow
8. Fifth Embodiment
8.1 Outline
8.2 Operation of Base Station
8.3 Operation of First Terminal Device
8.4 Operation of Second Terminal Device
8.5 Process Flow
9. Sixth Embodiment
9.1 Outline
9.2 Operation of Base Station
9.3 Operation of First Terminal Device
9.4 Operation of Second Terminal Device
9.5 Process Flow
10. Seventh Embodiment
10.1 Outline
10.2 Operation of Base Station
10.3 Operation of First Terminal Device
10.4 Operation of Second Terminal Device
10.5 Process Flow
11. Eighth Embodiment
11.1 Outline
11.2 Operation of Base Station
11.3 Operation of First Terminal Device
11.4 Process Flow
12. Ninth Embodiment
12.1 Outline
12.2 Operation of Base Station
12.3 Operation of First Terminal Device
12.4 Process Flow
13. Tenth Embodiment
13.1 Outline
13.2 Operation of Base Station
13.3 Operation of First Terminal Device
13.4 Operation of Second Terminal Device
13.5 Process Flow
14. Eleventh Embodiment
14.1 Outline
14.2 Operation of Base Station
14.3 Operation of First Terminal Device
14.4 Operation of Second Terminal Device
14.5 Process Flow
15. Combination of Embodiments
16. Applications
16.1 Applications related to Base Station
16.2 Applications related to Terminal Device
17. Conclusion <<1. Introduction>>

First, technology related to D2D communication will be described with reference to FIGS. 1 to 7.

(Use Case of D2D Communication)

In general LTE systems, an evolved Node B (eNB) and a user equipment (UE) perform radio communication, but UEs do not perform radio communication to each other. However, a method in which the UEs directly perform radio communication to each other is necessary for an application for public safety (for example, an application such as collision avoidance) or data offloading.

Use cases of D2D communication are discussed in 3GPP service and systems aspects (SA) 1 and the like, and are described in TR 22.803. Also, in TR 22.803, use cases are disclosed, but specific implementation methods are not disclosed. Hereinafter, specific examples of the use case will be described with reference to FIGS. 1 and 2.

FIG. 1 is a first explanatory diagram illustrating a specific example of a use case of D2D communication. Referring to FIG. 1, multiple UEs 10 and an eNB 20 are illustrated. As a first use case, for example, an UE 10A and an UE 10B positioned within a network coverage area (for example, inside a cell 21 of the eNB 20) perform D2D communication. Such D2D communication is referred to as in-coverage D2D communication. As a second use case, for example, an UE 10C and an UE 10D positioned outside of the network coverage area perform D2D communication. Such D2D communication is referred to as out-of-coverage D2D communication. As a third use case, for example, an UE 10E positioned within the network coverage area and an UE 10F positioned outside of the network coverage area perform D2D communication. Such D2D communication is referred to as partial-coverage D2D communication. From the viewpoint of public safety, out-of-coverage D2D communication and partial-coverage D2D communication are also important. Also, the network coverage area refers to a coverage area of a cellular network. That is, a set of cells builds the network coverage area.

FIG. 2 is a second explanatory diagram illustrating a specific example of a use case of D2D communication. Referring to FIG. 2, an UE 10A and an UE 10B, and an eNB 20A and an eNB 20B are illustrated. In this example, the eNB 20A is operated by a first mobile network operator (MNO) and the eNB 20B is operated by a second MNO. Then, the UE 10A positioned within a first network coverage area (for example, inside a cell 21A of the eNB 20A) and the UE 10B positioned within a second network coverage area (for example, inside a cell 21B of the eNB 20B) perform D2D communication. From the viewpoint of public safety, such D2D communication is also important.

(Flow Up to D2D Communication)

For example, synchronization, discovery, and connection establishment are sequentially performed, and then D2D communication is performed. Hereinafter, considerations of steps of synchronization, discovery, and connection establishment will be described.

(a) Synchronization

When two UEs are positioned within the network coverage area, the two UEs obtain synchronization with the eNB using a downlink signal from the eNB and thus are able to be synchronized to each other to some extent.

On the other hand, when at least one of two UEs attempting to perform D2D communication is positioned outside of the network coverage area, at least one of the two UEs is necessary to transmit a synchronization signal for synchronization in D2D communication.

(b) Discovery of other UEs

Discovery of other UEs is performed by, for example, transmitting and receiving a discovery signal. More specifically, for example, one UE of the two UEs transmits the discovery signal, and the other UE of the two UEs receives the discovery signal and attempts to communicate with the one UE.

The discovery signal is preferably transmitted at a predetermined timing in a time direction. Accordingly, it is possible to restrict a timing at which the UE of a reception side attempts to receive the discovery signal. Also, as the assumption, two UEs attempting to perform D2D communication may obtain synchronization in advance before the discovery signal is received.

(c) Connection Establishment

The two UEs attempting to perform D2D communication may establish a connection, for example, as follows. First, a first UE transmits a discovery signal and a second UE receives the discovery signal. Then, the second UE transmits a request message requesting connection establishment to the first UE. Then, the first UE transmits a completion message indicating completion of connection establishment to the second UE in response to the request message.

(Synchronization Signal Transmitted by eNB)

In LTE, the eNB transmits a primary synchronization signal (PSS) and a secondary synchronization signal (SSS) as a synchronization signal. The PSS and the SSS are transmitted at a predetermined timing in a frame structure of a radio frame. Hereinafter, a specific example of timings of the PSS and the SSS in frequency division duplex (FDD) and time division duplex (TDD) will be described with reference to FIGS. 3 and 4.

FIG. 3 is an explanatory diagram illustrating exemplary timings of a PSS and an SSS in FDD. Referring to FIG. 3, 10 subframes included in the radio frame are illustrated. In FDD, in subframes (that is, a first subframe and a sixth subframe) having subframe numbers 0 and 5, the PSS and the SSS are transmitted. More specifically, the SSS is transmitted in a sixth symbol of a first slot included in each of the subframes, and the PSS is transmitted in a seventh symbol of the first slot.

FIG. 4 is an explanatory diagram illustrating exemplary timings of a PSS and an SSS in TDD. Referring to FIG. 4, 10 subframes included in the radio frame are illustrated. In TDD, in subframes (that is, a second subframe and a seventh subframe) of subframe numbers 1 and 6, the PSS is transmitted. More specifically, in a third symbol of a first slot included in each subframe, the PSS is transmitted. In addition, in TDD, in subframes (that is, a first subframe and a sixth subframe) of subframe numbers 0 and 5, the SSS is transmitted. More specifically, in a seventh symbol of a second slot included in each subframe, the SSS is transmitted.

When the PSS is detected, the UE can recognize a timing of each subframe. In addition, when the SSS is detected, the UE can recognize which subframe is a subframe #0.

Furthermore, the UE can identify a cell group to which a cell formed by the eNB that transmits the PSS belongs among three cell groups based on a sequence of the PSS. In addition, the UE can identify a cell formed by the eNB that transmits the SSS among 168 cell candidates that belong to one cell group based on a sequence of the SSS. That is, the UE can identify a cell formed by the eNB that transmits the PSS and the SSS among 504 cell candidates based on the sequence of the PSS and the sequence of the SSS.

(Synchronization Signal of D2D Communication)

For example, when the UE is positioned within the network coverage area, synchronization for D2D communication is performed based on the synchronization signal transmitted by the eNB. For example, when the UE is positioned outside of the network coverage area, synchronization for D2D communication is performed based on the synchronization signal transmitted by another UE. Also, the synchronization signal may be a relayed signal.

The synchronization signal used by a terminal device for D2D communication may have various attributes. For example, the synchronization signal may have an attribute of a transmission source. The transmission source may be the eNB or the UE. For example, the synchronization signal may have an attribute of presence or absence of relay.

When the synchronization signal is wirelessly relayed, deterioration of precision of a center frequency is concerned. Accordingly, it is preferable that the number of relays (the number of hops) be smaller.

The eNB is more preferable than the UE as the transmission source of the synchronization signal. This is because precision of an oscillator of the eNB is higher than precision of an oscillator of the UE.

(Radio Resources Available for D2D Communication)

(a) Resource Pool

As radio resources available for D2D communication, radio resources called a resource pool are prepared. As the resource pool, periodic radio resources are considered. For example, the resource pool is represented by a period and an offset (in a time direction).

As a method of using the resource pool, two methods may be provided. In the first method, a management node (for example, the eNB or the UE) allocates radio resources among the resource pool to the UE and notifies the UE of the radio resources. The UE can perform D2D communication in the allocated radio resources. In the second method, the UE selects radio resources from among the resource pool, and performs D2D communication in the radio resources. The first method is a non-contention-based method and there is no collision. On the other hand, the second method is a contention-based method, and collision may occur.

(b) Multiple Resource Pools

It is considered natural that multiple resource pools are prepared. In this case, the period and the offset of the resource pool may be different from periods and offsets of other resource pools. Also, the period of the resource pool may be the same as periods of other resource pools while the offset of the resource pool is different from offsets of the other resource pools.

Hereinafter, the radio frame and the subframe serving as a unit of time in a cellular system will be described with reference to FIG. 5. A specific example of the resource pool will be described with reference to FIG. 6.

FIG. 5 is an explanatory diagram illustrating a radio frame and subframes in a cellular system. Referring to FIG. 5, the radio frame and 10 subframes included in one radio frame are illustrated. Each radio frame is 10 ms, and each subframe is 1 ms. Each radio frame has a system frame number (SFN) of any of 0 to 1023, and 1024 radio frames are repeatedly presented.

FIG. 6 is an explanatory diagram illustrating an exemplary resource pool. Referring to FIG. 6, two resource pools (that is, a resource pool #1 and a resource pool #2) are illustrated. The radio resources available for D2D communication are considered to be periodically arranged in the subframe. For example, the resource pool #1 includes radio resources of subframes 31 that are repeated at a period 33, and the resource pool #2 includes radio resources of subframes 35 that are repeated at a period 37. For example, the period 33 is 200 ms, and the period 37 is 400 ms. Also, in this example, the resource pool #1 and the resource pool #2 have different offsets.

(c) Signal/Information Transmitted in Resource Pool

For example, in the resource pool, a synchronization signal and synchronization information (information of synchronization) are transmitted by a representative UE. In addition, the UE performs D2D communication in radio resources other than the radio resources in which the synchronization signal and the synchronization information are transmitted among the resource pool. Hereinafter, a specific example thereof will be described with reference to FIG. 7.

FIG. 7 is an explanatory diagram illustrating an example of a signal and information transmitted in a resource pool. Referring to FIG. 7, N resource pools (that is, resource pools #1 to #N) are illustrated. In each of the N resource pools, the synchronization signal and the synchronization information are transmitted. In addition, in each of the N resource pools, D2D communication may be performed in radio resources other than the radio resources in which the synchronization signal and the information are transmitted. Also, one UE may transmit the synchronization signal and the synchronization information in two or more resource pools.

<<2. Schematic Configuration of Communication System>>

Next, a schematic configuration of a communication system 1 according to an embodiment of the present disclosure will be described with reference to FIG. 8. FIG. 8 is an explanatory diagram illustrating an example of a schematic configuration of the communication system 1 according to the embodiment of the present disclosure. Referring to FIG. 8, the communication system 1 includes a base station 100, a terminal device 200 and a terminal device 300. The communication system 1 is, for example, a cellular system, and is a system compliant with, for example, LTE, LTE-Advanced, or communication standards conforming thereto.

(The Base Station 100)

The base station 100 performs radio communication with the terminal device. For example, the base station 100 performs radio communication with the terminal device 200 and the terminal device 300 which are positioned inside a cell 101 of the base station 100.

Also, the base station 100 transmits the synchronization signal. Examples of the synchronization signal include the PSS and the SSS.

(The Terminal Device 200)

The terminal device 200 performs radio communication with the base station. For example, when the terminal device 200 is positioned inside the cell 101 of the base station 100, the terminal device 200 performs radio communication with the base station 100.

The terminal device 200 performs D2D communication. For example, the terminal device 200 transmits the synchronization signal in the resource pool serving as the radio resources available for D2D communication. In addition, for example, the terminal device 200 transmits synchronization information (information of synchronization) in the resource pool.

Also, in the embodiment of the present disclosure, the terminal device 200 may operate similarly to, for example, the terminal device 300. For example, the terminal device 200 operates similarly to the terminal device 300 by switching an operation mode.

(The Terminal Device 300)

The terminal device 300 performs radio communication with the base station. For example, when the terminal device 300 is positioned inside the cell 101 of the base station 100, the terminal device 300 performs radio communication with the base station 100.

The terminal device 300 performs D2D communication. For example, the terminal device 300 performs synchronization for D2D communication based on the synchronization signal transmitted by the base station 100 or the synchronization signal transmitted by the terminal device 200 in the resource pool.

Also, in FIG. 8, only one base station (that is, the base station 100) included in the communication system 1 is illustrated. It is needless to say that the communication system 1 may include multiple base stations. Then, a set of multiple base stations builds the network coverage area (that is, a coverage area of the cellular network).

<<3. Configuration of Respective Devices>>

Exemplary configurations of the base station 100, the terminal device 200 and the terminal device 300 will be described with reference to FIGS. 9 to 11.

<3.1. Base Station Configuration>>

FIG. 9 is a block diagram illustrating an exemplary configuration of the base station 100 according to the embodiment of the present disclosure. Referring to FIG. 9, the base station 100 includes an antenna unit 110, a radio communication unit 120, a network communication unit 130, a storage unit 140 and a processing unit 150.

(The Antenna Unit 110)

The antenna unit 110 receives a radio signal and outputs the received radio signal to the radio communication unit 120. In addition, the antenna unit 110 transmits a transmission signal output by the radio communication unit 120.

(The Radio Communication Unit 120)

The radio communication unit 120 transmits and receives a signal. For example, the radio communication unit 120 transmits a downlink signal to the terminal device and receives an uplink signal from the terminal device.

(The Network Communication Unit 130)

The network communication unit 130 transmits and receives information. For example, the network communication unit 130 transmits information to other nodes and receives information from other nodes. For example, the other nodes include other base stations and a core network node.

(The Storage Unit 140)

The storage unit 140 stores a program and data for operating the base station 100.

(The Processing Unit 150)

The processing unit 150 provides various functions of the base station 100. The processing unit 150 includes an information acquisition unit 151 and a control unit 153. Also, the processing unit 150 may further include a component other than these components. That is, the processing unit 150 may also perform an operation other than operations of these components.

Also, operations of the information acquisition unit 151 and the control unit 153 will be described in each embodiment.

<3.2. First Terminal Device Configuration>>

FIG. 10 is a block diagram illustrating an exemplary configuration of the terminal device 200 according to the embodiment of the present disclosure. Referring to FIG. 10, the terminal device 200 includes an antenna unit 210, a radio communication unit 220, a storage unit 230 and a processing unit 240.

(The Antenna Unit 210)

The antenna unit 210 receives a radio signal and outputs the received radio signal to the radio communication unit 220. In addition, the antenna unit 210 transmits a transmission signal output by the radio communication unit 220.

(The Radio Communication Unit 220)

The radio communication unit 220 transmits and receives a signal. For example, the radio communication unit 220 receives a downlink signal from the base station and transmits an uplink signal to the base station. In addition, for example, the radio communication unit 220 receives a signal from another terminal device and transmits a signal to another terminal device.

(The Storage Unit 230)

The storage unit 230 stores a program and data for operating the terminal device 200.

(The Processing Unit 240)

The processing unit 240 provides various functions of the terminal device 200. The processing unit 240 includes an information acquisition unit 241 and a control unit 243. Also, the processing unit 240 may further include a component other than these components. That is, the processing unit 240 may also perform an operation other than operations of these components.

Also, operations of the information acquisition unit 241 and the control unit 243 will be described in each embodiment.

<3.3. Second Terminal Device Configuration>>

FIG. 11 is a block diagram illustrating an exemplary configuration of the terminal device 300 according to the embodiment of the present disclosure. Referring to FIG. 11, the terminal device 300 includes an antenna unit 310, a radio communication unit 320, a storage unit 330 and a processing unit 340.

(The Antenna Unit 310)

The antenna unit 310 receives a radio signal and outputs the received radio signal to the radio communication unit 320. In addition, the antenna unit 310 transmits a transmission signal output by the radio communication unit 320.

(The Radio Communication Unit 320)

The radio communication unit 320 transmits and receives a signal. For example, the radio communication unit 320 receives a downlink signal from the base station and transmits an uplink signal to the base station. In addition, for example, the radio communication unit 320 receives a signal from another terminal device and transmits a signal to another terminal device.

(The Storage Unit 330)

The storage unit 330 stores a program and data for operating the terminal device 300.

(The Processing Unit 340)

The processing unit 340 provides various functions of the terminal device 300. The processing unit 340 includes an information acquisition unit 341 and a control unit 343. Also, the processing unit 340 may further include a component other than these components. That is, the processing unit 340 may also perform an operation other than operations of these components.

Also, operations of the information acquisition unit 341 and the control unit 343 will be described in each embodiment.

<<4. First Embodiment>>

Next, the first embodiment of the present disclosure will be described with reference to FIGS. 12 to 15.

<4.1. Outline>

(Technical Problem)

For example, radio resources (a resource pool) available for D2D communication are selected by a base station in the case of in-coverage and is selected by a representative terminal device in the case of out-of-coverage.

In the case of in-coverage, the base station may notify the terminal device of the radio resources available for D2D communication. However, when the base station freely selects the radio resources available for D2D communication without constraints, the base station may use many radio resources in order to notify the radio resources available for D2D communication. As a result, from the viewpoint of the radio resources, a load on the base station may become large.

In the case of out-of-coverage, the representative terminal device may notify another terminal device of the radio resources available for D2D communication. However, since the other terminal device does not recognize radio resources that are used by the representative terminal device to notify the radio resources available for D2D communication, a trial and error search (for example, a synchronization signal and/or synchronization information is detected by trial and error) may be performed. As a result, a load on the other terminal device may become large. In addition, similar to the case of in-coverage, in the case of out-of-coverage, from the viewpoint of the radio resources, a load on the representative terminal device may become large.

Therefore, it is preferable to provide a mechanism in which a load necessary for a terminal device to recognize the radio resources available for D2D communication can be reduced.

(Technical Features)

In the first embodiment, the base station 100 and the terminal device 200 notify the terminal device of one or more resource pools serving as the radio resources available for D2D communication. The one or more resource pools are resource pools that are selected from among a resource pool set including multiple resource pools that are determined in advance as candidates for the radio resources available for D2D communication. Accordingly, it is possible to reduce a load necessary for the terminal device to recognize the radio resources available for D2D communication.

<4.2. Operation of Base Station>

First, the operation of the base station 100 will be described with reference to FIG. 12.

(Notification of Resource Pool)

The information acquisition unit 151 acquires information indicating one or more resource pools serving as the radio resources available for D2D communication. Then, the control unit 153 notifies the terminal device of the one or more resource pools. The one or more resource pools are resource pools that are selected from among a resource pool set including multiple resource pools that are determined in advance as candidates for the radio resources available for D2D communication.

Also, when it is described that "a resource pool is selected," it may mean that "a resource pool is allocated." This is not limited to the first embodiment, but is similar to other embodiments.

(a) Resource Pool Set

As described above, the one or more resource pools serving as the radio resources available for D2D communication are selected from among the resource pool set. An example of the resource pool set will be described below with reference to FIG. 12.

FIG. 12 is an explanatory diagram illustrating an exemplary resource pool set. Referring to FIG. 12, a resource pool set including N resource pools that are determined in advance as candidates for the radio resources available for D2D communication is illustrated. For example, each of the resource pools includes identification information for identifying itself and includes radio resources of at least one subframe of a periodic radio frame represented by a period and an offset. For example, a resource pool having identification information #1 includes radio resources of one subframe (a subframe having a subframe number #2) of a periodic radio frame having the SFNs 0, 20, and 40. For example, a resource pool having identification information #2 includes radio resources of one subframe (a subframe having a subframe number #2) of a periodic radio frame having SFNs 10, 50, and 90. For example, a resource pool having identification information #3 includes radio resources of two subframes (subframes having subframe numbers #2 and #3) of a periodic radio frame having SFNs 2, 12, and 22.

As an example, the resource pool set is determined for each operator (that is, a carrier) of the cellular system. Also, it is needless to say that the resource pool set may be determined in a unit other than the operator.

In addition, the resource pool set may be stored in the terminal device (for example, the terminal device 200 and the terminal device 300) in advance. Alternatively, the base station may notify the terminal device (for example, the terminal device 200 and the terminal device 300) of the resource pool set.

(b) Selection of Resource Pool

For example, the base station 100 (for example, the processing unit 150) selects one or more resource pools available for D2D communication from among the resource pool set.

(c) Specific Information

For example, each of the multiple resource pools includes identification information for identifying itself. As an example, the identification information is an identification number. This is the same as that described with reference to FIG. 12. The control unit 153 notifies the terminal device of the one or more resource pools by transmitting identification information of each of the one or more resource pools.

Referring again to FIG. 12, for example, two resource pools having identification information #1 and #2 are selected from among the resource pool set. In this case, the control unit 153 transmits these pieces of identification information (#1 and #2) and thus notifies the terminal device of the two resource pools. Also, the control unit 153 transmits the identification information through the antenna unit 110 and the radio communication unit 120.

Accordingly, for example, information indicating the period, the offset, and the subframe of the radio resources is not transmitted, but the identification information is transmitted. Therefore, it is possible to reduce radio resources necessary for notifying of the radio resources (resource pool) available for D2D communication.

(d) Notification Method

For example, the control unit 153 notifies the terminal device of the one or more resource pools by reporting system information indicating the one or more resource pools. For example, the system information is a predetermined system information block (SIB).

Accordingly, for example, not only a terminal device in a connection mode but also a terminal device in an idle mode can be notified of the one or more resource pools.

Also, the control unit 153 may notify the terminal device of the one or more resource pools using separate signaling together with reporting system information or instead of reporting system information. The separate signaling may be radio resource control (RRC) signaling. Accordingly, for example, the terminal device in a connection mode can be notified of more quickly.

As described above, the base station 100 (the control unit 153) notifies the terminal device of the one or more resource pools selected from among the resource pool set. Accordingly, it is possible to reduce a load necessary for the terminal device to recognize the radio resources available for D2D communication. Specifically, for example, since radio resources necessary for notifying of the radio resources available for D2D communication (resource pool) are reduced, a load on the base station 100 is reduced from the viewpoint of the radio resources. In addition, for example, since the terminal device may not necessarily perform a trial and error search (for example, the synchronization signal and/or the synchronization information are detected by trial and error), a load on the terminal device is reduced.

(Transmission of Synchronization Signal)

For example, the base station 100 transmits the synchronization signal. Examples of the synchronization signal include the PSS and the SSS.

<4.3. Operation of First Terminal Device>

Next, the operation of the terminal device 200 will be described.

(Notification of Resource Pool)

The information acquisition unit 241 acquires information indicating one or more resource pools serving as the radio resources available for D2D communication. Then, the control unit 243 notifies the terminal device of the one or more resource pools. The one or more resource pools are resource pools that are selected from among a resource pool set including multiple resource pools that are determined in advance as candidates for the radio resources available for D2D communication.

(a) Resource Pool Set

There is no difference between the descriptions of the resource pool set of the base station 100 and the terminal device 200. Therefore, redundant descriptions will be omitted herein.

(b) Selection of Resource Pool

For example, the terminal device 200 (for example, the processing unit 240) selects one or more resource pools available for D2D communication from among the resource pool set. For example, when the terminal device 200 is positioned outside of the network coverage area (that is, a coverage area of the cellular network), in order to perform out-of-coverage D2D communication (that is, D2D communication outside of the coverage area of the cellular network), the terminal device 200 selects the one or more resource pools and notifies the terminal device of the one or more resource pools.

Also, the base station 100 may select one or more resource pools available for D2D communication from among the resource pool set, and notify the terminal device 200 of the one or more resource pools. When the terminal device 200 is positioned within the network coverage area, in order to perform partial-coverage or out-of-coverage D2D communication, the terminal device (for example, it is positioned outside of the network coverage area) may be notified of the one or more resource pools of which the base station 100 notifies the terminal device 200.

(c) Specific Information

For example, each of the multiple resource pools includes identification information for identifying itself. The control unit 243 notifies the terminal device of the one or more resource pools by transmitting identification information of each of the one or more resource pools. There is no difference between the descriptions of the base station 100 and the terminal device 200 except for different reference numerals. Therefore, redundant descriptions will be omitted herein.

(d) Notification Method (d-1) Notification in One or More Resource Pools

For example, the control unit 243 notifies the terminal device of the one or more resource pools in each of the one or more resource pools. For example, information indicating the one or more resource pools is included in synchronization information (information of synchronization) transmitted in each of the one or more resource pools.

Referring again to FIG. 12, as an example, three resource pools having identification information #1, #2, and #N are selected as the resource pool available for D2D communication. In this case, the control unit 243 notifies the terminal device of the three resource pools in each of the three resource pools.

Accordingly, for example, another terminal device may not search for (for example, detecting the synchronization signal and/or synchronization information) all radio resources, but search for (for example, detecting the synchronization signal and/or synchronization information) the resource pool included in the resource pool set. In addition, when one resource pool can be found among the one or more resource pools, information indicating the one or more resource pools is acquired. Therefore, a load on the terminal device may be reduced.

(d-2) Notification in Predetermined Resource Pool

Also, the control unit 243 may notify the terminal device of the one or more resource pools in a predetermined resource pool included in the resource pool set. The information indicating the one or more resource pools may also be included in synchronization information that is transmitted in the predetermined resource pool. Also, the one or more resource pools may include the predetermined resource pool or may not include the predetermined resource pool.

Referring again to FIG. 12, a resource pool having identification information #1 may be determined in advance as a default resource pool. Then, the control unit 243 may notify the terminal device of the one or more resource pools in the default resource pool (that is, the resource pool having identification information #1).

As an example, the predetermined resource pool is determined for each operator (that is, a carrier) of the cellular system. Also, it is needless to say that the predetermined resource pool may be determined in a unit other than the operator.

In addition, the predetermined resource pool may be stored in the terminal device (for example, the terminal device 200 and the terminal device 300) in advance. Alternatively, the base station may notify the terminal device (for example, the terminal device 200 and the terminal device 300) of the predetermined resource pool.

As described above, the terminal device may be notified of the one or more resource pools in the predetermined resource pool. Accordingly, for example, the terminal device may not perform a trial and error search (for example, detection of the synchronization signal and/or synchronization information). Therefore, a load on the terminal device may be reduced.

Also, it is needless to say that the control unit 243 may notify the terminal device of the one or more resource pools in a resource pool other than the predetermined resource pool. For example, the control unit 243 may notify the terminal device of the one or more resource pools in each of the one or more resource pools.

(Transmission of Synchronization Signal)

For example, the terminal device 200 transmits the synchronization signal in each of the one or more resource pools.

For example, the control unit 243 controls transmission of the synchronization signal in each of the one or more resource pools. More specifically, for example, the control unit 243 maps the synchronization signal to predetermined radio resources of each of the one or more resource pools. Accordingly, for example, the terminal device can be synchronized for D2D communication.

<4.4. Operation of Second Terminal Device>

Next, the operation of the terminal device 300 will be described.

The information acquisition unit 341 acquires information indicating one or more resource pools serving as the radio resources available for D2D communication. Then, the control unit 343 controls D2D communication by the terminal device 300 in at least one resource pool among the one or more resource pools. The one or more resource pools are resource pools that are selected from among a resource pool set including multiple resource pools that are determined in advance as candidates for the radio resources available for D2D communication.

(One or More Resource Pools)

For example, the one or more resource pools are resource pools of which the base station 100 or the terminal device 200 notifies the terminal device 300.

(Acquisition of Information)

(a) When Notification is Performed by the Base Station

For example, the base station 100 notifies the terminal device 300 of the one or more resource pools.

For example, the base station 100 reporting system information indicating the one or more resource pools. In this case, the information acquisition unit 341 acquires the information indicating the one or more resource pools from the system information received by the terminal device 300.

Also, the base station 100 may notify the terminal device 300 of the one or more resource pools using separate signaling. In this case, the information acquisition unit 341 may acquire the information indicating the one or more resource pools from a message transmitted by the separate signaling. Also, the separate signaling may be RRC signaling.

(b) When Notification is Performed by the Terminal Device

For example, the terminal device 200 notifies the terminal device 300 of the one or more resource pools.

(b-1) Notification in One or More Resource Pools.

For example, the terminal device 200 notifies the terminal device 300 of the one or more resource pools in each of the one or more resource pools. In this case, for example, the information acquisition unit 341 acquires the information indicating the one or more resource pools from information received by the terminal device 300 in the resource pool in which the synchronization signal is detected by the terminal device 300 and that is included in the resource pool set.

More specifically, for example, referring again to FIG. 12, the terminal device 300 sequentially selects resource pools from N resource pools included in the resource pool set. Detection of the synchronization signal is attempted in the selected resource pool. Then, the terminal device 300 acquires the information indicating the one or more resource pools in the resource pool in which the synchronization signal is detected.

(b-2) Notification in Predetermined Resource Pool

The terminal device 200 may notify the terminal device 300 of the one or more resource pools in a predetermined resource pool included in the resource pool set. In this case, the information acquisition unit 341 may acquire the information indicating the one or more resource pools from information received by the terminal device 300 in the predetermined resource pool.

(Transmission and Reception of Signal)

For example, the terminal device 300 performs D2D communication in at least one resource pool among the one or more resource pools. In this case, the control unit 343 performs a transmission process for transmitting a signal of D2D communication in the at least one resource pool or a reception process for receiving a signal of D2D communication in the at least one resource pool.

<4.5. Process Flow>

Next, an exemplary process according to the first embodiment will be described with reference to FIGS. 13 to 15.

(First Process)

FIG. 13 is a sequence diagram schematically illustrating an exemplary flow of a first process according to the first embodiment.

The base station 100 selects one or more resource pools serving as the radio resources available for D2D communication from among the resource pool set (S401).

Then, the base station 100 acquires information indicating the one or more resource pools, and generates system information indicating the one or more resource pools (S403). Then, the base station 100 reports the system information (S405).

The terminal device 300 acquires the information indicating the one or more resource pools from the system information and performs D2D communication in at least one resource pool among the one or more resource pools (S407).

Also, not only the terminal device 300 but also the terminal device 200 may acquire the information indicating the one or more resource pools from the system information. In addition, the base station 100 may notify the terminal device 300 (and the terminal device 200) of the one or more resource pools using separate signaling together with reporting the system information or instead of reporting the system information. The separate signaling may be, for example, RRC signaling.

(Second Process)

(a) First Example

FIG. 14 is a sequence diagram schematically illustrating a first example of a flow of a second process according to the first embodiment.

The terminal device 200 selects one or more resource pools serving as the radio resources available for D2D communication from among the resource pool set (S411).

Then, the terminal device 200 notifies the terminal device of the one or more resource pools in each of the one or more resource pools (S413). For example, the terminal device 200 transmits resource pool information indicating the one or more resource pools.

The terminal device 300 acquires the resource pool information indicating the one or more resource pools from information received by the terminal device 300 in the resource pool in which the synchronization signal is detected and that is included in the resource pool set (S415). Then, the terminal device 300 performs D2D communication in at least one resource pool among the one or more resource pools (S417).

(b) Second Example

FIG. 15 is a sequence diagram schematically illustrating a second example of a flow of a second process according to the first embodiment.

The terminal device 200 selects one or more resource pools serving as the radio resources available for D2D communication from among the resource pool set (S421).

Then, the terminal device 200 notifies the terminal device of the one or more resource pools in at least a predetermined resource pool included in the resource pool set (S423). For example, the terminal device 200 transmits the resource pool information indicating the one or more resource pools.

The terminal device 300 acquires the resource pool information indicating the one or more resource pools from information received by the terminal device 300 in the predetermined resource pool (S425). Then, the terminal device 300 performs D2D communication in at least one resource pool among the one or more resource pools (S427).

Also, it is needless to say that the terminal device 200 may notify the terminal device of the one or more resource pools in a resource pool other than the predetermined resource pool. For example, the terminal device 200 may notify the terminal device of the one or more resource pools in each of the one or more resource pools.

<<5. Second Embodiment>>

Next, the second embodiment of the present disclosure will be described with reference to FIG. 16.

<5.1. Outline>

(Technical Problem)

There is no difference between the descriptions of the technical problems of the first embodiment and the second embodiment. Therefore, redundant descriptions will be omitted herein.

(Technical Features)

In the second embodiment, the terminal device 200 notifies the terminal device of one or more resource pools serving as the radio resources available for D2D communication in the predetermined resource pool. Accordingly, it is possible to reduce a load necessary for the terminal device to recognize the radio resources available for D2D communication.

<5.2. Operation of First Terminal Device>

First, the operation of the terminal device 200 will be described.

(Notification of Resource Pool)

The information acquisition unit 241 acquires information indicating one or more resource pools serving as the radio resources available for D2D communication. Then, the control unit 243 notifies the terminal device of the one or more resource pools in the predetermined resource pool. For example, the information indicating the one or more resource pools is included in synchronization information transmitted in the predetermined resource pool. Also, the one or more resource pools may include the predetermined resource pool or may not include the predetermined resource pool.

Referring again to FIG. 12, as an example, a resource pool having identification information #1 is determined in advance as a default resource pool. Then, the control unit 243 notifies the terminal device of the one or more resource pools in the default resource pool (that is, the resource pool having identification information #1).

As an example, the predetermined resource pool is determined for each operator (that is, a carrier) of the cellular system. Also, it is needless to say that the predetermined resource pool may be determined in a unit other than the operator.

In addition, the predetermined resource pool may be stored in the terminal device (for example, the terminal device 200 and the terminal device 300) in advance. Alternatively, the base station may notify the terminal device (for example, the terminal device 200 and the terminal device 300) of the predetermined resource pool.

As described above, the terminal device is to be notified of the one or more resource pools in the predetermined resource pool. Accordingly, for example, the terminal device may not perform a trial and error search (for example, detection of the synchronization signal and/or synchronization information). Therefore, a load on the terminal device may be reduced.

(Transmission of Synchronization Signal)

For example, the terminal device 200 transmits the synchronization signal in each of the one or more resource pools.

For example, the control unit 243 controls transmission of the synchronization signal in each of the one or more resource pools. More specifically, for example, the control unit 243 maps the synchronization signal to predetermined radio resources of each of the one or more resource pools. Accordingly, for example, the terminal device can be synchronized for D2D communication.

<5.4. Operation of Second Terminal Device>

Next, the operation of the terminal device 300 will be described.

The information acquisition unit 341 acquires information indicating one or more resource pools serving as the radio resources available for D2D communication from information received by the terminal device 300 in the predetermined resource pool. Then, the control unit 343 controls D2D communication by the terminal device 300 in at least one resource pool among the one or more resource pools.

(One or More Resource Pools)

For example, the one or more resource pools are resource pools of which the terminal device 200 notifies the terminal device 300.

The terminal device 300 performs D2D communication in at least one resource pool among the one or more resource pools. In this case, the control unit 343 maps a signal of D2D communication to radio resources of the at least one resource pool.

(Transmission and Reception of Signal)

For example, the terminal device 300 performs D2D communication in at least one resource pool among the one or more resource pools. In this case, the control unit 343 performs a transmission process for transmitting a signal of D2D communication in the at least one resource pool or a reception process for receiving a signal of D2D communication in the at least one resource pool.

<5.4. Process Flow>

Next, an exemplary process according to the second embodiment will be described with reference to FIG. 16. FIG. 16 is a sequence diagram schematically illustrating an exemplary flow of a process according to the second embodiment.

The terminal device 200 selects one or more resource pools serving as the radio resources available for D2D communication (S431).

Then, the terminal device 200 notifies the terminal device of the one or more resource pools in at least a predetermined resource pool (S433). For example, the terminal device 200 transmits the resource pool information indicating the one or more resource pools.

The terminal device 300 acquires the resource pool information indicating the one or more resource pools from information received by the terminal device 300 in the predetermined resource pool (S435). Then, the terminal device 300 performs D2D communication in at least one resource pool among the one or more resource pools (S437).

Also, it is needless to say that the terminal device 200 may notify the terminal device of the one or more resource pools in a resource pool other than the predetermined resource pool. For example, the terminal device 200 may notify the terminal device of the one or more resource pools in each of the one or more resource pools.

<<6. Third Embodiment>>

Next, the third embodiment of the present disclosure will be described with reference to FIGS. 17 to 19.

<6.1. Outline>

(Technical Problem)

One or more resource pools serving as the radio resources available for D2D communication may be changed as necessary. As an example, a new resource pool may be added to the one or more resource pools. As another example, the resource pool included in the one or more resource pools may be deleted. As still another example, when D2D communication is performed in a specific application in the resource pool, the specific application may be changed. In order to avoid collision, it is preferable that the terminal device be appropriately notified of this change in the resource pool.

For example, in the case of in-coverage, the base station may notify the terminal device of the change in the resource pool in system information. However, since an update frequency of the system information is very low, it is difficult to notify the change quickly.

On the other hand, in the case of out-of-coverage, the representative terminal device may notify of the change in the resource pool. However, when the change is notified of in all resource pools, a great amount of the radio resources may be used. On the other hand, when the change is notified of in an arbitrarily selected resource pool, only the terminal device configured to perform D2D communication in the arbitrarily selected resource pool can recognize the change.

Therefore, it is preferable to provide a mechanism in which the terminal device can be appropriately notified of the change in the resource pool.

(Technical Features)

In the third embodiment, the terminal device 200 notifies the terminal device of the change in the resource pool in a primary resource pool among one or more resource pools serving as the radio resources available for D2D communication. Accordingly, for example, the terminal device can be appropriately notified of the change in the resource pool.

<6.2. Operation of First Terminal Device>

First, the operation of the terminal device 200 will be described.

(Notification of Change in Resource Pool)

The information acquisition unit 241 acquires information indicating the change in the resource pool serving as the radio resources available for D2D communication. Then, the control unit 243 notifies the terminal device of the change in the primary resource pool among one or more resource pools serving as the radio resources available for D2D communication.

(a) Primary Resource Pool

The primary resource pool is one special resource pool among the one or more resource pools. As an example, referring again to FIG. 7, a resource pool #1 among N resource pools is the primary resource pool.

(a-1) Out-of-coverage

For example, when the terminal device 200 is positioned outside of the network coverage area (that is, a coverage area of the cellular network), the information acquisition unit 241 acquires the information indicating the change. The control unit 243 notifies the terminal device of the change. In this case, for example, the one or more resource pools are resource pools selected by the terminal device 200, and the primary resource pool is a resource pool unique to the terminal device 200. For example, the terminal device 200 (for example, the processing unit 240) selects the primary resource pool from the one or more resource pools.

(a-2) In-coverage

Even when the terminal device 200 is positioned within the network coverage area, the information acquisition unit 241 acquires the information indicating the change, and the control unit 243 may notify the terminal device of the change. In this case, the one or more resource pools may be a resource pool selected by the base station 100, and the primary resource pool may be a resource pool unique to the base station 100. For example, the base station 100 may select the primary resource pool from the one or more resource pools, and may notify the terminal device 200 of the one or more resource pools and the primary resource pool.

(b) Change in Resource Pool

The change includes deleting the resource pool, adding the resource pool, changing the primary resource pool, or changing an application of D2D communication performed in the resource pool.

The application includes an urgent application, a non-urgent application, an application for public safety (for example, fire notification and/or collision avoidance), an application other than one for public safety, an out-of-coverage application, or an in-coverage application. As an example, the change is a change of the application of D2D communication that is performed in the resource pool between the in-coverage application and the out-of-coverage application. As another example, the change is a change of the application of D2D communication that is performed in the resource pool between fire notification and collision avoidance.

For example, as described above, the primary resource pool is a resource pool unique to the terminal device 200. In this case, the terminal device 200 determines the change. Also, as described above, the primary resource pool may be a resource pool unique to the base station 100. In this case, the base station 100 may determine the change.

(Notification of Primary Resource Pool)

For example, the control unit 243 notifies the terminal device of the primary resource pool.

For example, the control unit 243 notifies the terminal device of the primary resource pool in at least one resource pool among the one or more resource pools. As an example, the control unit 243 notifies the terminal device of the primary resource pool in each of the one or more resource pools. Alternatively, the control unit 243 may notify the terminal device of the primary resource pool in a predetermined resource pool (for example, a default resource pool having identification information #1 illustrated in FIG. 11).

For example, information indicating the primary resource pool is included in the synchronization information transmitted in the resource pool.

For example, when the terminal device 200 is positioned outside of the network coverage area, the control unit 243 notifies the terminal device of the primary resource pool. Also, even when the terminal device 200 is positioned within the network coverage area (especially, inside the cell 101 of the base station 100), the control unit 243 may notify the terminal device of the primary resource pool. In this case, the base station 100 may notify the terminal device 200 of the primary resource pool.

(Notification of Resource Pool)

For example, the control unit 243 notifies the terminal device of the one or more resource pools.

For example, similar to the first embodiment or the second embodiment of the present disclosure, the control unit 243 may notify the terminal device of the one or more resource pools.

For example, when the terminal device 200 is positioned outside of the network coverage area, the control unit 243 notifies the terminal device of the one or more resource pool. Also, even when the terminal device 200 is positioned within the network coverage area (especially, inside the cell 101 of the base station 100), the control unit 243 may notify the terminal device of the one or more resource pool. In this case, the base station 100 may notify the terminal device 200 of the one or more resource pool.

As described above, the control unit 243 notifies the terminal device of the change in the resource pool in the primary resource pool among one or more resource pools serving as the radio resources available for D2D communication. Accordingly, for example, the terminal device can be appropriately notified of the change in the resource pool. For example, when the terminal device 300 awaits notification of the change in the resource pool in the primary resource pool, it is possible to recognize the change reliably. In addition, radio resources necessary for notifying of the change may be reduced.

<6.3. Operation of Second Terminal Device>

Next, the operation of the terminal device 300 will be described.

The information acquisition unit 341 acquires the information indicating the change in the resource pool serving as the radio resources available for D2D communication. Then, the control unit 343 controls D2D communication by the terminal device 300 in at least one resource pool in accordance with the change.

(Acquisition of Information Indicating Change in Resource Pool)

(a) Acquisition from Information Transmitted by the Terminal Device

For example, the information acquisition unit 341 acquires the information indicating the change from information received by the terminal device 300 in the primary resource pool among one or more resource pools serving as the radio resources available for D2D communication.

(b) Acquisition from Information Transmitted by the Base Station

Also, when the terminal device 300 is positioned within the network coverage area (especially, within the cell 101 of the base station 100), the information acquisition unit 341 acquires the information indicating the change from the system information reported by the base station 100 or a message transmitted by the base station 100 to the terminal device 300 using separate signaling. The separate signaling may be, for example, RRC signaling.

(One or More Resource Pools)

For example, the one or more resource pools are resource pools of which the base station 100 or the terminal device 200 notifies the terminal device 300.

(Primary Resource Pool)

For example, the primary resource pool is a resource pool of which the base station 100 or the terminal device 200 notifies the terminal device 300.

(D2D Communication according to Change)

(a) Exemplary D2D Communication according to Change

When the change indicates adding of the resource pool, for example, the control unit 343 controls D2D communication by the terminal device 300 such that the terminal device 300 performs D2D communication in the added resource pool.

When the change indicates deleting of the resource pool, for example, the control unit 343 controls D2D communication by the terminal device 300 such that the terminal device 300 performs no D2D communication in the deleted resource pool.

When the change indicates changing of the primary resource pool, for example, the control unit 343 controls D2D communication by the terminal device 300 such that the terminal device 300 (the information acquisition unit 341) acquires information indicating the change in the resource pool from information received in the changed primary resource pool.

When the change indicates changing of the application of D2D communication performed in the resource pool, for example, the control unit 343 controls D2D communication by the terminal device 300 such that the terminal device 300 performs D2D communication in the changed application without performing D2D communication in the application before the change in the resource pool to be changed.

(b) Exemplary Process

As a specific process, for example, the control unit 343 changes an operation parameter of D2D communication in accordance with the change in the resource pool.

<6.4. Operation of Base Station>

Next, the operation of the base station 100 will be described.

(Notification of Change in Resource Pool)

The information acquisition unit 151 acquires information indicating the change in the resource pool serving as the radio resources available for D2D communication. The control unit 153 notifies the terminal device of the change by at least one of reporting of the system information indicating the change and separate signaling.

(a) Primary Resource Pool

The primary resource pool is one special resource pool among the one or more resource pools.

For example, the one or more resource pools are resource pools selected by the base station 100 (for example, the processing unit 150), and the primary resource pool is a resource pool unique to the base station 100. For example, the base station 100 (for example, the processing unit 150) selects the primary resource pool from the one or more resource pools.

(b) Change in Resource Pool

There is no difference between the descriptions of the change in the resource pool of the terminal device 200 and the base station 100. Therefore, redundant descriptions will be omitted herein.

(Notification of Resource Pool)

For example, the control unit 153 notifies the terminal device of the one or more resource pools. Specifically, for example, the control unit 153 notifies the terminal device of the one or more resource pools by at least one of reporting of the system information indicating the one or more resource pools and separate signaling. The separate signaling may be, for example, RRC signaling.

<6.5. Process Flow>

Next, an exemplary process according to the third embodiment will be described with reference to FIGS. 17 to 19.

(First Process)

FIG. 17 is a sequence diagram schematically illustrating an exemplary flow of a first process according to the third embodiment.

The terminal device 200 notifies the terminal device of one or more resource pools serving as the radio resources available for D2D communication and the primary resource pool among the one or more resource pools (S441). For example, the terminal device 200 transmits the resource pool information indicating the one or more resource pools and primary resource pool information indicating the primary resource pool.

The terminal device 300 performs D2D communication in at least one resource pool among the one or more resource pools (S442).

The terminal device 200 determines the change in the resource pool (S443), and notifies the terminal device of the change in the primary resource pool (S444). For example, the terminal device 200 transmits the resource pool change information indicating the change in the primary resource pool.

The terminal device 300 acquires the information indicating the change from information received by the terminal device 300 in the primary resource pool (S445). Then, the terminal device 300 performs D2D communication in at least one resource pool in accordance with the change (S446).

(Second Process)

FIG. 18 is a sequence diagram schematically illustrating an exemplary flow of a second process according to the third embodiment.

The base station 100 reports the system information indicating one or more resource pools serving as the radio resources available for D2D communication and the primary resource pool among the one or more resource pools (S451).

The terminal device 300 performs D2D communication in at least one resource pool among the one or more resource pools (S453).

The base station 100 determines the change in the resource pool (S455), and reports the system information indicating the change (S457).

The terminal device 300 performs D2D communication in at least one resource pool in accordance with the change (S459).

(Third Process)

FIG. 19 is a sequence diagram schematically illustrating an exemplary flow of a third process according to the third embodiment.

The base station 100 reports the system information indicating one or more resource pools serving as the radio resources available for D2D communication and the primary resource pool among the one or more resource pools (S461).

The terminal device 300 performs D2D communication in at least one resource pool among the one or more resource pools (S462).

The base station 100 determines the change in the resource pool (S463), and notifies the terminal device 200 of the change using separate signaling (S464). For example, the base station 100 transmits resource pool change information indicating the change to the terminal device 200.

The terminal device 200 notifies the terminal device of the change in the primary resource pool (S465). For example, the terminal device 200 transmits the resource pool change information indicating the change in the primary resource pool.

The terminal device 300 acquires the information indicating the change from information received by the terminal device 300 in the primary resource pool (S466). Then, the terminal device 300 performs D2D communication in at least one resource pool in accordance with the change (S467).

<<7. Fourth Embodiment>>

Next, the fourth embodiment of the present disclosure will be described with reference to FIG. 20.

<7.1. Outline>

(Technical Problem)

For example, it is preferable that a resource pool serving as the radio resources available for in-coverage D2D communication (that is, D2D communication within the network coverage area) and a resource pool serving as the radio resources available for out-of-coverage D2D communication (that is, D2D communication outside of the network coverage area) be separately prepared. As the first reason, the synchronization signal for in-coverage D2D communication and the synchronization signal for out-of-coverage D2D communication have different transmission sources. As the second reason, interference with radio communication from in-coverage D2D communication to the base station and interference with radio communication from out-of-coverage D2D communication to the base station are completely different.

However, it may be difficult to clearly determine whether the terminal device is positioned within the network coverage area or positioned outside of the network coverage area. Therefore, for example, when the terminal device transmits a signal in an out-of-coverage resource pool or an in-coverage resource pool, a failure may occur. As a result, other terminal devices may not receive the signal.

Therefore, it is preferable to provide a mechanism in which other terminal devices can receive a signal of D2D communication more reliably.

(Technical Features)

In the fourth embodiment, when received power of the terminal device of the signal transmitted by the base station is less than first power and is greater than second power which is less than the first power, the terminal device (the terminal device 200 or the terminal device 300) transmits a signal of D2D communication in both of the in-coverage resource pool and the out-of-coverage resource pool. Accordingly, for example, other terminal devices can receive a signal of D2D communication more reliably.

<7.2. Operation of Base Station>

First, the operation of the base station 100 will be described.

The information acquisition unit 151 acquires information indicating the in-coverage resource pool serving as the radio resources available for D2D communication within the network coverage area and the out-of-coverage resource pool serving as the radio resources available for D2D communication outside of the network coverage area. Then, the control unit 153 notifies the terminal device of the in-coverage resource pool and the out-of-coverage resource pool.

(In-coverage Resource Pool and Out-of-coverage Resource Pool)

For example, the base station 100 (for example, the processing unit 150) selects the in-coverage resource pool and the out-of-coverage resource pool.

(Notification Method)

For example, the control unit 153 notifies the terminal device of the in-coverage resource pool and the out-of-coverage resource pool by reporting the system information indicating the in-coverage resource pool and the out-of-coverage resource pool.

Also, the control unit 153 may notify the terminal device of the in-coverage resource pool and the out-of-coverage resource pool using separate signaling. The separate signaling may be RRC signaling.

<7.3. Operation of First Terminal Device>

Next, the operation of the terminal device 200 will be described.

The information acquisition unit 241 acquires information indicating the in-coverage resource pool and the out-of-coverage resource pool.

(First Case)

For example, received power of the terminal device 200 of the signal transmitted by the base station is less than first power and is greater than second power which is less than the first power. In this case, the control unit 243 controls D2D communication by the terminal device 200 such that the terminal device 200 transmits a signal of D2D communication in both of the in-coverage resource pool and the out-of-coverage resource pool.

Accordingly, for example, other terminal devices can receive a signal of D2D communication more reliably. That is, even when it is difficult to determine whether the terminal device 200 is positioned within the network coverage area or is positioned outside of the network coverage area, other terminal devices can receive a signal transmitted by the terminal device 200. That is, other terminal devices configured to perform D2D communication in the out-of-coverage resource pool and other terminal devices configured to perform D2D communication in the in-coverage resource pool can receive a signal.

Also, since the first power and the second power are provided, an effect (that is, a ping-pong effect) in which transmission of a signal in the out-of-coverage resource pool and transmission of a signal in the in-coverage resource pool are switched in a short time due to a variation of the received power may be avoided.

Furthermore, for example, the control unit 243 controls D2D communication by the terminal device 200 such that the terminal device 200 transmits a signal of the same information in both of the in-coverage resource pool and the out-of-coverage resource pool. Accordingly, for example, other terminal devices can acquire the same information regardless of out-of-coverage and in-coverage.

(Second Case)

For example, when the received power is greater than the first power, the control unit 243 controls D2D communication by the terminal device 200 such that the terminal device 200 transmits a signal of D2D communication in the in-coverage resource pool.

Also, when the received power is equal to the first power, the control unit 243 may control D2D communication by the terminal device 200 such that the terminal device 200 transmits a signal of D2D communication in the in-coverage resource pool. Alternatively, when the received power is equal to the first power, the control unit 243 may control D2D communication by the terminal device 200 such that the terminal device 200 transmits a signal of D2D communication in both of the in-coverage resource pool and the out-of-coverage resource pool.

(Third Case)

For example, when the received power is less than the second power, the control unit 243 controls D2D communication by the terminal device 200 such that the terminal device 200 transmits a signal of D2D communication in the out-of-coverage resource pool.

Also, when the received power is equal to the second power, the control unit 243 may control D2D communication by the terminal device 200 such that the terminal device 200 transmits a signal of D2D communication in the out-of-coverage resource pool. Alternatively, when the received power is equal to the second power, the control unit 243 may control D2D communication by the terminal device 200 such that the terminal device 200 transmits a signal of D2D communication in both of the in-coverage resource pool and the out-of-coverage resource pool.

(Received Power)

For example, the signal transmitted by the base station is a reference signal. As an example, the signal transmitted by the base station is a cell-specific reference signal (CRS). In addition, as an example, the received power is reference signal received power (RSRP).

For example, when multiple base stations of the cellular network are provided in vicinity of the terminal device 200, multiple levels of received power (for example, multiple levels of RSRP) are measured. In this case, the received power is, for example, the highest received power among multiple levels of received power.

Also, the signal may be a signal transmitted by the base station 100 or a signal transmitted by another base station.

(Specific Process)

For example, the control unit 243 performs a transmission process for transmitting a signal of D2D communication in the in-coverage resource pool. In addition, the control unit 343 performs a transmission process for transmitting a signal of D2D communication in the out-of-coverage resource pool.

<7.4. Operation of Second Terminal Device>

Description of the operation of the terminal device 300 is the same as description of the operation of the terminal device 200 except for different reference numerals. Therefore, redundant descriptions will be omitted herein.

<7.5. Process Flow>

Next, an exemplary process according to the fourth embodiment will be described with reference to FIG. 20. FIG. 20 is a flowchart schematically illustrating an exemplary flow of a process according to the fourth embodiment. The process is a process performed by the terminal device 200.

The terminal device 200 (for example, the processing unit 240) measures received power of the signal transmitted by the base station (S471).

When the received power is greater than X dB (YES in S473), the terminal device 200 transmits a signal of D2D communication in the in-coverage resource pool (S474). Then, the process returns to step S471.

When the received power is equal to or less than X dB (NO in S473) and the received power is greater than Y dB (YES in S475), the terminal device 200 transmits a signal of D2D communication in both of the in-coverage resource pool and the out-of-coverage resource pool (S476). Then, the process returns to step S471.

When the received power is equal to or less than Y dB (NO in S475), the terminal device 200 transmits a signal of D2D communication in the out-of-coverage resource pool (S478). Then, the process returns to step S471.

Also, the process may be similarly executed in the terminal device 300.

<<8. Fifth Embodiment>>

Next, the fifth embodiment of the present disclosure will be described with reference to FIGS. 21 to 24.

<8.1. Outline>

(Technical Problem)

For example, multiple resource pools serving as the radio resources available for D2D communication may be prepared for D2D communication.

When multiple terminal devices that are not synchronized use the same resource pool, not only may a signal receivable by the terminal device be transmitted but a signal unreceivable by the terminal device may also be transmitted in the same resource pool. Therefore, the synchronized terminal device preferably performs D2D communication in one resource.

For example, the terminal device is synchronized based on the synchronization signal transmitted by the base station for in-coverage D2D communication, and is synchronized based on the synchronization signal transmitted by the representative terminal device for out-of-coverage D2D communication.

For example, multiple resource pools are prepared for the terminal device synchronized by the synchronization signal transmitted by the base station. In addition, for example, multiple resource pools may be prepared for the terminal device synchronized by the synchronization signal transmitted by the representative terminal device. In this case, synchronized multiple terminal devices may perform D2D communication in multiple resource pools.

However, when D2D communication is performed in, for example, multiple resource pools, the terminal device is synchronized based on the synchronization signal transmitted in each of the multiple resource pools. Therefore, for example, when the number of resource pools increases, a load on the synchronization process increases.

Therefore, it is preferable to provide a mechanism in which a load on the synchronization process in the terminal device configured to perform D2D communication can be reduced.

(Technical Features)

In the fifth embodiment, the base station 100 and the terminal device 200 notify the terminal device of the resource pool group that is used by the synchronized terminal device and is the resource pool group including one or more resource pools serving as the radio resources available for D2D communication. Accordingly, for example, it is possible to reduce a load on the synchronization process in the terminal device configured to perform D2D communication.

<8.2. Operation of Base Station>

First, the operation of the base station 100 will be described with reference to FIG. 21.

The information acquisition unit 151 acquires information indicating the resource pool group that is used by the synchronized terminal device and that is the resource pool group including one or more resource pools serving as the radio resources available for D2D communication. Then, the control unit 153 notifies the terminal device of the resource pool group.

(Synchronized Terminal Device)

(a) The Same Transmission Source

For example, the synchronized terminal device includes a terminal device that is synchronized based on the synchronization signal transmitted by one transmission source.

As a first example, the synchronized terminal device includes a terminal device that is synchronized based on the synchronization signal transmitted by the base station 100.

As a second example, the synchronized terminal device includes a terminal device that is synchronized based on the synchronization signal transmitted by the terminal device 200.

(b) Other Transmission Sources

The synchronized terminal device may further include a terminal device that is synchronized based on the synchronization signal transmitted by other transmission sources that are synchronized with the one transmission source. More specifically, the other transmission sources may also include a transmission source configured to relay the synchronization signal transmitted by the one transmission source.

As a first example, the synchronized terminal device may also include a terminal device that is synchronized based on the synchronization signal transmitted by the base station 100 and a terminal device that is synchronized based on the synchronization signal transmitted by a device (for example, the terminal device 200 or a relay station) that relays the synchronization signal.

As a second example, the synchronized terminal device may also include a terminal device that is synchronized based on the synchronization signal transmitted by the terminal device 200 and a terminal device that is synchronized based on the synchronization signal transmitted by a device (for example, the terminal device 200) that relays the synchronization signal.

Accordingly, for example, a greater number of terminal devices may use the same resource pool.

(Resource Pool Group)

For example, the resource pool group includes two or more resource pools serving as the radio resources available for D2D communication. Also, the resource pool group may include only one resource pool.

For example, the control unit 153 notifies the terminal device of multiple resource pools group. An exemplary resource pool group will be described below with reference to FIG. 21.

FIG. 21 is an explanatory diagram illustrating a first example of the resource pool group. For example, resource pools #1, #4, and #N are included in a resource pool group #1. For example, the resource pool group #1 is used by a terminal device that is synchronized based on the synchronization signal transmitted by a certain terminal device 200. In addition, for example, resource pools #2 and #3 are included in a resource pool group #2. For example, the resource pool group #2 is used by a terminal device that is synchronized based on the synchronization signal transmitted by the base station 100. In addition, a resource pool #5 is included in a resource pool group #3. For example, the resource pool group #3 is used by a terminal device that is synchronized based on the synchronization signal transmitted by another terminal device 200.

(Transmission Information)

As an example, the control unit 153 notifies the terminal device of the resource pool group by transmission of information (for example, information as illustrated in FIG. 21) indicating the resource pool group to which resource pools belong.

(Notification Method)

For example, the control unit 153 notifies the terminal device of the resource pool group by reporting the system information indicating the resource pool group. Accordingly, for example, not only the terminal device in a connection mode but also the terminal device in an idle mode can recognize the resource pool group.

Also, the control unit 153 may notify the terminal device of the resource pool group using separate signaling. The separate signaling may be RRC signaling.

As described above, the base station 100 (the control unit 153) notifies the terminal device of the resource pool group. Accordingly, for example, the terminal device can reduce a load on the synchronization process. Specifically, for example, the terminal device can omit synchronization based on the synchronization signal transmitted in the resource pool group included in the resource pool group. As an example, the terminal device already uses the resource pool #1 illustrated in FIG. 21. In this case, when the terminal device uses synchronization in the resource pool #1 as synchronization in the resource pools #4 and #N, it is possible to omit synchronization based on the synchronization signal transmitted in resource pools #4 and #N. As another example, the terminal device already uses the resource pool #2 illustrated in FIG. 21. In this case, when the terminal device uses synchronization in the resource pool #2 as synchronization in the resource pool #3, it is possible to omit synchronization based on the synchronization signal transmitted in the resource pool #3.

<8.3. Operation of First Terminal Device>

Next, the operation of the terminal device 200 will be described with reference to FIG. 22.

The information acquisition unit 241 acquires information indicating the resource pool group that is used by the synchronized terminal device and that is the resource pool group including one or more resource pools serving as the radio resources available for D2D communication. Then, the control unit 243 notifies the terminal device of the resource pool group.

(Synchronized Terminal Device)

(a) The Same Transmission Source

For example, the synchronized terminal device includes a terminal device that is synchronized based on the synchronization signal transmitted by one transmission source.

For example, the synchronized terminal device includes a terminal device that is synchronized based on the synchronization signal transmitted by the terminal device 200.

(b) Other Transmission Sources

The synchronized terminal device may further include a terminal device that is synchronized based on the synchronization signal transmitted by other transmission sources that are synchronized with the one transmission source. More specifically, the other transmission sources may also include a transmission source configured to relay the synchronization signal transmitted by the one transmission source.

For example, the synchronized terminal device may also include a terminal device that is synchronized based on the synchronization signal transmitted by the terminal device 200 and a terminal device that is synchronized based on the synchronization signal transmitted by a device that relays the synchronization signal.

Accordingly, for example, a greater number of terminal devices may use the same resource pool.

(Resource Pool Group)

For example, the resource pool group includes two or more resource pools serving as the radio resources available for D2D communication. Also, the resource pool group may include only one resource pool. Hereinafter, an example of the resource pool group will be described with reference to FIG. 22.

FIG. 22 is an explanatory diagram illustrating a second example of the resource pool group. For example, resource pools #1, #4, and #N are included in a resource pool group

1. The resource pool group #1 is used by the terminal device that is synchronized based on the synchronization signal transmitted by the terminal device 200.

(Transmission Information)

As an example, the control unit 243 notifies the terminal device of the resource pool group by transmission of information (for example, information as illustrated in FIG. 22) indicating the resource pool group to which resource pools belong.

(Notification Method)

For example, the control unit 243 notifies the terminal device of the resource pool group in at least one resource pool included in the resource pool group. For example, the information indicating the resource pool group is included in synchronization information transmitted in the at least one resource pool.

As an example, the control unit 243 notifies the terminal device of the resource pool group in each of the resource pools included in the resource pool group. Referring again to FIG. 22, for example, the control unit 243 notifies of the resource pool group #1 in resource pools #1, #4, and #N.

As described above, the terminal device 200 (the control unit 243) notifies the terminal device of the resource pool group. Accordingly, for example, the terminal device can reduce a load on the synchronization process. Specifically, for example, the terminal device can omit synchronization based on the synchronization signal transmitted in the resource pool group included in the resource pool group. As an example, the terminal device already uses the resource pool #1 illustrated in FIG. 22. In this case, when the terminal device uses synchronization in the resource pool #1 as synchronization in the resource pools #4 and #N, it is possible to omit synchronization based on the synchronization signal transmitted in the resource pools #4 and #N.

<8.4. Operation of Second Terminal Device>

Next, the operation of the terminal device 300 will be described.

The information acquisition unit 341 acquires the information indicating the resource pool group that is used by the synchronized terminal device and is the resource pool group including one or more resource pools serving as the radio resources available for D2D communication. Then, the control unit 343 controls D2D communication by the terminal device 300 such that the terminal device 300 omits synchronization based on the synchronization signal transmitted in at least one resource pool included in the resource pool group.

(When Notification is Performed by the Base Station 100)

For example, the base station 100 reports the system information indicating the resource pool group, and the information acquisition unit 341 acquires the information indicating the resource pool group from the system information. As an example, the information acquisition unit 341 acquires partially or entirely information as illustrated in FIG. 21.

Referring again to FIG. 21, as an example, the terminal device 300 already uses the resource pool #1. In this case, when the terminal device uses synchronization in the resource pool #1 as synchronization in the resource pools #4 and #N, synchronization based on the synchronization signal transmitted in the resource pools #4 and #N is omitted. As another example, the terminal device 300 already uses the resource pool #2. In this case, when the terminal device uses synchronization in the resource pool #2 as synchronization in the resource pool #3, synchronization based on the synchronization signal transmitted in the resource pool #3 is omitted.

(When Notification is Performed by the Terminal Device 200)

For example, the terminal device 200 notifies the terminal device of the resource pool group in at least one resource pool included in the resource pool group. Then, the information acquisition unit 341 acquires the information indicating the resource pool group from information received in the at least one resource pool. As an example, the information acquisition unit 341 acquires information as illustrated in FIG. 22.

Referring again to FIG. 22, as an example, the terminal device 300 already uses the resource pool #1. In this case, when the terminal device uses synchronization in the resource pool #1 as synchronization in the resource pools #4 and #N, synchronization based on the synchronization signal transmitted in the resource pools #4 and #N is omitted.

(Specific Process)

As an example, the control unit 343 selects a subframe on which the synchronization process will be performed. Specifically, for example, the control unit 343 does not select a subframe of the at least one resource pool included in the resource pool as a target of the synchronization process. Also, the terminal device 300 is synchronized based on the synchronization signal transmitted in the subframe selected by the control unit 343.

<8.5. Process Flow>

Next, an exemplary process according to the fifth embodiment will be described with reference to FIGS. 23 to 24.

(First Process)

FIG. 23 is a sequence diagram schematically illustrating an exemplary flow of a first process according to the fifth embodiment.

The base station 100 reports system information indicating one or more resource pools and the resource pool group (S481).

The terminal device 300 omits synchronization and performs D2D communication in at least one resource pool included in the resource pool group (S483)

(Second Process)

FIG. 24 is a sequence diagram schematically illustrating an exemplary flow of a second process according to the fifth embodiment.

The terminal device 200 notifies the terminal device of one or more resource pools and the resource pool group in each of the one or more resource pool groups (S485). For example, the terminal device 200 transmits resource pool information indicating the one or more resource pools and resource pool group information indicating the resource pool in each of the one or more resource pools.

The terminal device 300 acquires the resource pool information and the resource pool group information from information received in the resource pool (S486).

The terminal device 300 omits synchronization and performs D2D communication in at least one resource pool included in the resource pool group (S487).

<<9. Sixth Embodiment>>

Next, the sixth embodiment of the present disclosure will be described with reference to FIGS. 25 to 28.

<9.1. Outline>

(Technical Problem)

As the application of D2D communication, there are a variety of applications. For example, as the application of D2D communication, an application for public safety (for example, fire notification and collision avoidance) is provided. In addition, for example, as the application of D2D communication, there are an urgent application and a non-urgent application. These applications of D2D communication are considered to be different according to the terminal device.

However, when various applications of D2D communication are performed in any resource pool, for example, the terminal device receives a signal in a great number of resource pools in order to receive a signal of D2D communication in a desired application. As a result, a load on the terminal device may increase.

Therefore, it is preferable to provide a mechanism in which a load on the terminal device configured to perform D2D communication can be reduced.

(Technical Features)

In the sixth embodiment, the base station 100 and the terminal device 200 notify the terminal device of the application of D2D communication that is performed in each of the one or more resource pools serving as the radio resources available for D2D communication. Accordingly, for example, it is possible to reduce a load on the terminal device configured to perform D2D communication.

<9.2. Operation of Base Station>

First, the operation of the base station 100 will be described with reference to FIG. 25.

The information acquisition unit 151 acquires information indicating the application of D2D communication performed in each of the one or more resource pools serving as the radio resources available for D2D communication. Then, the control unit 153 notifies the terminal device of the application.

(Applications)

For example, the application includes an urgent application, a non-urgent application, an application for public safety, an application other than one for public safety, or an out-of-coverage application and an in-coverage application. For example, the application for public safety includes fire alarm or collision avoidance. Also, the application may be referred to as a use case. A specific example will be described below with reference to FIG. 25.

FIG. 25 is an explanatory diagram illustrating an exemplary application of D2D communication performed in each of the resource pools. Referring to FIG. 25, the application of D2D communication performed in each of N resource pools (resource pools #1 to #N) is illustrated. For example, in resource pools #1 and #4, D2D communication is performed in an application having identification information 1. For example, in resource pools #3 and #N, D2D communication is performed in an application having identification information 2.

Also, for example, the application of D2D communication performed in each of the one or more resource pools is determined by the base station 100 (the processing unit 150).

(Transmission Information)

As an example, the control unit 153 notifies the terminal device of the application by transmission of information (for example, information as illustrated in FIG. 25) indicating the application of D2D communication performed in each of the one or more resource pools.

(Notification Method)

For example, the control unit 153 notifies the terminal device of the application by reporting system information indicating the application. Accordingly, for example, not only the terminal device in a connection mode but also the terminal device in an idle mode can recognize the application.

Also, the control unit 153 may notify the terminal device of the application using separate signaling. The separate signaling may be RRC signaling.

As described above, the base station 100 (the control unit 153) notifies the terminal device of the application. Accordingly, for example, it is possible to reduce a load on the terminal device configured to perform D2D communication. More specifically, for example, in order to receive a signal of desired D2D communication, the terminal device may receive a signal in the resource pool in which the desired D2D communication is performed. Therefore, a load applied to the terminal device due to reception may be reduced.

<9.3. Operation of First Terminal Device>

Next, the operation of the terminal device 200 will be described.

The information acquisition unit 241 acquires information indicating the application of D2D communication performed in each of the one or more resource pools serving as the radio resources available for D2D communication. Then, the control unit 243 notifies the terminal device of the application.

(Applications)

There is no difference between the descriptions of the applications of the base station 100 and the terminal device 200. Therefore, redundant descriptions will be omitted herein.

Also, for example, the application is determined by the terminal device 200 (the processing unit 240).

(Transmission Information)

As an example, the control unit 243 notifies the terminal device of the application by transmission of information (for example, information as illustrated in FIG. 25) indicating the application of D2D communication performed in each of the one or more resource pools.

(Notification Method)

For example, the control unit 243 notifies the terminal device of the application in the resource pool serving as the radio resources available for D2D communication. For example, information indicating the application is included in synchronization information transmitted in the resource pool.

For example, the control unit 243 notifies the terminal device of the application in at least one resource pool included in the one or more resource pools. As an example, the control unit 243 notifies the terminal device of the application in each of the one or more resource pools.

As described above, the terminal device 200 (the control unit 243) notifies the terminal device of the application. Accordingly, for example, it is possible to reduce a load on the terminal device configured to perform D2D communication.

<9.4. Operation of Second Terminal Device>

Next, the operation of the terminal device 300 will be described.

The information acquisition unit 341 acquires information indicating the application of D2D communication performed in each of the one or more resource pools serving as the radio resources available for D2D communication. Then, the control unit 343 controls D2D communication by the terminal device 300 such that the terminal device 300 performs D2D communication in the desired application in the resource pool in which D2D communication is performed in the desired application among the one or more resource pools.

(When Notification is Performed by the Base Station 100)

For example, the base station 100 reports the system information indicating the application, and the information acquisition unit 341 acquires information indicating the application from the system information. As an example, the information acquisition unit 341 acquires information as illustrated in FIG. 25.

(When Notification is Performed by the Terminal Device 200)

For example, the terminal device 200 notifies the terminal device of the application in the resource pool serving as the radio resources available for D2D communication. Then, the information acquisition unit 341 acquires information indicating the application from information received in the resource pool. As an example, the information acquisition unit 341 acquires information as illustrated in FIG. 25.

(Exemplary D2D Communication by the Terminal Device 300)

Referring again to FIG. 25, as an example, the desired application of D2D communication of the terminal device 300 is an application having an identification number 1. In this case, the terminal device 300 performs D2D communication in resource pools #1 and #4. As another example, the desired application of D2D communication of the terminal device 300 is an application having an identification number 2. In this case, the terminal device 300 performs D2D communication in resource pools #3 and #N.

(Specific Process)

For example, the control unit 343 performs a reception process for receiving a signal of D2D communication in the desired application in the resource pool in which D2D communication is performed in the desired application. In addition, the control unit 343 performs a transmission process for transmitting a signal of D2D communication in the desired application in the resource pool.

<9.5. Process Flow>

Next, an exemplary process according to the sixth embodiment will be described with reference to FIGS. 26 and 27.

(First Process)

FIG. 26 is a sequence diagram schematically illustrating an exemplary flow of a first process according to the sixth embodiment.

The base station 100 reports the system information indicating one or more resource pools and the application of D2D communication performed in each of the one or more resource pools (S491).

The terminal device 300 performs D2D communication in the desired application in the resource pool in which D2D communication is performed in the desired application among the one or more resource pools (S493).

(Second Process)

FIG. 27 is a sequence diagram schematically illustrating an exemplary flow of a second process according to the sixth embodiment.

The terminal device 200 notifies the terminal device of one or more resource pools and the application of D2D communication performed in each of the one or more resource pools in the resource pool (S501). For example, the terminal device 200 transmits resource pool information indicating the one or more resource pools and application information indicating the application in the resource pool.

The terminal device 300 acquires the resource pool information and the application information from information received in the resource pool (S503).

The terminal device 300 performs D2D communication in the desired application in the resource pool in which D2D communication is performed in the desired application among the one or more resource pools (S505).

<<10. Seventh Embodiment>>

Next, the seventh embodiment of the present disclosure will be described with reference to FIGS. 28 and 29.

<10.1. Outline>

(Technical Problem)

There is no difference between the descriptions of the technical problems of the sixth embodiment and the seventh embodiment. Therefore, redundant descriptions will be omitted herein.

(Technical Features)

In the seventh embodiment, the base station 100 and the terminal device 200 acquire information indicating the desired application of D2D communication of the terminal device and notify the terminal device of one or more resource pools in which D2D communication is performed in the desired application.

Especially, in the seventh embodiment, the base station 100 and the terminal device 200 acquire information indicating a desired application of D2D communication of a separate terminal device and separately notify the separate terminal device of one or more resource pools in which D2D communication is performed in the desired application.

Accordingly, for example, it is possible to reduce a load on the terminal device configured to perform D2D communication.

<10.2. Operation of Base Station>

First, the operation of the base station 100 will be described.

The information acquisition unit 151 acquires information indicating the desired application of D2D communication of the terminal device. Then, the control unit 153 notifies the terminal device of the one or more resource pools in which D2D communication is performed in the desired application and that are one or more resource pools serving as the radio resources available for D2D communication.

Especially, in the seventh embodiment, the information acquisition unit 151 acquires information indicating the desired application of D2D communication of the separate terminal device. Then, the control unit 153 separately notifies the separate terminal device of one or more resource pools in which D2D communication is performed in the desired application.

(Information Indicating Desired Application)

For example, the separate terminal device notifies the base station 100 of the desired application of D2D communication. Then, the information acquisition unit 151 acquires information indicating the desired application of the separate terminal device.

(One or More Resource Pools)

(a) Existing Resource Pool

For example, as the resource pool in which D2D communication is performed in the desired application, one or more resource pools are already sufficiently selected. In this case, the control unit 153 notifies the separate terminal device of the one or more resource pools.

Referring again to FIG. 25, for example, the desired application is the application having an identification number 1, and resource pools #1 and #4 are already selected as the resource pool in which D2D communication is performed in the desired application. In this case, the control unit 153 notifies the separate terminal device of the resource pools #1 and #4.

(b) Selection of New Resource Pool

For example, as the resource pool in which D2D communication is performed in the desired application, no resource pool has been selected yet. Alternatively, the resource pool in which D2D communication is performed in the desired application is insufficient. In this case, the control unit 153 selects one or more resource pools appropriate for D2D communication in the desired application as the one or more resource pools in which D2D communication is performed in the desired application. Then, the control unit 153 notifies the separate terminal device of the selected one or more resource pools.

For example, the one or more resource pools appropriate for D2D communication in the desired application are one or more resource pools having a period appropriate for D2D communication in the desired application or the appropriate number of resource pools for D2D communication in the desired application.

Specifically, for example, when the desired application requests a quick notification or the desired application requests transmission of a great amount of information, the control unit 153 selects one or more resource pools having a short period or a great number of resource pools. Otherwise, the control unit 153 selects one or more resource pools having a long period or a small number of resource pools.

Accordingly, for example, D2D communication is well performed in the desired application.

(Notification Method)

For example, the control unit 153 notifies the separate terminal device of the one or more resource pools in which D2D communication is performed in the desired application using separate signaling. The separate signaling may be, for example, RRC signaling.

As described above, the base station 100 (the control unit 153) notifies the terminal device of the one or more resource pools in which D2D communication is performed in the desired application. Accordingly, for example, it is possible to reduce a load on the terminal device configured to perform D2D communication. More specifically, for example, in order to receive a signal of desired D2D communication, the terminal device may receive a signal in the resource pool in which the desired D2D communication is performed. Therefore, a load applied to the terminal device due to reception may be reduced.

<10.3. Operation of First Terminal Device>

Next, the operation of the terminal device 200 will be described.

The information acquisition unit 241 acquires information indicating the desired application of D2D communication of the terminal device. Then, the control unit 243 notifies the terminal device of the one or more resource pools in which D2D communication is performed in the desired application and that are one or more resource pools serving as the radio resources available for D2D communication.

Especially, in the seventh embodiment, the information acquisition unit 241 acquires information indicating the desired application of D2D communication of the separate terminal device. Then, the control unit 243 separately notifies the separate terminal device of the one or more resource pools.

(Information Indicating Desired Application)

For example, the separate terminal device notifies the terminal device 200 of the desired application of D2D communication. Then, the information acquisition unit 241 acquires information indicating the desired application of the separate terminal device.

(One or More Resource Pools)

There is no difference between the descriptions of the one or more resource pools in which D2D communication is performed in the desired application of the base station 100 and the terminal device 200 except for different reference numerals. Therefore, redundant descriptions will be omitted herein.

(Notification Method)

For example, the control unit 243 notifies the terminal device of the one or more resource pools in which D2D communication is performed in the desired application in the resource pool serving as the radio resources available for D2D communication. For example, the information indicating the one or more resource pools includes synchronization information transmitted in the resource pool.

As described above, the terminal device 200 (the control unit 243) notifies the terminal device of the one or more resource pools in which D2D communication is performed in the desired application. Accordingly, for example, it is possible to reduce a load on the terminal device configured to perform D2D communication.

<10.4. Operation of Second Terminal Device>

Next, the operation of the terminal device 300 will be described.

(Notification of Desired Application)

The information acquisition unit 341 acquires information indicating the desired application of D2D communication of the terminal device 300. Then, the control unit 343 notifies the terminal device 200 or the base station 100 of the desired application.

For example, the information indicating the desired application is, for example, (as illustrated in FIG. 25) identification information of the desired application. The control unit 343 notifies the base station 100 or the terminal device 200 of the desired application by transmission of the identification information.

For example, in the case of in-coverage (that is, when the terminal device 300 is positioned within the network coverage area), the control unit 343 notifies the base station 100 of the desired application in an uplink. For example, in the case of out-of-coverage (that is, when the terminal device 200 is positioned outside of the network coverage area), the control unit 343 notifies the terminal device 200 of the desired application in the resource pool.

(D2D Communication)

The control unit 343 controls D2D communication in the desired application by the terminal device 300 in at least one resource pool among one or more resource pools of which the base station 100 or the terminal device 200 notifies the terminal device 300. The one or more resource pools are radio resources available for D2D communication, and are resource pools in which D2D communication is performed in the desired application.

For example, the control unit 343 performs a reception process for receiving a signal of D2D communication in the desired application in the at least one resource pool. In addition, the terminal device 300 performs a transmission process for transmitting a signal of D2D communication in the desired application in the at least one resource pool.

<9.5. Process Flow>

Next, an exemplary process according to the seventh embodiment will be described with reference to FIGS. 28 and 29.

(First Process)

FIG. 28 is a sequence diagram schematically illustrating an exemplary flow of a first process according to the seventh embodiment.

The terminal device 300 notifies the base station 100 of the desired application of D2D communication of the terminal device 300 (S511). For example, the terminal device 300 transmits desired application information indicating the desired application to the base station 100.

For example, as the resource pool in which D2D communication is performed in the desired application, one or more resource pools are already sufficiently selected. In this case, the base station 100 acquires resource pool information indicating one or more resource pools that are already selected as the resource pool in which D2D communication is performed in the desired application (S513).

Alternatively, as the resource pool in which D2D communication is performed in the desired application, no resource pool has been selected yet. Otherwise, the resource pool in which D2D communication is performed in the desired application is insufficient. In this case, the base station 100 selects one or more resource pools appropriate for D2D communication in the desired application as one or more resources pool in which D2D communication is performed in the desired application (S513).

The base station 100 notifies the terminal device 300 of the one or more resource pools using separate signaling (S515). For example, the base station 100 transmits the resource pool information indicating the one or more resource pools to the terminal device 300.

The terminal device 300 performs D2D communication in the desired application in at least one resource pool among the one or more resource pools of which the base station 100 notifies the terminal device 300 (S517).

(Second Process)

FIG. 29 is a sequence diagram schematically illustrating an exemplary flow of a second process according to the seventh embodiment.

The terminal device 300 notifies the terminal device 200 of the desired application of D2D communication of the terminal device 300 (S521). For example, the terminal device 300 transmits desired application information indicating the desired application to the terminal device 200.

For example, as the resource pool in which D2D communication is performed in the desired application, one or more resource pools are already sufficiently selected. Therefore, the terminal device 200 acquires resource pool information indicating one or more resource pools that are already selected as the resource pool in which D2D communication is performed in the desired application (S523).

Alternatively, as the resource pool in which D2D communication is performed in the desired application, no resource pool has been selected yet. Otherwise, the resource pool in which D2D communication is performed in the desired application is insufficient. Therefore, the terminal device 200 selects one or more resource pools appropriate for D2D communication in the desired application as one or more resources pool in which D2D communication is performed in the desired application (S513).

The terminal device 200 notifies the terminal device 300 of the one or more resource pools in the resource pool (S525). For example, the terminal device 200 transmits the resource pool information indicating the one or more resource pools to the terminal device 300.

The terminal device 300 performs D2D communication in the desired application in at least one resource pool among the one or more resource pools of which the terminal device 200 notifies the terminal device 300 (S527).

<<11. Eighth Embodiment>>

Next, the eighth embodiment of the present disclosure will be described with reference to FIGS. 30 and 31.

<11.1. Outline>

(Technical Problem)

There is no difference between the descriptions of the technical problems of the sixth embodiment and the seventh embodiment. Therefore, redundant descriptions will be omitted herein.

(Technical Features)

In the eighth embodiment, the base station 100 and the terminal device 200 acquire information indicating the desired application of D2D communication of the terminal device and notify the terminal device of one or more resource pools in which D2D communication is performed in the desired application.

Especially, in the eighth embodiment, the base station 100 and the terminal device 200 notify the terminal device of the one or more resource pools in which D2D communication is performed in the desired application and the application of D2D communication (that is, the desired application) performed in the one or more resource pools. That is, in the seventh embodiment, the base station 100 and the terminal device 200 independently correspond to independent terminal devices. However, in the eighth embodiment, the base station 100 and the terminal device 200 collectively constitute one complete terminal device.

Accordingly, for example, it is possible to reduce a load on the terminal device configured to perform D2D communication.

<11.2. Operation of Base Station>

First, the operation of the base station 100 will be described.

The information acquisition unit 151 acquires information indicating the desired application of D2D communication of the terminal device. Then, the control unit 153 notifies the terminal device of the one or more resource pools in which D2D communication is performed in the desired application and that are one or more resource pools serving as the radio resources available for D2D communication.

Especially, in the eighth embodiment, the control unit 153 notifies the terminal device of one or more resource pools in which D2D communication is performed in the desired application and the application (that is, the desired application) of D2D communication performed in the one or more resource pools.

(Information Indicating Desired Application)

For example, multiple terminal devices notify the base station 100 of the desired application of D2D communication. Then, the information acquisition unit 151 acquires information indicating the desired application of the multiple terminal devices.

For example, the information acquisition unit 151 acquires information indicating two or more desired applications of the multiple terminal devices. For example, the first terminal device notifies the base station 100 of a first application and a second application as the desired application, and the second terminal device notifies the base station 100 of a second application and a third application as the desired application. Then, the information acquisition unit 151 acquires information indicating the first application, the second application and the third application.

Also, the multiple terminal devices include, for example, not only the terminal device in a connection mode but also the terminal device in an idle mode. In this case, the base station 100 is notified of a demand for desired D2D communication of the terminal device in an idle mode through the terminal device in a connection mode.

(One or More Resource Pools)

(a) Existing Resource Pool

For example, as the resource pool in which D2D communication is performed in the desired application, one or more resource pools are already sufficiently selected. In this case, the control unit 153 notifies the terminal device of the one or more resource pools and the application (that is, the desired application) of D2D communication performed in the one or more resource pools.

Referring again to FIG. 25, for example, the desired application is the application having an identification number 1, and resource pools #1 and #4 are already selected as the resource pool in which D2D communication is performed in the desired application. In this case, the control unit 153 notifies the terminal device of the resource pools #1 and #4 or the like along with the above-mentioned application.

(b) Selection of New Resource Pool

For example, as the resource pool in which D2D communication is performed in the desired application, no resource pool has been selected yet. Otherwise, the resource pool in which D2D communication is performed in the desired application is insufficient. In this case, the control unit 153 selects one or more resource pools appropriate for D2D communication in the desired application as the one or more resources pool in which D2D communication is performed in the desired application. Then, the control unit 153 notifies the terminal device of the selected one or more resource pools and the application (that is, the desired application) of D2D communication performed in the selected one or more resource pools.

Also, there is no difference between the descriptions of a specific selecting method of the seventh embodiment and the eighth embodiment. Therefore, redundant descriptions will be omitted herein.

(Notification Method)

For example, the control unit 153 notifies the terminal device of the one or more resource pools and the application by reporting the system information indicating the one or more resource pools and the application of D2D communication performed in the one or more resource pools.

Also, the control unit 153 may notify the terminal device of the one or more resource pools and the application of D2D communication performed in the one or more resource pools using separate signaling. The separate signaling may be RRC signaling.

In addition, it is needless to say that the control unit 153 may notify the terminal device of the one or more resource pools and the application of D2D communication performed in the one or more resource pools in each of multiple applications. For example, when the base station 100 is notified of the multiple desired applications, the control unit 153 may notify the terminal device of the one or more resource pools and the application (that is, the desired application) of D2D communication performed in the one or more resource pools in each of the multiple desired applications.

(Transmission Information)

For example, the control unit 153 notifies the terminal device of the one or more resource pools and the application by transmission of information indicating the one or more resource pools and the application. It is needless to say that information (for example, information as illustrated in FIG. 25) indicating the one or more resource pools and the application in each of multiple applications may be transmitted.

As described above, the base station 100 (the control unit 153) notifies the terminal device of the one or more resource pools in which D2D communication is performed in the desired application and the application (that is, the desired application) of D2D communication performed in the one or more resource pools. Accordingly, for example, it is possible to reduce a load on the terminal device configured to perform D2D communication. More specifically, for example, in order to receive a signal of desired D2D communication, the terminal device may receive a signal in the resource pool in which the desired D2D communication is performed. Therefore, a load applied to the terminal device due to reception may be reduced.

<11.3. Operation of First Terminal Device>

Next, the operation of the terminal device 200 will be described.

The information acquisition unit 241 acquires information indicating the desired application of D2D communication of the terminal device. Then, the control unit 243 notifies the terminal device of the one or more resource pools in which D2D communication is performed in the desired application and that are one or more resource pools serving as the radio resources available for D2D communication.

Especially, in the eighth embodiment, the control unit 243 notifies the terminal device of one or more resource pools in which D2D communication is performed in the desired application and the application (that is, the desired application) of D2D communication performed in the one or more resource pools.

(Information Indicating Desired Application)

For example, multiple terminal devices notify the terminal device 200 of the desired application of D2D communication. Then, the information acquisition unit 241 acquires information indicating the desired application of the multiple terminal devices.

For example, the information acquisition unit 241 acquires information indicating two or more desired applications of the multiple terminal devices. For example, the first terminal device notifies the base station 100 of a first application and a second application as the desired application, and the second terminal device notifies the base station 100 of a second application and a third application as the desired application. Then, the information acquisition unit 241 acquires information indicating the first application, the second application and the third application.

Also, the multiple terminal devices may include, for example, not only other terminal devices configured to perform D2D communication with the terminal device 200 but also an additional terminal device configured to perform D2D communication with the other terminal devices. In this case, the terminal device 200 may be notified of a demand for desired D2D communication in the additional terminal device through the other terminal devices.

(One or More Resource Pools)

There is no difference between the descriptions of the one or more resource pools in which D2D communication is performed in the desired application of the base station 100 and the terminal device 200 except for different reference numerals. Therefore, redundant descriptions will be omitted herein.

(Notification Method)

For example, the control unit 243 notifies the terminal device of the one or more resource pools in which D2D communication is performed in the desired application and the application (that is, the desired application) of D2D communication performed in the one or more resource pools in the resource pool. For example, information indicating the one or more resource pools and the application is included in synchronization information transmitted in the resource pool.

In addition, it is needless to say that the control unit 243 may notify the terminal device of the one or more resource pools and the application of D2D communication performed in the one or more resource pools in each of multiple applications. For example, when the terminal device 200 is notified of the multiple desired applications, the control unit 243 may notify the terminal device of the one or more resource pools and the application (that is, the desired application) of D2D communication performed in the one or more resource pools in each of the multiple desired applications.

(Transmission Information)

For example, the control unit 243 notifies the terminal device of the one or more resource pools and the application by transmission of information indicating the one or more resource pools and the application. It is needless to say that information (for example, information as illustrated in FIG. 25) indicating the one or more resource pools and the application in each of multiple applications may be transmitted.

As described above, the terminal device 200 (the control unit 243) notifies the terminal device of the one or more resource pools in which D2D communication is performed in the desired application and the application (that is, the desired application) of D2D communication performed in the one or more resource pools. Accordingly, for example, it is possible to reduce a load on the terminal device configured to perform D2D communication.

<11.4. Process Flow>

Next, an exemplary process according to the eighth embodiment will be described with reference to FIGS. 30 and 31.

(First Process)

FIG. 30 is a sequence diagram schematically illustrating an exemplary flow of a first process according to the eighth embodiment.

A terminal device 300A in a connection mode notifies the base station 100 of the desired application of D2D communication (S551). For example, the terminal device 300A transmits desired application information indicating the desired application to the base station 100.

A terminal device 300B in an idle mode notifies the terminal device 300A of the desired application of D2D communication (S552). The terminal device 300A notifies the base station 100 of the desired application (S553). For example, the terminal device 300B transmits desired application information indicating the desired application to the terminal device 300A, and the terminal device 300A transfers the desired application information to the base station 100.

For example, as the resource pool in which D2D communication is performed in the desired application, one or more resource pools are already sufficiently selected. In this case, the base station 100 acquires resource pool information indicating one or more resource pools that are already selected as the resource pool in which D2D communication is performed in the desired application (S554).

Alternatively, as the resource pool in which D2D communication is performed in the desired application, no resource pool has been selected yet. Otherwise, the resource pool in which D2D communication is performed in the desired application is insufficient. In this case, the base station 100 selects one or more resource pools appropriate for D2D communication in the desired application as one or more resources pool in which D2D communication is performed in the desired application (S554).

The base station 100 notifies the terminal device of the one or more resource pools and the application by reporting the system information indicating the one or more resource pools and the application of D2D communication performed in the one or more resource pools (S555).

The terminal device 300 performs D2D communication in the desired application in at least one resource pool among the one or more resource pools in which D2D communication is performed in the desired application (S556 and S557).

Also, it is needless to say that the base station 100 may notify the terminal device of the one or more resource pools and the application in each of multiple applications. Then, the two or more terminal devices 300 may perform D2D communication in different applications. For example, the base station 100 may notify the terminal device of one or more resource pools in which D2D communication is performed in a first application and the first application, and one or more resource pools in which D2D communication is performed in a second application and the second application. Then, the first terminal device 300 may perform D2D communication in the first application in the resource pool in which D2D communication is performed in the first application, and the second terminal device 300 may perform D2D communication in the second application in the resource pool in which D2D communication is performed in the second application.

In addition, the base station 100 may notify the terminal device 300A of the one or more resource pools and the application using separate signaling. Then, the terminal device 300A may notify the terminal device 300B of the one or more resource pools and the application.

(Second Process)

FIG. 31 is a sequence diagram schematically illustrating an exemplary flow of a second process according to the eighth embodiment.

The terminal device 300 configured to perform D2D communication with the terminal device 200 notifies the terminal device 200 of the desired application of D2D communication (S561). For example, the terminal device 300 transmits desired application information indicating the desired application to the terminal device 200. For example, the multiple terminal devices 300 notify the terminal device 200 of the desired application of D2D communication.

For example, as the resource pool in which D2D communication is performed in the desired application, one or more resource pools are already sufficiently selected. In this case, the terminal device 200 acquires resource pool information indicating one or more resource pools that are already selected as the resource pool in which D2D communication is performed in the desired application (S563).

Alternatively, as the resource pool in which D2D communication is performed in the desired application, no resource pool has been selected yet. Otherwise, the resource pool in which D2D communication is performed in the desired application is insufficient. In this case, the terminal device 200 selects one or more resource pools appropriate for D2D communication in the desired application as one or more resources pool in which D2D communication is performed in the desired application (S563).

The terminal device 200 notifies the terminal device of the one or more resource pools and the application of D2D communication performed in the one or more resource pools (S565). For example, the terminal device 200 transmits information indicating the one or more resource pools and the application.

The terminal device 300 performs D2D communication in the desired application in at least one resource pool among the one or more resource pools in which D2D communication is performed in the desired application (S567).

Also, it is needless to say that the terminal device 200 may notify the terminal device of the one or more resource pools and the application in each of multiple applications. Then, the two or more terminal devices 300 may perform D2D communication in different applications. For example, the terminal device 200 may notify the terminal device of one or more resource pools in which D2D communication is performed in a first application and the first application, and one or more resource pools in which D2D communication is performed in a second application and the second application. Then, the first terminal device 300 may perform D2D communication in the first application in the resource pool in which D2D communication is performed in the first application, and the second terminal device 300 may perform D2D communication in the second application in the resource pool in which D2D communication is performed in the second application.

<<12. Ninth Embodiment>>

Next, the ninth embodiment of the present disclosure will be described with reference to FIGS. 32 and 33.

<12.1. Outline>

(Technical Problem)

For example, the resource pool serving as the radio resources available for D2D communication is selected by the base station or the representative terminal device. However, the selected resource pool may be insufficient as radio resources to be used for communication that is actually performed. Alternatively, the selected resource pool may be excessive as radio resources to be used for D2D communication that is actually performed.

Therefore, it is preferable to provide a mechanism in which excess or deficiency of the radio resources available for D2D communication can be reduced.

(Technical Features)

In the ninth embodiment, the base station 100 and the terminal device 200 select the resource pool serving as the radio resources available for D2D communication based on the number of terminal devices configured to perform D2D communication, and notify the terminal device of the resource pool. Accordingly, for example, it is possible to reduce excess or deficiency of the radio resources available for D2D communication.

<12.2. Operation of Base Station>

First, the operation of the base station 100 will be described.

The information acquisition unit 151 acquires information indicating the number (hereinafter referred to as "the number of terminals") of terminal devices configured to perform D2D communication. Then, the control unit 153 selects the resource pool serving as the radio resources available for D2D communication based on the number of terminals. Furthermore, the control unit 153 notifies the terminal device of the resource pool.

(The Number of Terminals)

(a) Target Terminal Device

For example, the number of terminals (that is, the number of terminal devices configured to perform D2D communication) is the number of terminal devices that include a terminal device in a connection mode that is connected to the base station 100 and a terminal device in an idle mode that is not connected to the base station 100.

For example, the terminal device in a connection mode (that is, the terminal device connected to the base station 100) provides information on the terminal device to the base station 100. The base station 100 (for example, the processing unit 150) calculates the number of terminals based on the information. For example, the information on the terminal device is information on the terminal device in an idle mode and configured to perform D2D communication with the terminal device in a connection mode. Alternatively, the information on the terminal device is information on the terminal device in an idle mode and the terminal device in a connection mode. The information on the terminal device may be a list of the terminal devices, information indicating the number of terminal devices, or other information. For example, the information acquisition unit 151 acquires information indicating the calculated number of terminals.

Also, the number of terminals may be the number of terminal devices that request the radio resources available for D2D communication (resource pool). The information on the terminal device may be a message that requests the radio resources (resource pool). Alternatively, the number of terminals may be the number of terminal devices configured to perform D2D communication. Alternatively, the number of terminals may be the number of terminal devices having a D2D communication capability.

(b) The Number of Terminals for Each Application

The base station 100 may select the resource pool for each application.

Specifically, the information acquisition unit 151 may acquire information indicating the number of terminal devices configured to perform D2D communication in the first application and information indicating the number of terminal devices configured to perform D2D communication in the second application. Then, the control unit 153 may select the resource pool in which D2D communication is performed in the first application based on the number of terminal devices configured to perform D2D communication in the first application. In addition, the control unit 153 may select the resource pool in which D2D communication is performed in the second application based on the number of terminal devices configured to perform D2D communication in the second application. In this case, the information on the terminal device that is provided from the terminal device in a connection mode to the base station 100 may include information (for example, a list of the terminal devices for each application or the number of terminal devices for each application) on the application of D2D communication.

Accordingly, for example, the resource pool is prepared according to a necessity for each application. As a result, excess or deficiency of the resource pool may be further reduced.

Also, for example, the first application and the second application include an urgent application, a non-urgent application, an application for public safety (for example, fire notification and/or collision avoidance), an application other than one for public safety, an out-of-coverage application or an in-coverage application.

(Selection of Resource Pool)

As the first example, the control unit 153 selects a greater number of resource pools when the number of terminals is greater, and selects a smaller number of resource pools when the number of terminals is smaller.

As the second example, the control unit 153 selects a resource pool having a shorter period when the number of terminals is greater, and selects a resource pool having a longer period when the number of terminals is smaller.

Accordingly, for example, when a greater number of terminal devices perform D2D communication, a greater amount of radio resources are available for D2D communication, and when a smaller number of terminal devices perform D2D communication, a smaller amount of radio resources are available for D2D communication. Therefore, excess or deficiency of the resource pool may be further reduced.

(Notification Method)

For example, the control unit 153 notifies the terminal device of the selected resource pool by reporting the system information indicating the selected resource pool. Accordingly, for example, not only the terminal device in a connection mode but also the terminal device in an idle mode can recognize the resource pool.

Also, the control unit 153 may notify the terminal device of the selected resource pool using separate signaling. The separate signaling may be RRC signaling.

As described above, the base station 100 (the control unit 153) selects the resource pool based on the number of terminals and notifies the terminal device of the resource pool. Accordingly, for example, it is possible to reduce excess or deficiency of the radio resources available for D2D communication.

<12.3. Operation of First Terminal Device>

Next, the operation of the terminal device 200 will be described.

The information acquisition unit 241 acquires information indicating the number (that is "the number of terminals") of terminal devices configured to perform D2D communication. Then, the control unit 243 selects the resource pool serving as the radio resources available for D2D communication based on the number of terminals. Furthermore, the control unit 243 notifies the terminal device of the resource pool.

(The Number of Terminals)

(a) Target Terminal Device

For example, the number of terminals (that is, the number of terminal devices configured to perform D2D communication) is the number of terminal devices configured to perform D2D communication with the terminal device 200.

For example, the terminal device 200 (for example, the processing unit 240) calculates the number of terminal devices configured to perform D2D communication (that is, the number of terminals) with the terminal device 200. For example, the information acquisition unit 241 acquires information indicating the calculated number of terminals.

Also, the number of terminals may be especially the number of terminal devices that request the radio resources available for D2D communication (resource pool). Alternatively, the number of terminals may be the number of terminal devices the perform D2D communication. Alternatively, the number of terminals may be the number of terminal devices having a D2D communication capability.

In addition, the number of terminals may be the number of terminal devices that include a terminal device configured to perform D2D communication with the terminal device 200 and further include other terminal devices configured to perform D2D communication with the terminal device. In this case, the terminal device configured to perform D2D communication with the terminal device 200 may provide information on other the terminal devices to the terminal device 300.

(b) The Number of Terminals for Each Application

The terminal device 200 may also select the resource pool for each application. Also, there is no difference between the detailed descriptions of the base station 100 and the terminal device 200 except for different reference numerals. Therefore, redundant descriptions will be omitted herein.

(Selection of Resource Pool)

There is no difference between the descriptions of selection of the resource pool of the base station 100 and the terminal device 200 except for different reference numerals. Therefore, redundant descriptions will be omitted herein.

(Notification Method)

For example, the control unit 243 notifies the terminal device of the selected resource pool.

For example, similar to the first embodiment or the second embodiment of the present disclosure, the control unit 243 may notify the terminal device of the selected resource pool.

As described above, the terminal device 200 (the control unit 243) selects the resource pool based on the number of terminals and notifies the terminal device of the resource pool. Accordingly, for example, it is possible to reduce excess or deficiency of the radio resources available for D2D communication.

<12.4. Process Flow>

Next, an exemplary process according to the ninth embodiment will be described with reference to FIGS. 32 and 33.

(First Process)

FIG. 32 is a sequence diagram schematically illustrating an exemplary flow of a first process according to the ninth embodiment.

The terminal device 300A in a connection mode provides information on the terminal device to the base station 100 (S571). For example, the information on the terminal device is information on the terminal device 300B (and the terminal device 300A) in an idle mode.

The base station 100 calculates the number of terminal devices configured to perform D2D communication (that is, the number of terminals) based on the information on the terminal device (S572). Then, the base station 100 selects the resource pool serving as the radio resources available for D2D communication based on the number of terminals (S573).

The base station 100 notifies the terminal device of the selected resource pool by reporting the system information indicating the selected resource pool (S574).

The terminal device 300 performs D2D communication in the selected resource pool (S575 and S576).

Especially, the number of terminals may be the number of terminal devices that request the radio resources available for D2D communication (resource pool). The information on the terminal device may be a message that requests the radio resources (resource pool). Alternatively, the number of terminals may be the number of terminal devices configured to perform D2D communication. Alternatively, the number of terminals may be the number of terminal devices having a D2D communication capability.

In addition, it is needless to say that the base station 100 may select two or more resource pools and notify the terminal device of the two or more resource pools. In this case, the terminal device 300 may perform D2D communication in at least one resource pool among the two or more resource pools.

In addition, the base station 100 may notify the terminal device 300A of the selected resource pool using separate signaling. Then, the terminal device 300A may notify the terminal device 300B of the selected resource pool.

(Second Process)

FIG. 33 is a sequence diagram schematically illustrating an exemplary flow of a second process according to the ninth embodiment.

The terminal device 200 calculates the number of terminal devices configured to perform D2D communication with the terminal device 200 (that is, the number of terminals) (S581). Then, the terminal device 200 select the resource pool serving as the radio resources available for D2D communication based on the number of terminals (S583).

The terminal device 200 notifies the terminal device of the selected resource pool (S585).

The terminal device 300 performs D2D communication in the selected resource pool (S587).

Especially, the number of terminals may be the number of terminal devices that request the radio resources available for D2D communication (resource pool). Alternatively, the number of terminals may be the number of terminal devices configured to perform D2D communication. Alternatively, the number of terminals may be the number of terminal devices having a D2D communication capability.

In addition, it is needless to say that the terminal device 200 may select two or more resource pools and notify the terminal device of the two or more resource pools. In this case, the terminal device 300 may perform D2D communication in at least one resource pool among the two or more resource pools.

<<13. Tenth Embodiment>>

Next, the tenth embodiment of the present disclosure will be described with reference to FIGS. 34 and 35.

<13.1. Outline>

(Technical Problem)

For example, the resource pool available for D2D communication is selected and the terminal device is notified of the resource pool. As a method of using the radio resources included in the resource pool, there are, for example, two methods.

In the first method, a coordinator (for example, the base station or the representative terminal) determines the radio resources that are used by the terminal device. Therefore, collision between a signal of the terminal device and a signal of another terminal device is avoided. In the second method (contention-based method), the terminal device itself determines radio resources that are used by the terminal device. Therefore, a signal of the terminal device may collide with a signal of another terminal device.

When the second method (contention-based method) is used, collision may occur again after collision occurs. Therefore, communication quality of D2D communication may be significantly reduced.

Therefore, it is preferable to provide a mechanism in which a decrease in communication quality of D2D communication can be reduced.

(Technical Features)

In the tenth embodiment, the base station 100 and the terminal device 200 notify the terminal device of a transmission resource pool serving as radio resources available for transmission in D2D communication and a retransmission resource pool serving as radio resources available for retransmission in D2D communication. Accordingly, for example, it is possible to reduce a decrease in communication quality of D2D communication.

<13.2. Operation of Base Station>

First, the operation of the base station 100 will be described.

The information acquisition unit 151 acquires information indicating the transmission resource pool serving as the radio resources available for transmission in D2D communication and the retransmission resource pool serving as the radio resources available for retransmission in D2D communication. Then, the control unit 153 notifies the terminal device of the transmission resource pool and the retransmission resource pool.

Accordingly, for example, when collision occurs due to signal transmission in the resource pool, since a signal is retransmitted in another resource pool in which only a signal to be retransmitted is transmitted, collision of a signal is less likely to occur. Therefore, a decrease in communication quality of D2D communication may be reduced.

Also, the transmission resource pool and the retransmission resource pool are selected by, for example, the base station 100.

(Exemplary Transmission Resource Pool and Retransmission Resource Pool)

Referring again to FIG. 7, for example, the resource pool #1 is selected as the transmission resource pool, and the resource pool #3 is selected as the retransmission resource pool. In this case, the control unit 153 notifies the terminal device of the resource pool #1 as the transmission resource pool, and notifies the terminal device of the resource pool #3 as the retransmission resource pool. As a result, a signal is transmitted first in the resource pool #1, and when collision occurs, the terminal device transmits a signal in the resource pool #3.

Also, it is needless to say that the control unit 153 may notify the terminal device of two or more transmission resource pools and/or two or more retransmission resource pools. Referring again to FIG. 7, resource pools #1 and #2 may be selected as the transmission resource pool, and resource pools #3 and #4 may be selected as the retransmission resource pool. In this case, the control unit 153 may notify the terminal device of the resource pools #1 and #2 as the transmission resource pool, and may notify the terminal device of the resource pools #3 and #4 as the retransmission resource pool. As a result, the terminal device may transmit a signal first in either of the resource pools #1 and #2, and when collision occurs, may transmit a signal in either of the resource pools #3 and #4.

(Multistage Retransmission Resource Pool)

The information acquisition unit 151 may acquire information indicating the transmission resource pool and information indicating two or more retransmission resource pools serving as the radio resources available for retransmission in D2D communication. Then, the control unit 153 may notify the terminal device of the transmission resource pool and the two or more retransmission resource pools. Especially, the two or more retransmission resource pools may include a first retransmission resource pool serving as the radio resources available for first-time retransmission and a second retransmission resource pool serving as the radio resources available for second-time retransmission.

Referring again to FIG. 7, for example, resource pools #1 and #2 may be selected as the transmission resource pool, resource pools #3 and #4 may be selected as the first retransmission resource pool, and resource pools #5 and #6 may be selected as the second retransmission resource pool. In this case, the control unit 153 may notify the terminal device of the resource pools #1 and #2 as the transmission resource pool, may notify the terminal device of the resource pools #3 and #4 as the first retransmission resource pool, and may notify the terminal device of the resource pools #5 and #6 as the second retransmission resource pool. As a result, a signal is transmitted first in either of the resource pools #1 and #2, and when collision occurs, the terminal device transmits a signal in either of the resource pools #3 and #4, and when collision further occurs, a signal may be transmitted in either of the resource pools #5 and #6.

Accordingly, for example, when collision occurs again due to signal retransmission in the resource pool, since a signal is retransmitted in another resource pool in which only a signal to be retransmitted is transmitted, collision of a signal is further less likely to occur. Therefore, a decrease in communication quality of D2D communication may be further reduced.

(Notification Method)

For example, the control unit 153 notifies the terminal device of the transmission resource pool and the retransmission resource pool by reporting system information indicating the transmission resource pool and the retransmission resource pool. Accordingly, for example, not only the terminal device in a connection mode but also the terminal device in an idle mode can recognize the transmission resource pool and the retransmission resource pool.

Also, the control unit 153 may notify the terminal device of the transmission resource pool and the retransmission resource pool using separate signaling. The separate signaling may be RRC signaling.

<13.3. Operation of First Terminal Device>

Next, the operation of the terminal device 200 will be described.

The information acquisition unit 241 acquires information indicating the transmission resource pool serving as the radio resources available for transmission in D2D communication and the retransmission resource pool serving as the radio resources available for retransmission in D2D communication. Then, the control unit 243 notifies the terminal device of the transmission resource pool and the retransmission resource pool.

Accordingly, for example, when collision occurs due to signal transmission in the resource pool, since a signal is retransmitted in another resource pool in which only a signal to be retransmitted is transmitted, collision of a signal is less likely to occur. Therefore, a decrease in communication quality of D2D communication may be reduced.

Also, the transmission resource pool and the retransmission resource pool are selected by, for example, the terminal device 200.

(Exemplary Transmission Resource Pool and Retransmission Resource Pool)

There is no difference between the descriptions of examples of the transmission resource pool and the retransmission resource pool of the base station 100 and the terminal device 200 except for different reference numerals. Therefore, redundant descriptions will be omitted herein.

(Multistage Retransmission Resource Pool)

There is no difference between the descriptions of the multistage retransmission resource pool of the base station 100 and the terminal device 200 except for different reference numerals. Therefore, redundant descriptions will be omitted herein.

(Notification Method)

For example, the control unit 243 notifies the terminal device of the transmission resource pool and the retransmission resource pool in the resource pool serving as the radio resources available for D2D communication.

<13.4. Operation of Second Terminal Device>

Next, the operation of the terminal device 300 will be described.

The information acquisition unit 341 acquires information indicating the transmission resource pool serving as the radio resources available for transmission in D2D communication and the retransmission resource pool serving as the radio resources available for retransmission in D2D communication. Then, the control unit 343 controls D2D communication of the terminal device 300 such that the terminal device 300 performs transmission in the transmission resource pool in D2D communication and the terminal device 300 performs retransmission in the retransmission resource pool in D2D communication. As described above, the base station 100 or the terminal device 200 notifies the terminal device 300 of the transmission resource pool and the retransmission resource pool.

(Exemplary Transmission Resource Pool and Retransmission Resource Pool)

Referring again to FIG. 7, for example, the resource pool #1 serves as the transmission resource pool, and the resource pool #3 serves as the retransmission resource pool. In this case, a signal is transmitted first in the resource pool #1, and when collision occurs, the terminal device 300 transmits a signal in the resource pool #3.

(Multistage Retransmission Resource Pool)

The information acquisition unit 341 may acquire information indicating the transmission resource pool and information indicating two or more retransmission resource pools serving as the radio resources available for retransmission in D2D communication. Especially, the two or more retransmission resource pools may include the first retransmission resource pool serving as the radio resources available for first-time retransmission and the second retransmission resource pool serving as the radio resources available for second-time retransmission. The control unit 343 controls D2D communication of the terminal device 300 such that the terminal device 300 performs transmission in the transmission resource pool in D2D communication, the terminal device 300 performs first-time retransmission in the first retransmission resource pool in D2D communication, and the terminal device 300 performs second-time retransmission in the second retransmission resource pool in D2D communication.

Referring again to FIG. 7, for example, the resource pools #1 and #2 may be the transmission resource pool, the resource pools #3 and #4 may be a first resource retransmission pool, and the resource pools #5 and #6 may be the second retransmission resource pool. In this case, a signal is transmitted first in either of the resource pools #1 and #2, and when collision occurs, the terminal device 300 transmits a signal in either of the resource pools #3 and #4, and when collision further occurs, a signal may be transmitted in either of the resource pools #5 and #6.

(Specific Process)

For example, the control unit 343 performs a transmission process for transmitting a signal of D2D communication in the transmission resource pool. In addition, the control unit 343 performs a transmission process for retransmitting a signal of D2D communication in the retransmission resource pool.

<13.4. Process Flow>

Next, an exemplary process according to the tenth embodiment will be described with reference to FIGS. 34 to 35.

(First Process)

FIG. 34 is a sequence diagram schematically illustrating an exemplary flow of a first process according to the tenth embodiment.

The base station 100 reports the system information indicating the transmission resource pool and the retransmission resource pool (S601).

The terminal device 300 transmits a signal of D2D communication in the transmission resource pool and retransmits a signal of D2D communication in the retransmission resource pool (S603).

(Second Process)

FIG. 35 is a sequence diagram schematically illustrating an exemplary flow of a second process according to the tenth embodiment.

The terminal device 200 transmits the transmission resource pool and the retransmission resource pool in the resource pool (S611). For example, the terminal device 200 transmits resource pool information indicating the transmission resource pool and the retransmission resource pool.

The terminal device 300 acquires the resource pool information indicating the transmission resource pool and the retransmission resource pool from information received in the resource pool (S613).

The terminal device 300 transmits a signal of D2D communication in the transmission resource pool and retransmits a signal of D2D communication in the retransmission resource pool (S615).

<<14. Eleventh Embodiment>>

Next, the eleventh embodiment of the present disclosure will be described with reference to FIGS. 36 and 37.

<14.1. Outline>

(Technical Problem)

For example, the resource pool available for D2D communication is selected, and the terminal device is notified of the resource pool. Then, the terminal device performs D2D communication in the resource pool. For example, when D2D communication is performed to make a call, the terminal device transmits audio data for a call in the resource pool.

For example, other data is also transmitted in the resource pool. Therefore, a large amount of data (for example, moving image data and/or a large amount of still image data) may be transmitted in the resource pool. In such a case, collision is likely to occur in the resource pool. As a result, a signal of audio data may collide with a signal of other data, and retransmission of audio data may increase. That is, communication quality of audio data may decrease and quality of the call may decrease.

Therefore, it is preferable to provide a mechanism in which a decrease in communication quality of audio data can be reduced.

(Technical Features)

In the eleventh embodiment, the base station 100 and the terminal device 200 notify the terminal device of an audio resource pool serving as the radio resources available for transmitting audio data in D2D communication and other resource pools serving as the radio resources available for transmitting other data in D2D communication. Accordingly, for example, it is possible to reduce a decrease in communication quality of audio data.

<14.2. Operation of Base Station>

First, the operation of the base station 100 will be described.

The information acquisition unit 151 acquires information indicating audio resource pool serving as the radio resources available for transmitting audio data in D2D communication and other resource pools serving as the radio resources available for transmitting other data in D2D communication. Then, the control unit 153 notifies the terminal device of the audio resource pool and the other resource pools. Accordingly, for example, audio data and other data are transmitted in different resource pools. Therefore, in the resource pool in which audio data is transmitted, a large amount of data is less likely to be transmitted. Accordingly, a decrease in communication quality of audio data may be reduced.

Also, the audio resource pool (and the other resource pools) is selected by, for example, the base station 100.

(Exemplary Audio Resource Pool)

Referring again to FIG. 7, for example, the resource pools #1 to #4 are selected as the audio resource pool. In addition, the resource pools #5 to #N are other resource pools serving as the radio resources available for transmitting other data. In this case, the control unit 153 notifies the terminal device of the resource pools #1 to #4 as the audio resource pool and notifies the terminal device of the resource pools #5 to #N as other resource pools serving as the radio resources available for transmitting other data.

(Notification Method)

For example, the control unit 153 notifies the terminal device of the audio resource pool and the other resource pools by reporting system information indicating the audio resource pool and the other resource pools. Accordingly, for example, not only the terminal device in a connection mode but also the terminal device in an idle mode can recognize the audio resource pool and the other resource pools.

Also, the control unit 153 may notify the terminal device of the audio resource pool and the other resource pools using separate signaling. The separate signaling may be RRC signaling.

<14.3. Operation of First Terminal Device>

Next, the operation of the terminal device 200 will be described.

The information acquisition unit 241 acquires information indicating audio resource pool serving as the radio resources available for transmitting audio data in D2D communication and other resource pools serving as the radio resources available for transmitting other data in D2D communication. Then, the control unit 243 notifies the terminal device of the audio resource pool and the other resource pools.

Accordingly, for example, audio data and other data are transmitted in different resource pools. Therefore, in the resource pool in which audio data is transmitted, a large amount of data is less likely to be transmitted. Accordingly, a decrease in communication quality of audio data may be reduced.

Also, the audio resource pool (and the other resource pools) is selected by, for example, the terminal device 200.

(Exemplary Audio Resource Pool)

There is no difference between the descriptions of the exemplary audio resource pool of the base station 100 and the terminal device 200 except for different reference numerals. Therefore, redundant descriptions will be omitted herein.

(Notification Method)

For example, the control unit 243 notifies the terminal device of the audio resource pool and the other resource pools in the resource pool serving as the radio resources available for D2D communication.

<14.4. Operation of Second Terminal Device>

Next, the operation of the terminal device 300 will be described.

The information acquisition unit 341 acquires information indicating the audio resource pool serving as the radio resources available for transmitting audio data in D2D communication and other resource pools serving as the radio resources available for transmitting other data in D2D communication. Then, the control unit 343 controls D2D communication of the terminal device 300 such that the terminal device 300 transmits audio data in the audio resource pool in D2D communication and the terminal device 300 transmits other data in the other resource pools in D2D communication. As described above, the base station 100 or the terminal device 200 notifies the terminal device 300 of the audio resource pool and the other resource pools.

(Exemplary Audio Resource Pool)

Referring again to FIG. 7, for example, the resource pools #1 to #4 are the audio resource pool. In addition, the resource pools #5 to #N are other resource pools serving as the radio resources available for transmitting other data. In this case, the terminal device 300 transmits audio data in any of the resource pools #1 to #4, and transmits other data in any of the resource pools #5 to #N.

(Specific Process)

For example, the control unit 343 performs a transmission process for transmitting audio data in the audio resource pool. In addition, the control unit 343 performs a transmission process for transmitting other data in the other resource pools.

<14.4. Process Flow>

Next, an exemplary process according to the eleventh embodiment will be described with reference to FIGS. 36 to 37.

(First Process)

FIG. 36 is a sequence diagram schematically illustrating an exemplary flow of a first process according to the eleventh embodiment.

The base station 100 reports the system information indicating the audio resource pool and the other resource pools (S621).

The terminal device 300 transmits audio data in the audio resource pool and transmits other data in other resource pools (S623).

(Second Process)

FIG. 37 is a sequence diagram schematically illustrating an exemplary flow of a second process according to the eleventh embodiment.

The terminal device 200 transmits the audio resource pool and the other resource pools in the resource pool (S631). For example, the terminal device 200 transmits resource pool information indicating the audio resource pool and the other resource pools.

The terminal device 300 acquires the resource pool information indicating the audio resource pool and the other resource pools from information received in the resource pool (S633).

The terminal device 300 transmits audio data in the audio resource pool and transmits other data in other resource pools (S635).

<<15. Combination of Embodiments>>

The first to eleventh embodiments described above can be combined.

For example, the processing unit 150 (for example, the information acquisition unit 151 and the control unit 153) of the base station 100 may perform operations of two or more arbitrary embodiments among the first to eleventh embodiments.

For example, the processing unit 240 (for example, the information acquisition unit 241 and the control unit 243) of the terminal device 200 may perform operations of two or more arbitrary embodiments among the first to eleventh embodiments.

For example, the processing unit 340 (for example, the information acquisition unit 341 and the control unit 343) of the terminal device 300 may perform operations of two or more arbitrary embodiments among the first to eleventh embodiments.

<<16. Applications>>

Technology according to one or more of the embodiments of the present disclosure is applicable to various products. A base station 100 may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the base station 100 may be realized as any other types of base stations such as a NodeB and a base transceiver station (BTS). The base station 100 may include a main body (that is also referred to as a base station device) configured to control radio communication, and one or more remote radio heads (RRH) disposed in a different place from the main body. Additionally, various types of terminals to be discussed later may also operate as the base station 100 by temporarily or semi-permanently executing a base station function. Further, at least some of structural elements of the base station 100 may be realized in the base station device or in a module for the base station device.

For example, a terminal device (the terminal device 200 or the terminal device 300) may be realized as a mobile terminal such as a smartphone, a tablet personal computer (PC), a notebook PC, a portable game terminal, a portable/dongle type mobile router, and a digital camera, or an in-vehicle terminal such as a car navigation device. The terminal device may also be realized as a terminal (that is also referred to as a machine type communication (MTC) terminal) that performs machine-to-machine (M2M) communication. Furthermore, at least some of structural elements of the terminal device may be a module (such as an integrated circuit module including a single die) mounted on each of the terminals.

<16.1. Application Related to Base Station>

(First Application)

FIG. 38 is a block diagram illustrating a first example of a schematic configuration of an eNB to which an embodiment of the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 38. For example, the multiple antennas 810 may be compatible with multiple frequency bands used by the eNB 800. Although FIG. 38 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 38. For example, the multiple BB processors 826 may be compatible with multiple frequency bands used by the eNB 800. The radio communication interface 825 may include the multiple RF circuits 827, as illustrated in FIG. 38. For example, the multiple RF circuits 827 may be compatible with multiple antenna elements. Although FIG. 38 illustrates the example in which the radio communication interface 825 includes the multiple BB processors 826 and the multiple RF circuits 827, the radio communication interface 825 may also include a single BB processor 826 or a single RF circuit 827.

In the eNB 800 illustrated in FIG. 38, the information acquisition unit 151 and the control unit 153 described with reference to FIG. 9 may be implemented in the radio communication interface 825. Alternatively, at least some of these components may also be implemented in the controller 821. As an example, the eNB 800 may mount a module including a part (for example, the BB processor 826) or the entire radio communication interface 825 and/or the controller 821, and the information acquisition unit 151 and the control unit 153 may be implemented in the module. In this case, the module may store a program (in other words, a program causing the processor to execute operations of the information acquisition unit 151 and the control unit 153) causing the processor to function as the information acquisition unit 151 and the control unit 153, and execute the program. As another example, a program causing the processor to function as the information acquisition unit 151 and the control unit 153 may be installed in the eNB 800, and the radio communication interface 825 (for example, the BB processor 826) and/or the controller 821 may execute the program. As described above, as a device including the information acquisition unit 151 and the control unit 153, the eNB 800, the base station device 820 or the module may be provided. A program causing the processor to function as the information acquisition unit 151 and the control unit 153 may also be provided. In addition, a readable recording medium in which the program is recorded may be provided.

In addition, in the eNB 800 illustrated in FIG. 38, the radio communication unit 120 described with reference to FIG. 9 may be implemented in the radio communication interface 825 (for example, the RF circuit 827). In addition, the antenna unit 110 may be implemented in the antenna 810. In addition, the network communication unit 130 may be implemented in the controller 821 and/or the network interface 823.

(Second Application)

FIG. 39 is a block diagram illustrating a second example of a schematic configuration of an eNB to which an embodiment of the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 39. For example, the multiple antennas 840 may be compatible with multiple frequency bands used by the eNB 830. Although FIG. 39 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 38.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 38, except the BB processor 856 is connected to the RF circuit 864 of the RRH 860 via the connection interface 857. The radio communication interface 855 may include the multiple BB processors 856, as illustrated in FIG. 39. For example, the multiple BB processors 856 may be compatible with multiple frequency bands used by the eNB 830. Although FIG. 39 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 39. For example, the multiple RF circuits 864 may support multiple antenna elements. Although FIG. 39 illustrates the example in which the radio communication interface 863 includes the multiple RF circuits 864, the radio communication interface 863 may also include a single RF circuit 864.

In the eNB 830 illustrated in FIG. 39, the information acquisition unit 151 and the control unit 153 described with reference to FIG. 9 may be implemented in the radio communication interface 855 and/or the radio communication interface 863. Alternatively, at least some of these components may also be implemented in the controller 851. As an example, the eNB 830 may mount a module including a part (for example, the BB processor 856) or the entire radio communication interface 855 and/or the controller 851, and the information acquisition unit 151 and the control unit 153 may be implemented in the module. In this case, the module may store a program (in other words, a program causing the processor to execute operations of the information acquisition unit 151 and the control unit 153) causing the processor to function as the information acquisition unit 151 and the control unit 153, and execute the program. As another example, a program causing the processor to function as the information acquisition unit 151 and the control unit 153 may be installed in the eNB 830, and the radio communication interface 855 (for example, the BB processor 856) and/or the controller 851 may execute the program. As described above, as a device including the information acquisition unit 151 and the control unit 153, the eNB 830, the base station device 850 or the module may be provided. A program causing the processor to function as the information acquisition unit 151 and the control unit 153 may also be provided. In addition, a readable recording medium in which the program is recorded may be provided.

In addition, in the eNB 830 illustrated in FIG. 39, for example, the radio communication unit 120 described with reference to FIG. 9 may be implemented in the radio communication interface 863 (for example, the RF circuit 864). In addition, the antenna unit 110 may be implemented in the antenna 840. In addition, the network communication unit 130 may be implemented in the controller 851 and/or the network interface 853.

<16.2. Applications Related to Terminal Device>

(First Application)

FIG. 40 is a block diagram illustrating an example of a schematic configuration of a smartphone 900 to which an embodiment of the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 40. Although FIG. 40 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 40. Although FIG. 40 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 40 via feeder lines, which are partially shown as dashed lines in the figure. The auxiliary controller 919 operates a minimum necessary function of the smartphone 900, for example, in a sleep mode.

In the smartphone 900 illustrated in FIG. 40, the information acquisition unit 241 and the control unit 243 described with reference to FIG. 10 may be implemented in the radio communication interface 912. Alternatively, at least some of these components may also be implemented in the processor 901 or the auxiliary controller 919. As an example, the smartphone 900 may mount a module including a part (for example, the BB processor 913) or the entire radio communication interface 912, the processor 901 and/or the auxiliary controller 919, and the information acquisition unit 241 and the control unit 243 may be implemented in the module. In this case, the module may store a program (in other words, a program causing the processor to execute operations of the information acquisition unit 241 and the control unit 243) causing the processor to function as the information acquisition unit 241 and the control unit 243, and execute the program. As another example, a program causing the processor to function as the information acquisition unit 241 and the control unit 243 may be installed in the smartphone 900, and the radio communication interface 912 (for example, the BB processor 913), the processor 901 and/or the auxiliary controller 919 may execute the program. As described above, as a device including the information acquisition unit 241 and the control unit 243, the smartphone 900 or the module may be provided. A program causing the processor to function as the information acquisition unit 241 and the control unit 243 may also be provided. These implementations of the information acquisition unit 241 and the control unit 243 are similar to the information acquisition unit 341 and the control unit 343 described with reference to FIG. 11.

In addition, in the smartphone 900 illustrated in FIG. 40, for example, the radio communication unit 220 described with reference to FIG. 10 may be implemented in the radio communication interface 912 (for example, the RF circuit 914). In addition, the antenna unit 210 may be implemented in the antenna 916. These implementations of the antenna unit 210 and the radio communication unit 220 are similar to the antenna unit 310 and the radio communication unit 320 described with reference to FIG. 11.

(Second Application)

FIG. 41 is a block diagram illustrating an example of a schematic configuration of a car navigation device 920 to which an embodiment of the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 41. Although FIG. 41 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 41. Although FIG. 41 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 41 via feeder lines that are partially shown as dashed lines in the figure. The battery 938 accumulates power supplied form the vehicle.

In the car navigation device 920 illustrated in FIG. 41, the information acquisition unit 241 and the control unit 243 described with reference to FIG. 10 may be implemented in the radio communication interface 933. Alternatively, at least some of these components may also be implemented in the processor 921. As an example, the car navigation device 920 may mount a module including a part (for example, the BB processor 934) or the entire radio communication interface 933 and/or the processor 921, and the information acquisition unit 241 and the control unit 243 may be implemented in the module. In this case, the module may store a program (in other words, a program causing the processor to execute operations of the information acquisition unit 241 and the control unit 243) causing the processor to function as the information acquisition unit 241 and the control unit 243, and execute the program. As another example, a program causing the processor to function as the information acquisition unit 241 and the control unit 243 may be installed in the car navigation device 920, and the radio communication interface 933 (for example, the BB processor 934) and/or the processor 921 may execute the program. As described above, as a device including the information acquisition unit 241 and the control unit 243, the car navigation device 920 or the module may be provided. A program causing the processor to function as the information acquisition unit 241 and the control unit 243 may also be provided. These implementations of the information acquisition unit 241 and the control unit 243 are similar to the information acquisition unit 341 and the control unit 343 described with reference to FIG. 11.

In addition, in the car navigation device 920 illustrated in FIG. 41, for example, the radio communication unit 220 described with reference to FIG. 10 may be implemented in the radio communication interface 933 (for example, the RF circuit 935). In addition, the antenna unit 210 may be implemented in the antenna 937. These implementations of the antenna unit 210 and the radio communication unit 220 are similar to the antenna unit 310 and the radio communication unit 320 described with reference to FIG. 11.

Embodiments of the technology of the present disclosure may also be realized as an in-vehicle system (or a vehicle) 940 including one or more blocks of the car navigation device 920, the in-vehicle network 941, and a vehicle module 942. That is, as a device including the information acquisition unit 241 and the control unit 243 (or the information acquisition unit 341 and the control unit 343), the in-vehicle system (or the vehicle) 940 may be provided. The vehicle module 942 generates vehicle data such as vehicle speed, engine speed, and trouble information, and outputs the generated data to the in-vehicle network 941.

<<17. Conclusion>>

Respective devices and respective processes according to the embodiments of the present disclosure have been described above with reference to FIGS. 1 to 15.

First Embodiment

According to the first embodiment of the present disclosure, the base station 100 includes the information acquisition unit 151 configured to acquire information indicating one or more resource pools serving as the radio resources available for D2D communication and the control unit 153 configured to notify the terminal device of the one or more resource pools. The one or more resource pools are resource pools that are selected from among the resource pool set including multiple resource pools that are determined in advance as candidates for the radio resources available for D2D communication.

According to the first embodiment of the present disclosure, the terminal device 200 includes the information acquisition unit 241 configured to acquire information indicating one or more resource pools serving as the radio resources available for D2D communication and the control unit 243 configured to notify the terminal device of the one or more resource pools. The one or more resource pools are resource pools that are selected from among the resource pool set including multiple resource pools that are determined in advance as candidates for the radio resources available for D2D communication.

In addition, according to the first embodiment of the present disclosure, the terminal device 300 includes the information acquisition unit 341 configured to acquire information indicating one or more resource pools serving as the radio resources available for D2D communication and the control unit 343 configured to control D2D communication by the terminal device 300 in at least one resource pool among the one or more resource pools. The one or more resource pools are resource pools that are selected from among the resource pool set including multiple resource pools that are determined in advance as candidates for the radio resources available for D2D communication.

Accordingly, it is possible to reduce a load necessary for the terminal device to recognize the radio resources available for D2D communication.

(Second Embodiment)

According to the second embodiment of the present disclosure, the base station 100 includes the information acquisition unit 151 configured to acquire information indicating one or more resource pools serving as the radio resources available for D2D communication and the control unit 153 configured to notify the terminal device of the one or more resource pools in a predetermined resource pool.

In addition, according to the second embodiment of the present disclosure, the terminal device 300 includes the information acquisition unit 341 configured to acquire information indicating one or more resource pools serving as the radio resources available for D2D communication from information received by the terminal device 300 in a predetermined resource pool and the control unit 343 configured to control D2D communication by the terminal device 300 in at least one resource pool among the one or more resource pools.

Accordingly, it is possible to reduce a load necessary for the terminal device to recognize the radio resources available for D2D communication.

It should be understood by those skilled in the art that various modifications, combinations, sub-combinations and alterations may occur depending on design requirements and other factors insofar as they are within the scope of the appended claims or the equivalents thereof.

For example, the example in which the communication system is a system compliant with LTE, LTE-Advanced, or communication standards conforming thereto has been described, but the present disclosure is not limited to the example. For example, the communication system may be a system compliant with other communication standards.

Also, the processing steps in a process in this specification are not strictly limited to being executed in a time series following the sequence described in a flowchart. For example, the processing steps in a process may be executed in a sequence that differs from a sequence described herein as a flowchart, and furthermore may be executed in parallel.

In addition, a computer program (in other words, a computer program causing the processor to execute operations of components of the device) causing the processor (for example, the CPU and the DSP) included in devices (for example, the base station, the base station device for the base station, or a module for the base station device, or the terminal device or the module for the terminal device) of this specification to function as components (for example, the information acquisition unit and the control unit) of the device can be created. In addition, a recording medium in which the computer program is recorded may be provided. In addition, a device (for example, a finished product or a module (for example, a component, a processing circuit or a chip) for the finished product) including a memory in which the computer program is stored and one or more processors capable of executing the computer program may be provided. In addition, a method including operations of components (for example, the information acquisition unit and the control unit) of the device may be included in the embodiments of the technology according to the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A device including:

an acquisition unit configured to acquire information indicating one or more resource pools serving as radio resources available for device-to-device communication; and a control unit configured to notify a terminal device of the one or more resource pools, wherein the one or more resource pools are resource pools that are selected from among a resource pool set including multiple resource pools, which are determined in advance as candidates for radio resources available for device-to-device communication.

(2)

The device according to (1), wherein the device is a base station, a base station device for the base station, or a module for the base station device.

(3)

The device according to (2), wherein the control unit notifies the terminal device of the one or more resource pools by reporting system information indicating the one or more resource pools.

(4)

The device according to (1), wherein the device is a terminal device or a module for the terminal device.

(5)

The device according to (4), wherein the control unit notifies the terminal device of the one or more resource pools in each of the one or more resource pools.

(6)

The device according to (4), wherein the control unit notifies the terminal device of the one or more resource pools in a predetermined resource pool included in the resource pool set.

(7)

The device according to any one of (4) to (6), wherein the control unit controls transmission of a synchronization signal in each of the one or more resource pools.

(8)

The device according to any one of (1) to (7), wherein each of the multiple resource pools includes identification information for identifying itself, and wherein the control unit notifies the terminal device of the one or more resource pools by transmission of the identification information of each of the one or more resource pools.

(9)

A device including:

an acquisition unit configured to acquire information indicating one or more resource pools serving as radio resources available for device-to-device communication; and a control unit configured to control device-to-device communication by a terminal device in at least one resource pool among the one or more resource pools, wherein the one or more resource pools are resource pools that are selected from among a resource pool set including multiple resource pools, which are determined in advance as candidates for radio resources available for device-to-device communication.

(10)

The device according to (9), wherein the one or more resource pools are resource pools of which a base station or another terminal device notifies the terminal device.

(11)

The device according to (10), wherein the information indicating the one or more resource pools is information that is transmitted along with a synchronization signal by the another terminal device in each of the one or more resource pools, and wherein the acquisition unit acquires the information indicating the one or more resource pools from information received by the terminal device in the resource pool in which a synchronization signal is detected by the terminal device and which is included in the resource pool set.

(12)

The device according to (10), wherein the one or more resource pools are resource pools of which the another terminal device notifies the terminal device in a predetermined resource pool included in the resource pool set, and wherein the acquisition unit acquires the information indicating the one or more resource pools from information received by the terminal device in the predetermined resource pool.

(13)

A device including:

an acquisition unit configured to acquire information indicating one or more resource pools serving as radio resources available for device-to-device communication; and a control unit configured to notify a terminal device of the one or more resource pools in a predetermined resource pool.

(14)

A device including:

an acquisition unit configured to acquire information indicating one or more resource pools serving as radio resources available for device-to-device communication from information received by a terminal device in a predetermined resource pool; and a control unit configured to control device-to-device communication by the terminal device in at least one resource pool among the one or more resource pools.

(15)

A device including:

an acquisition unit configured to acquire information indicating a change in a resource pool serving as a radio resource available for device-to-device communication; and a control unit configured to notify a terminal device of the change in a primary resource pool among one or more resource pools serving as radio resources available for device-to-device communication.

(16)

The device according to (15), wherein the change includes deleting the resource pool, adding the resource pool, changing the primary resource pool, or changing an application of device-to-device communication performed in the resource pool.

(17)

The device according to (15) or (16), wherein the control unit notifies the terminal device of the primary resource pool.

(18)

The device according to any one of (15) to (17), wherein the device is another terminal device different from the terminal device or a module for the another terminal device, wherein the one or more resource pools are resource pools selected by the another terminal device, and wherein the primary resource pool is a resource pool unique to the another terminal device.

(19)

The device according to (15) to (17), wherein the device is another terminal device different from the terminal device or a module for the another terminal device, wherein the one or more resource pools are resource pools selected by a base station, and wherein the primary resource pool is a resource pool unique to the base station.

(20)

A device including:

an acquisition unit configured to acquire information indicating a change in a resource pool serving as a radio resource available for device-to-device communication from information received by a terminal device in a primary resource pool among one or more resource pools serving as radio resources available for device-to-device communication; and a control unit configured to control device-to-device communication by the terminal device in at least one resource pool in accordance with the change.

(21)

A device including:

an acquisition unit configured to acquire information indicating a change in a resource pool serving as a radio resource available for device-to-device communication; and a control unit configured to notify a terminal device of the change by at least one of reporting of system information indicating the change and separate signaling.

(22)

A device including:

an acquisition unit configured to acquire information indicating an in-coverage resource pool serving as a radio resource available for device-to-device communication within a network coverage area and an out-of-coverage resource pool serving as a radio resource available for device-to-device communication outside of the network coverage area; and a control unit configured to control device-to-device communication by a terminal device in a manner that the terminal device transmits a signal of device-to-device communication in both of the in-coverage resource pool and the out-of-coverage resource pool when received power in the terminal device of a signal transmitted by a base station is less than first power and is greater than second power which is less than the first power.

(23)

The device according to (22), wherein the control unit controls device-to-device communication by the terminal device in a manner that the terminal device transmits a signal of same information in both of the in-coverage resource pool and the out-of-coverage resource pool.

(24)

The device according to (22) or (23), wherein the control unit controls device-to-device communication by the terminal device in a manner that the terminal device transmits a signal of device-to-device communication in the in-coverage resource pool when the received power is greater than the first power, and wherein the control unit controls device-to-device communication by the terminal device in a manner that the terminal device transmits a signal of device-to-device communication in the out-of-coverage resource pool when the received power is less than the second power.

(25)

The device according to any one of (22) to (24), wherein the signal transmitted by the base station is a reference signal, and wherein the received power is reference signal received power (RSRP).

(26)

A device including:

an acquisition unit configured to acquire information indicating an in-coverage resource pool serving as a radio resource available for device-to-device communication within a network coverage area and an out-of-coverage resource pool serving as a radio resource available for device-to-device communication outside of the network coverage area; and a control unit configured to notify a terminal device of the in-coverage resource pool and the out-of-coverage resource pool.

(27)

A device including:

an acquisition unit configured to acquire information indicating a resource pool group that is used by a synchronized terminal device and includes one or more resource pools serving as radio resources available for device-to-device communication; and a control unit configured to notify a terminal device of the resource pool group.

(28)

The device according to (27), wherein the synchronized terminal device includes a terminal device that is synchronized based on a synchronization signal transmitted by one transmission source.

(29)

The device according to (28), wherein the synchronized terminal device further includes a terminal device that is synchronized based on a synchronization signal transmitted by another transmission source synchronized with the one transmission source.

(30)

The device according to (29), wherein the another transmission source includes a transmission source configured to relay the synchronization signal transmitted by the one transmission source.

(31)

The device according to any one of (27) to (30), wherein the resource pool group includes two or more resource pools serving as radio resources available for device-to-device communication.

(32)

The device according to any one of (27) to (31), wherein the device is a base station, a base station device for the base station, or a module for the base station device, and wherein the control unit notifies the terminal device of the resource pool group by reporting system information indicating the resource pool group.

(33)

The device according to any one of (27) to (31), wherein the device is a terminal device or a module for the terminal device, and wherein the control unit notifies a terminal device of the resource pool group in at least one resource pool included in the resource pool group.

(34)

A device including:

an acquisition unit configured to acquire information indicating a resource pool group that is used by a synchronized terminal device and includes one or more resource pools serving as radio resources available for device-to-device communication; and a control unit configured to control device-to-device communication by a terminal device in a manner that the terminal device omits synchronization based on a synchronization signal transmitted in at least one resource pool included in the resource pool group.

(35)

A device including:

an acquisition unit configured to acquire information indicating an application of device-to-device communication that is performed in each of one or more resource pools serving as radio resources available for device-to-device communication; and a control unit configured to notify a terminal device of the application.

(36)

The device according to (35), wherein the application includes an urgent application and a non-urgent application, an application for public safety and an application other than one for public safety, or an out-of-coverage application and an in-coverage application.

(37)

The device according to (35) or (36), wherein the device is a base station, a base station device for the base station, or a module for the base station device, and wherein the control unit notifies the terminal device of the application by reporting system information indicating the application.

(38)

The device according to (35) or (36), wherein the device is a terminal device or a module for the terminal device, and wherein the control unit notifies a terminal device of the application in the resource pool serving as a radio resource available for device-to-device communication.

(39)

A device including:

an acquisition unit configured to acquire information indicating an application of device-to-device communication that is performed in each of one or more resource pools serving as radio resources available for device-to-device communication; and a control unit configured to control device-to-device communication by a terminal device in a manner that the terminal device performs device-to-device communication in a desired application in a resource pool in which device-to-device communication is performed in the desired application among the one or more resource pools.

(40)

A device including:

an acquisition unit configured to acquire information indicating a desired application of device-to-device communication of a terminal device; and a control unit configured to notify the terminal device of one or more resource pools in which device-to-device communication is performed in the desired application and which are one or more resource pools serving as radio resources available for device-to-device communication.

(41)

The device according to (40), wherein the control unit selects one or more resource pools appropriate for device-to-device communication in the desired application as the one or more resource pools in which device-to-device communication is performed in the desired application.

(42)

The device according to (41), wherein the one or more resource pools appropriate for device-to-device communication in the desired application are one or more resource pools having a period appropriate for device-to-device communication in the desired application or the appropriate number of resource pools for device-to-device communication in the desired application.

(43)

The device according to any one of (40) (42), wherein the acquisition unit acquires information indicating a desired application of device-to-device communication of a separate terminal device, and wherein the control unit separately notifies the separate terminal device of one or more resource pools in which device-to-device communication is performed in the desired application.

(44)

The device according to any one of (40) to (42), wherein the control unit notifies the terminal device of one or more resource pools in which device-to-device communication is performed in the desired application and an application of device-to-device communication performed in the one or more resource pools.

(45)

A device including:

an acquisition unit configured to acquire information indicating a desired application of device-to-device communication of a terminal device; and a control unit configured to notify a base station or another terminal device of the desired application, wherein the control unit controls device-to-device communication in the desired application by the terminal device in at least one resource pool among one or more resource pools of which the base station or the other terminal device notifies the terminal device, and wherein the one or more resource pools are radio resources available for device-to-device communication and are resource pools in which device-to-device communication is performed in the desired application.

(46)

A device including:

an acquisition unit configured to acquire information indicating the number of terminal devices configured to perform device-to-device communication; and a control unit configured to select a resource pool serving as a radio resource available for device-to-device communication based on the number of terminal devices configured to perform device-to-device communication, wherein the control unit notifies the terminal device of the resource pool.

(47)

The device according to (46), wherein the control unit selects a greater number of resource pools when the number is greater, and selects a smaller number of resource pools when the number is smaller.

(48)

The device according to (46) or (47), wherein the control unit selects a resource pool having a shorter period when the number is greater and selects a resource pool having a longer period when the number is smaller.

(49)

The device according to any one of (46) to (48), wherein the acquisition unit acquires information indicating the number of terminal devices configured to perform device-to-device communication in a first application and information indicating the number of terminal devices configured to perform device-to-device communication in a second application, and wherein the control unit selects a resource pool in which device-to-device communication is performed in the first application on the basis of the number of terminal devices configured to perform device-to-device communication in the first application and selects a resource pool in which device-to-device communication is performed in the second application on the basis of the number of terminal devices configured to perform device-to-device communication in the second application.

(50)

The device according to (46) to (49), wherein the device is a base station, a base station device for the base station, or a module for the base station device, and wherein the number of terminal devices configured to perform device-to-device communication is the number of terminal devices including a terminal device in a connection mode that is connected to the base station and a terminal device in an idle mode that is not connected to the base station, and is calculated based on information provided to the base station by the terminal device in the connection mode.

(51)

A device including:

an acquisition unit configured to acquire information indicating a transmission resource pool serving as a radio resource available for transmission in device-to-device communication and a retransmission resource pool serving as a radio resource available for retransmission in device-to-device communication; and a control unit configured to notify a terminal device of the transmission resource pool and the retransmission resource pool.

(52)

The device according to (51), wherein the acquisition unit acquires information indicating the transmission resource pool and information indicating two or more retransmission resource pools serving as radio resources available for retransmission in device-to-device communication, wherein the control unit notifies the terminal device of the transmission resource pool and the two or more retransmission resource pools, and wherein the two or more retransmission resource pools include a first retransmission resource pool serving as a radio resource available for first-time retransmission and a second retransmission resource pool serving as a radio resource available for second-time retransmission.

(53)

The device according to (51) or (52), wherein the device is a base station, a base station device for the base station, or a module for the base station device, and wherein the control unit notifies the terminal device of the transmission resource pool and the retransmission resource pool by reporting system information indicating the transmission resource pool and the retransmission resource pool.

(54)

The device according to (51) or (52), wherein the device is a terminal device or a module for the terminal device, and wherein the control unit notifies a terminal device of the transmission resource pool and the retransmission resource pool in a resource pool serving as a radio resource available for device-to-device communication.

(55)

A device including:

an acquisition unit configured to acquire information indicating a transmission resource pool serving as a radio resource available for transmission in device-to-device communication and a retransmission resource pool serving as a radio resource available for retransmission in device-to-device communication; and a control unit configured to control device-to-device communication of a terminal device in a manner that the terminal device performs transmission in the transmission resource pool in device-to-device communication and the terminal device performs retransmission in the retransmission resource pool in device-to-device communication.

(56)

A device including:

an acquisition unit configured to acquire information indicating an audio resource pool serving as a radio resource available for transmitting audio data in device-to-device communication and another resource pool serving as a radio resource available for transmitting another data in device-to-device communication; and a control unit configured to notify a terminal device of the audio resource pool and the another resource pool.

(57)

The device according to (56), wherein the device is a base station, a base station device for the base station, or a module for the base station device, and wherein the control unit notifies the terminal device of the audio resource pool and the another resource pool by reporting system information indicating the audio resource pool and the another resource pool.

(58)

The device according to (56), wherein the device is a terminal device or a module for the terminal device, and wherein the control unit notifies a terminal device of the audio resource pool and the another resource pool in a resource pool serving as a radio resource available for device-to-device communication.

(59)

A device including:

an acquisition unit configured to acquire information indicating an audio resource pool serving as a radio resource available for transmitting audio data in device-to-device communication and another resource pool serving as a radio resource available for transmitting another data in device-to-device communication; and a control unit configured to control device-to-device communication of a terminal device in a manner that the terminal device transmits audio data in the audio resource pool in device-to-device communication and the terminal device transmits another data in the another resource pool in device-to-device communication.

(60)

A method including:

acquiring information indicating one or more resource pools serving as radio resources available for device-to-device communication; and notifying, by a processor, a terminal device of the one or more resource pools, wherein the one or more resource pools are resource pools that are selected from among a resource pool set including multiple resource pools, which are determined in advance as candidates for radio resources available for device-to-device communication.

(61)

A program causing a processor to execute:

acquiring information indicating one or more resource pools serving as radio resources available for device-to-device communication; and notifying a terminal device of the one or more resource pools, wherein the one or more resource pools are resource pools that are selected from among a resource pool set including multiple resource pools, which are determined in advance as candidates for radio resources available for device-to-device communication.

(62)

A non-transitory computer-readable recording medium having a program recorded thereon, the program causing a processor to execute:

acquiring information indicating one or more resource pools serving as radio resources available for device-to-device communication; and notifying a terminal device of the one or more resource pools, wherein the one or more resource pools are resource pools that are selected from among a resource pool set including multiple resource pools, which are determined in advance as candidates for radio resources available for device-to-device communication.

(63)

A method including:

acquiring information indicating one or more resource pools serving as radio resources available for device-to-device communication; and controlling, by a processor, device-to-device communication by a terminal device in at least one resource pool among the one or more resource pools, wherein the one or more resource pools are resource pools that are selected from among a resource pool set including multiple resource pools, which are determined in advance as candidates for radio resources available for device-to-device communication.

(64)

A program causing a processor to execute:

acquiring information indicating one or more resource pools serving as radio resources available for device-to-device communication; and controlling device-to-device communication by a terminal device in at least one resource pool among the one or more resource pools, wherein the one or more resource pools are resource pools that are selected from among a resource pool set including multiple resource pools, which are determined in advance as candidates for radio resources available for device-to-device communication.

(65)

A non-transitory computer-readable recording medium having a program recorded thereon, the program causing a processor to execute:

acquiring information indicating one or more resource pools serving as radio resources available for device-to-device communication; and controlling device-to-device communication by a terminal device in at least one resource pool among the one or more resource pools, wherein the one or more resource pools are resource pools that are selected from among a resource pool set including multiple resource pools, which are determined in advance as candidates for radio resources available for device-to-device communication.

(66)

A method including:

acquiring information indicating one or more resource pools serving as radio resources available for device-to-device communication; and notifying, by a processor, a terminal device of the one or more resource pools in a predetermined resource pool.

(67)

A program causing a processor to execute:

acquiring information indicating one or more resource pools serving as radio resources available for device-to-device communication; and notifying a terminal device of the one or more resource pools in a predetermined resource pool.

(68)

A non-transitory computer-readable recording medium having a program recorded thereon, the program causing a processor to execute:

acquiring information indicating one or more resource pools serving as radio resources available for device-to-device communication; and notifying a terminal device of the one or more resource pools in a predetermined resource pool.

(69)

A method including:

acquiring information indicating one or more resource pools serving as radio resources available for device-to-device communication from information received by a terminal device in a predetermined resource pool; and controlling, by a processor, device-to-device communication by the terminal device in at least one resource pool among the one or more resource pools.

(70)

A program causing a processor to execute:

acquiring information indicating one or more resource pools serving as radio resources available for device-todevice communication from information received by a terminal device in a predetermined resource pool; and controlling device-to-device communication by the terminal device in at least one resource pool among the one or more resource pools.

(71)

A non-transitory computer-readable recording medium having a program recorded thereon, the program causing a processor to execute:

acquiring information indicating one or more resource pools serving as radio resources available for device-to-device communication from information received by a terminal device in a predetermined resource pool; and controlling device-to-device communication by the terminal device in at least one resource pool among the one or more resource pools.

(72)

A method including:

acquiring information indicating a change in a resource pool serving as a radio resource available for device-to-device communication; and notifying, by a processor, a terminal device of the change in a primary resource pool among one or more resource pools serving as radio resources available for device-to-device communication.

(73)

A program causing a processor to execute:

acquiring information indicating a change in a resource pool serving as a radio resource available for device-to-device communication; and notifying, a terminal device of the change in a primary resource pool among one or more resource pools serving as radio resources available for device-to-device communication.

(74)

A non-transitory computer-readable recording medium having a program recorded thereon, the program causing a processor to execute:

acquiring information indicating a change in a resource pool serving as a radio resource available for device-to-device communication; and notifying, a terminal device of the change in a primary resource pool among one or more resource pools serving as radio resources available for device-to-device communication.

(75)

A method including:

acquiring information indicating a change in a resource pool serving as a radio resource available for device-to-device communication from information received by a terminal device in a primary resource pool among one or more resource pools serving as radio resources available for device-to-device communication; and controlling, by a processor, device-to-device communication by the terminal device in at least one resource pool in accordance with the change.

(76)

A program causing a processor to execute:

acquiring information indicating a change in a resource pool serving as a radio resource available for device-to-device communication from information received by a terminal device in a primary resource pool among one or more resource pools serving as radio resources available for device-to-device communication; and controlling device-to-device communication by the terminal device in at least one resource pool in accordance with the change.

(77)

A non-transitory computer-readable recording medium having a program recorded thereon, the program causing a processor to execute:

acquiring information indicating a change in a resource pool serving as a radio resource available for device-to-device communication from information received by a terminal device in a primary resource pool among one or more resource pools serving as radio resources available for device-to-device communication; and controlling device-to-device communication by the terminal device in at least one resource pool in accordance with the change.

(78)

A method including:

acquiring information indicating a change in a resource pool serving as a radio resource available for device-to-device communication; and notifying, by a processor, a terminal device of the change by at least one of reporting of system information indicating the change and separate signaling.

(79)

A program causing a processor to execute:

acquiring information indicating a change in a resource pool serving as a radio resource available for device-to-device communication; and notifying a terminal device of the change by at least one of reporting of system information indicating the change and separate signaling.

(80)

A non-transitory computer-readable recording medium having a program recorded thereon, the program causing a processor to execute:

acquiring information indicating a change in a resource pool serving as a radio resource available for device-to-device communication; and notifying a terminal device of the change by at least one of reporting of system information indicating the change and separate signaling.

(81)

A method including:

acquiring information indicating an in-coverage resource pool serving as a radio resource available for device-to-device communication within a network coverage area and an out-of-coverage resource pool serving as a radio resource available for device-to-device communication outside of the network coverage area; and controlling, by a processor, device-to-device communication by a terminal device in a manner that the terminal device transmits a signal of device-to-device communication in both of the in-coverage resource pool and the out-of-coverage resource pool when received power in the terminal device of a signal transmitted by a base station is less than first power and is greater than second power which is less than the first power.

(82)

A program causing a processor to execute:

acquiring information indicating an in-coverage resource pool serving as a radio resource available for device-to-device communication within a network coverage area and an out-of-coverage resource pool serving as a radio resource available for device-to-device communication outside of the network coverage area; and controlling device-to-device communication by a terminal device in a manner that the terminal device transmits a signal of device-to-device communication in both of the in-coverage resource pool and the out-of-coverage resource pool when received power in the terminal device of a signal transmitted by a base station is less than first power and is greater than second power which is less than the first power.

(83)

A non-transitory computer-readable recording medium having a program recorded thereon, the program causing a processor to execute:

acquiring information indicating an in-coverage resource pool serving as a radio resource available for device-to-device communication within a network coverage area and an out-of-coverage resource pool serving as a radio resource available for device-to-device communication outside of the network coverage area; and controlling device-to-device communication by a terminal device in a manner that the terminal device transmits a signal of device-to-device communication in both of the in-coverage resource pool and the out-of-coverage resource pool when received power in the terminal device of a signal transmitted by a base station is less than first power and is greater than second power which is less than the first power.

(84)

A method including:

acquiring information indicating an in-coverage resource pool serving as a radio resource available for device-to-device communication within a network coverage area and an out-of-coverage resource pool serving as a radio resource available for device-to-device communication outside of the network coverage area; and notifying, by a processor, a terminal device of the in-coverage resource pool and the out-of-coverage resource pool.

(85)

A program causing a processor to execute:

acquiring information indicating an in-coverage resource pool serving as a radio resource available for device-to-device communication within a network coverage area and an out-of-coverage resource pool serving as a radio resource available for device-to-device communication outside of the network coverage area; and notifying a terminal device of the in-coverage resource pool and the out-of-coverage resource pool.

(86)

A non-transitory computer-readable recording medium having a program recorded thereon, the program causing a processor to execute:

acquiring information indicating an in-coverage resource pool serving as a radio resource available for device-to-device communication within a network coverage area and an out-of-coverage resource pool serving as a radio resource available for device-to-device communication outside of the network coverage area; and notifying a terminal device of the in-coverage resource pool and the out-of-coverage resource pool.

(87)

A method including:

acquiring information indicating a resource pool group that is used by a synchronized terminal device and includes one or more resource pools serving as radio resources available for device-to-device communication; and notifying, by a processor, a terminal device of the resource pool group.

(88)

A program causing a processor to execute:

acquiring information indicating a resource pool group that is used by a synchronized terminal device and includes one or more resource pools serving as radio resources available for device-to-device communication; and notifying a terminal device of the resource pool group.

(89)

A non-transitory computer-readable recording medium having a program recorded thereon, the program causing a processor to execute:

acquiring information indicating a resource pool group that is used by a synchronized terminal device and includes one or more resource pools serving as radio resources available for device-to-device communication; and notifying a terminal device of the resource pool group.

(90)

A method including:

acquiring information indicating a resource pool group that is used by a synchronized terminal device and includes one or more resource pools serving as radio resources available for device-to-device communication; and controlling, by a processor, device-to-device communication by a terminal device in a manner that the terminal device omits synchronization based on a synchronization signal transmitted in at least one resource pool included in the resource pool group.

(91)

A program causing a processor to execute:

acquiring information indicating a resource pool group that is used by a synchronized terminal device and includes one or more resource pools serving as radio resources available for device-to-device communication; and controlling device-to-device communication by a terminal device in a manner that the terminal device omits synchronization based on a synchronization signal transmitted in at least one resource pool included in the resource pool group.

(92)

A non-transitory computer-readable recording medium having a program recorded thereon, the program causing a processor to execute:

acquiring information indicating a resource pool group that is used by a synchronized terminal device and includes one or more resource pools serving as radio resources available for device-to-device communication; and controlling device-to-device communication by a terminal device in a manner that the terminal device omits synchronization based on a synchronization signal transmitted in at least one resource pool included in the resource pool group.

(93)

A method including:

acquiring information indicating an application of device-to-device communication that is performed in each of one or more resource pools serving as radio resources available for device-to-device communication; and notifying, by a processor, a terminal device of the application.

(94)

A program causing a processor to execute:

acquiring information indicating an application of device-to-device communication that is performed in each of one or more resource pools serving as radio resources available for device-to-device communication; and notifying a terminal device of the application.

(95)

A non-transitory computer-readable recording medium having a program recorded thereon, the program causing a processor to execute:

acquiring information indicating an application of device-to-device communication that is performed in each of one or more resource pools serving as radio resources available for device-to-device communication; and notifying a terminal device of the application. (96)

A method including:

acquiring information indicating an application of device-to-device communication that is performed in each of one or more resource pools serving as radio resources available for device-to-device communication; and controlling, by a processor, device-to-device communication by a terminal device in a manner that the terminal device performs device-to-device communication in a desired application in a resource pool in which device-to-device communication is performed in the desired application among the one or more resource pools.

(97)

A program causing a processor to execute:

acquiring information indicating an application of device-to-device communication that is performed in each of one or more resource pools serving as radio resources available for device-to-device communication; and controlling device-to-device communication by a terminal device in a manner that the terminal device performs device-to-device communication in a desired application in a resource pool in which device-to-device communication is performed in the desired application among the one or more resource pools.

(98)

A non-transitory computer-readable recording medium having a program recorded thereon, the program causing a processor to execute:

acquiring information indicating an application of device-to-device communication that is performed in each of one or more resource pools serving as radio resources available for device-to-device communication; and controlling device-to-device communication by a terminal device in a manner that the terminal device performs device-to-device communication in a desired application in a resource pool in which device-to-device communication is performed in the desired application among the one or more resource pools.

(99)

A method including:

acquiring information indicating a desired application of device-to-device communication of a terminal device; and notifying, by a processor, the terminal device of one or more resource pools in which device-to-device communication is performed in the desired application and which are one or more resource pools serving as radio resources available for device-to-device communication.

(100)

A program causing a processor to execute:

acquiring information indicating a desired application of device-to-device communication of a terminal device; and notifying the terminal device of one or more resource pools in which device-to-device communication is performed in the desired application and which are one or more resource pools serving as radio resources available for device-to-device communication.

(101)

A non-transitory computer-readable recording medium having a program recorded thereon, the program causing a processor to execute:

acquiring information indicating a desired application of device-to-device communication of a terminal device; and notifying the terminal device of one or more resource pools in which device-to-device communication is performed in the desired application and which are one or more resource pools serving as radio resources available for device-to-device communication.

(102)

A method including:

acquiring information indicating a desired application of device-to-device communication of a terminal device;

notifying, by a processor, a base station or another terminal device of the desired application; and controlling, by the processor, device-to-device communication in the desired application by the terminal device in at least one resource pool among one or more resource pools of which the base station or the other terminal device notifies the terminal device, and wherein the one or more resource pools are radio resources available for device-to-device communication and are resource pools in which device-to-device communication is performed in the desired application.

(103)

A program causing a processor to execute:

acquiring information indicating a desired application of device-to-device communication of a terminal device;

notifying a base station or another terminal device of the desired application; and controlling device-to-device communication in the desired application by the terminal device in at least one resource pool among one or more resource pools of which the base station or the other terminal device notifies the terminal device, and wherein the one or more resource pools are radio resources available for device-to-device communication and are resource pools in which device-to-device communication is performed in the desired application.

(104)

A non-transitory computer-readable recording medium having a program recorded thereon, the program causing a processor to execute:

acquiring information indicating a desired application of device-to-device communication of a terminal device;

notifying a base station or another terminal device of the desired application; and controlling device-to-device communication in the desired application by the terminal device in at least one resource pool among one or more resource pools of which the base station or the other terminal device notifies the terminal device, and wherein the one or more resource pools are radio resources available for device-to-device communication and are resource pools in which device-to-device communication is performed in the desired application.

(105)

A method including:

acquiring information indicating the number of terminal devices configured to perform device-to-device communication;

selecting, by a processor, a resource pool serving as a radio resource available for device-to-device communication based on the number of terminal devices configured to perform device-to-device communication; and notifying, by a processor, the terminal device of the resource pool.

(106)

A program causing a processor to execute:

acquiring information indicating the number of terminal devices configured to perform device-to-device communication;

selecting a resource pool serving as a radio resource available for device-to-device communication based on the number of terminal devices configured to perform device-to-device communication; and notifying the terminal device of the resource pool.

(107)

A non-transitory computer-readable recording medium having a program recorded thereon, the program causing a processor to execute:

acquiring information indicating the number of terminal devices configured to perform device-to-device communication;

selecting a resource pool serving as a radio resource available for device-to-device communication based on the number of terminal devices configured to perform device-to-device communication; and notifying the terminal device of the resource pool.

(108)

A method including:

acquiring information indicating a transmission resource pool serving as a radio resource available for transmission in device-to-device communication and a retransmission resource pool serving as a radio resource available for retransmission in device-to-device communication; and notifying, by a processor, a terminal device of the transmission resource pool and the retransmission resource pool.

(109)

A program causing a processor to execute:

acquiring information indicating a transmission resource pool serving as a radio resource available for transmission in device-to-device communication and a retransmission resource pool serving as a radio resource available for retransmission in device-to-device communication; and notifying a terminal device of the transmission resource pool and the retransmission resource pool.

(110)

A non-transitory computer-readable recording medium having a program recorded thereon, the program causing a processor to execute:

acquiring information indicating a transmission resource pool serving as a radio resource available for transmission in device-to-device communication and a retransmission resource pool serving as a radio resource available for retransmission in device-to-device communication; and notifying a terminal device of the transmission resource pool and the retransmission resource pool.

(111)

A method including:

acquiring information indicating a transmission resource pool serving as a radio resource available for transmission in device-to-device communication and a retransmission resource pool serving as a radio resource available for retransmission in device-to-device communication; and controlling, by a processor, device-to-device communication of a terminal device in a manner that the terminal device performs transmission in the transmission resource pool in device-to-device communication and the terminal device performs retransmission in the retransmission resource pool in device-to-device communication.

(112)

A program causing a processor to execute:

acquiring information indicating a transmission resource pool serving as a radio resource available for transmission in device-to-device communication and a retransmission resource pool serving as a radio resource available for retransmission in device-to-device communication; and controlling device-to-device communication of a terminal device in a manner that the terminal device performs transmission in the transmission resource pool in device-to-device communication and the terminal device performs retransmission in the retransmission resource pool in device-to-device communication.

(113)

A non-transitory computer-readable recording medium having a program recorded thereon, the program causing a processor to execute:

acquiring information indicating a transmission resource pool serving as a radio resource available for transmission in device-to-device communication and a retransmission resource pool serving as a radio resource available for retransmission in device-to-device communication; and controlling device-to-device communication of a terminal device in a manner that the terminal device performs transmission in the transmission resource pool in device-to-device communication and the terminal device performs retransmission in the retransmission resource pool in device-to-device communication.

(114)

A method including:

acquiring information indicating an audio resource pool serving as a radio resource available for transmitting audio data in device-to-device communication and another resource pool serving as a radio resource available for transmitting another data in device-to-device communication; and notifying, by a processor, a terminal device of the audio resource pool and the another resource pool.

(115)

A program causing a processor to execute:

acquiring information indicating an audio resource pool serving as a radio resource available for transmitting audio data in device-to-device communication and another resource pool serving as a radio resource available for transmitting another data in device-to-device communication; and notifying a terminal device of the audio resource pool and the another resource pool.

(116)

A non-transitory computer-readable recording medium having a program recorded thereon, the program causing a processor to execute:

acquiring information indicating an audio resource pool serving as a radio resource available for transmitting audio data in device-to-device communication and another resource pool serving as a radio resource available for transmitting another data in device-to-device communication; and notifying a terminal device of the audio resource pool and the another resource pool.

(117)

A method including:

acquiring information indicating an audio resource pool serving as a radio resource available for transmitting audio data in device-to-device communication and another resource pool serving as a radio resource available for transmitting another data in device-to-device communication; and controlling, by a processor, device-to-device communication of a terminal device in a manner that the terminal device transmits audio data in the audio resource pool in device-to-device communication and the terminal device transmits another data in the another resource pool in device-to-device communication.

(118)
A program causing a processor to execute:
acquiring information indicating an audio resource pool serving as a radio resource available for transmitting audio data in device-to-device communication and another resource pool serving as a radio resource available for transmitting another data in device-to-device communication; and
controlling device-to-device communication of a terminal device in a manner that the terminal device transmits audio data in the audio resource pool in device-to-device communication and the terminal device transmits another data in the another resource pool in device-to-device communication.

(119)
A program causing a processor to execute:
acquiring information indicating an audio resource pool serving as a radio resource available for transmitting audio data in device-to-device communication and another resource pool serving as a radio resource available for transmitting another data in device-to-device communication; and
controlling device-to-device communication of a terminal device in a manner that the terminal device transmits audio data in the audio resource pool in device-to-device communication and the terminal device transmits another data in the another resource pool in device-to-device communication.

(120)
A device comprising:
circuitry configured to
acquire information indicating one or more resource pools serving as radio resources available for device-to-device communication; and
notify a terminal device of the one or more resource pools,
wherein the one or more resource pools are resource pools that are selected from among a resource pool set including multiple resource pools, which are determined in advance as candidates for radio resources available for device-to-device communication.

(121)
The device according to (120), wherein the device is a base station, a base station device for the base station, or a module for the base station device.

(122)
The device according to (121), wherein the circuitry is further configured to notify the terminal device of the one or more resource pools by reporting system information indicating the one or more resource pools.

(123)
The device according to any one of (120) to (122), wherein the device is a terminal device or a module for the terminal device.

(124)
The device according to (123), wherein the circuitry is further configured to notify the terminal device of the one or more resource pools in each of the one or more resource pools.

(125)
The device according to (123) or (124), wherein the circuitry is further configured to notify the terminal device of the one or more resource pools in a predetermined resource pool included in the resource pool set.

(126)
The device according to any one of (123) to (125), wherein the circuitry is configured to control transmission of synchronization information in each of the one or more resource pools.

(127)
The device according to any one of (120) to (126),
wherein each of the multiple resource pools includes identification information for identifying itself, and
wherein the circuitry is further configured to notify the terminal device of the one or more resource pools by transmission of the identification information of each of the one or more resource pools.

(128)
A device comprising:
circuitry configured to
acquire information indicating one or more resource pools serving as radio resources available for device-to-device communication; and
control device-to-device communication by a terminal device in at least one resource pool among the one or more resource pools,
wherein the one or more resource pools are resource pools that are selected from among a resource pool set including multiple resource pools, which are determined in advance as candidates for radio resources available for device-to-device communication.

(129)
The device according to (128), wherein the one or more resource pools are resource pools of which a base station or another terminal device notifies the terminal device.

(130)
The device according to (129),
wherein the information indicating the one or more resource pools is information that is transmitted along with synchronization information by the another terminal device in each of the one or more resource pools, and
wherein the circuitry is further configured to acquire the information indicating the one or more resource pools from information received by the terminal device in the resource pool in which the synchronization information is detected by the terminal device and which is included in the resource pool set.

(131)
The device according to (128) or (129),
wherein the one or more resource pools are resource pools of which the another terminal device notifies the terminal device in a predetermined resource pool included in the resource pool set, and
wherein the circuitry is further configured to acquire the information indicating the one or more resource pools from information received by the terminal device in the predetermined resource pool.

(132)
A device comprising:
circuitry configured to
acquire information indicating one or more resource pools serving as radio resources available for device-to-device communication; and
notify a terminal device of the one or more resource pools in a predetermined resource pool.

(133)
A device comprising:
circuitry configured to
acquire information indicating one or more resource pools serving as radio resources available for device-to-device communication from information received by a terminal device in a predetermined resource pool; and
control device-to-device communication by the terminal device in at least one resource pool among the one or more resource pools.

(134)
A device comprising:
circuitry configured to
acquire information indicating a change in a resource pool serving as a radio resource available for device-to-device communication; and
notify a terminal device of the change in a primary resource pool among one or more resource pools serving as radio resources available for device-to-device communication.

(135)
The device according to (134), wherein the change includes deleting the resource pool, adding the resource pool, changing the primary resource pool, or changing an application of device-to-device communication performed in the resource pool.

(136)
The device according to (134) or (135), wherein the circuitry is further configured to notify the terminal device of the primary resource pool.

(137)
The device according to any one of (134) to (136),
wherein the device is another terminal device different from the terminal device or a module for the another terminal device,
wherein the one or more resource pools are resource pools selected by the another terminal device, and
wherein the primary resource pool is a resource pool unique to the another terminal device.

(138)
The device according to (134) to (137),
wherein the device is another terminal device different from the terminal device or a module for the another terminal device,
wherein the one or more resource pools are resource pools selected by a base station, and
wherein the primary resource pool is a resource pool unique to the base station.

(139)
A device comprising:
circuitry configured to
acquire information indicating a change in a resource pool serving as a radio resource available for device-to-device communication from information received by a terminal device in a primary resource pool among one or more resource pools serving as radio resources available for device-to-device communication; and
control device-to-device communication by the terminal device in at least one resource pool in accordance with the change.

(140)
A device comprising:
circuitry configured to
acquire information indicating a change in a resource pool serving as a radio resource available for device-to-device communication; and
notify a terminal device of the change by at least one of reporting of system information indicating the change and separate signaling.

(141)
A device comprising:
circuitry configured to
acquire information indicating an in-coverage resource pool serving as a radio resource available for device-to-device communication within a network coverage area and an out-of-coverage resource pool serving as a radio resource available for device-to-device communication outside of the network coverage area.

(142)
The device according to (141), wherein the circuitry is further configured to control device-to-device communication by the terminal device in a manner that the terminal device transmits a signal of same information in both of the in-coverage resource pool and the out-of-coverage resource pool.

(143)
A device comprising:
circuitry configured to
acquire information indicating an in-coverage resource pool serving as a radio resource available for device-to-device communication within a network coverage area and an out-of-coverage resource pool serving as a radio resource available for device-to-device communication outside of the network coverage area; and
notify a terminal device of the in-coverage resource pool and the out-of-coverage resource pool.

(144)
A device comprising:
circuitry configured to
acquire information indicating a resource pool group that is used by a synchronized terminal device and includes one or more resource pools serving as radio resources available for device-to-device communication; and
notify a terminal device of the resource pool group.

(145)
The device according to (144), wherein the synchronized terminal device includes a terminal device that is synchronized based on synchronization information transmitted by one transmission source.

(146)
The device according to (145), wherein the synchronized terminal device further includes a terminal device that is synchronized based on synchronization information transmitted by another transmission source synchronized with the one transmission source.

(147)
The device according to (145) or (146), wherein the other transmission source includes a transmission source configured to relay the synchronization information transmitted by the one transmission source.

(148)
The device according to any one of (144) to (147), wherein the resource pool group includes two or more resource pools serving as radio resources available for device-to-device communication.

(149)
The device according to any one of (144) to (148),
wherein the device is a base station, a base station device for the base station, or a module for the base station device, and
wherein the circuitry is further configured to notify the terminal device of the resource pool group by reporting system information indicating the resource pool group.

(150)
The device according to any one of (144) to (149),
wherein the device is a terminal device or a module for the terminal device, and
wherein the circuitry is further configured to notify a terminal device of the resource pool group in at least one resource pool included in the resource pool group.

(151)
A device comprising:
circuitry configured to
acquire information indicating a resource pool group that is used by a synchronized terminal device and includes one or more resource pools serving as radio resources available for device-to-device communication; and
control device-to-device communication by a terminal device in a manner that the terminal device omits synchronization based on synchronization information transmitted in at least one resource pool included in the resource pool group.

(152)
A device comprising:
circuitry configured to
acquire information indicating an application of device-to-device communication that is performed in each of one or more resource pools serving as radio resources available for device-to-device communication; and
notify a terminal device of the application.

(153)
The device according to (152), wherein the application includes an urgent application and a non-urgent application, an application for public safety and an application other than one for public safety, or an out-of-coverage application and an in-coverage application.

(154)
The device according to (152) or (153),
wherein the device is a base station, a base station device for the base station, or a module for the base station device, and
wherein the circuitry is further configured to notify the terminal device of the application by reporting system information indicating the application.

(155)
The device according to any one of (152) to (154),
wherein the device is a terminal device or a module for the terminal device, and
wherein the circuitry is further configured to notify a terminal device of the application in the resource pool serving as a radio resource available for device-to-device communication.

(156)
A device comprising:
circuitry configured to
acquire information indicating an application of device-to-device communication that is performed in each of one or more resource pools serving as radio resources available for device-to-device communication; and
control device-to-device communication by a terminal device in a manner that the terminal device performs device-to-device communication in a desired application in a resource pool in which device-to-device communication is performed in the desired application among the one or more resource pools.

(157)
A device comprising:
circuitry configured to
acquire information indicating a desired application of device-to-device communication of a terminal device; and
notify the terminal device of one or more resource pools in which device-to-device communication is performed in the desired application and which are one or more resource pools serving as radio resources available for device-to-device communication.

(158)
The device according to (157), wherein the circuitry is further configured to select one or more resource pools that allow device-to-device communication in the desired application as the one or more resource pools in which device-to-device communication is performed in the desired application.

(159)
The device according to (158), wherein the one or more resource pools appropriate for device-to-device communication in the desired application are one or more resource pools having a period that allow device-to-device communication in the desired application or the number of resource pools that allow device-to-device communication in the desired application.

(160)
The device according to any one of (157) to (159),
wherein the circuitry is further configured to
acquire information indicating a desired application of device-to-device communication of a separate terminal device, and
notify the separate terminal device of one or more resource pools in which device-to-device communication is performed in the desired application.

(161)
The device according to any one of (157) to (160), wherein the circuitry is further configured to notify the terminal device of one or more resource pools in which device-to-device communication is performed in the desired application and an application of device-to-device communication performed in the one or more resource pools.

(162)
A device comprising:
circuitry configured to
acquire information indicating a desired application of device-to-device communication of a terminal device;
notify a base station or another terminal device of the desired application; and
control device-to-device communication in the desired application by the terminal device in at least one resource pool among one or more resource pools of which the base station or the other terminal device notifies the terminal device,
wherein the one or more resource pools are radio resources available for device-to-device communication and are resource pools in which device-to-device communication is performed in the desired application.

(163)
A device comprising:
circuitry configured to
acquire information indicating the number of terminal devices configured to perform device-to-device communication;
select a resource pool serving as a radio resource available for device-to-device communication based on the number of terminal devices configured to perform device-to-device communication; and
notify the terminal device of the resource pool.

(164)
The device according to (163), wherein the circuitry is further configured to select a greater number of resource pools when the number is greater than when the number is smaller, and
select a smaller number of resource pools when the number is smaller than when the number is greater.

(165)
The device according to (163) or (164), wherein the circuitry is further configured to select a resource pool having a shorter period when the number is greater than when the number is smaller, and select a resource pool having a longer period when the number is smaller than when the number is greater.

(166)

The device according to any one of (163) to (165), wherein the circuitry is further configured to acquire information indicating the number of terminal devices configured to perform device-to-device communication in a first application and information indicating the number of terminal devices configured to perform device-to-device communication in a second application, and wherein the circuitry is further configured to select a resource pool in which device-to-device communication is performed in the first application on the basis of the number of terminal devices configured to perform device-to-device communication in the first application and selects a resource pool in which device-to-device communication is performed in the second application on the basis of the number of terminal devices configured to perform device-to-device communication in the second application.

(167)

The device according to any one of (163) to (166), wherein the device is a base station, a base station device for the base station, or a module for the base station device, and wherein the number of terminal devices configured to perform device-to-device communication is the number of terminal devices including a terminal device in a connection mode that is connected to the base station and a terminal device in an idle mode that is not connected to the base station, and is calculated based on information provided to the base station by the terminal device in the connection mode.

(168)

A device comprising:

circuitry configured to acquire information indicating a transmission resource pool serving as a radio resource available for transmission in device-to-device communication and a retransmission resource pool serving as a radio resource available for retransmission in device-to-device communication; and notify a terminal device of the transmission resource pool and the retransmission resource pool.

(169)

The device according to (168), wherein the circuitry is further configured to acquire information indicating the transmission resource pool and information indicating two or more retransmission resource pools serving as radio resources available for retransmission in device-to-device communication, and notify the terminal device of the transmission resource pool and the two or more retransmission resource pools, wherein the two or more retransmission resource pools include a first retransmission resource pool serving as a radio resource available for first-time retransmission and a second retransmission resource pool serving as a radio resource available for second-time retransmission.

(170)

The device according to (168) or (169), wherein the device is a base station, a base station device for the base station, or a module for the base station device, and wherein the circuitry is further configured to notify the terminal device of the transmission resource pool and the retransmission resource pool by reporting system information indicating the transmission resource pool and the retransmission resource pool.

(171)

The device according to any one of (168) to (170)

wherein the device is a terminal device or a module for the terminal device, and wherein the circuitry is further configured to notify a terminal device of the transmission resource pool and the retransmission resource pool in a resource pool serving as a radio resource available for device-to-device communication.

(172)

A device comprising:

circuitry configured to acquire information indicating a transmission resource pool serving as a radio resource available for transmission in device-to-device communication and a retransmission resource pool serving as a radio resource available for retransmission in device-to-device communication; and control device-to-device communication of a terminal device in a manner that the terminal device performs transmission in the transmission resource pool in device-to-device communication and the terminal device performs retransmission in the retransmission resource pool in device-to-device communication.

(173)

A device comprising:

circuitry configured to acquire information indicating an audio resource pool serving as a radio resource available for transmitting audio data in device-to-device communication and another resource pool serving as a radio resource available for transmitting another data in device-to-device communication; and notify a terminal device of the audio resource pool and the another resource pool.

(174)

The device according to (173), wherein the device is a base station, a base station device for the base station, or a module for the base station device, and wherein the circuitry is further configured to notify the terminal device of the audio resource pool and the another resource pool by reporting system information indicating the audio resource pool and the another resource pool.

(175)

The device according to (173) or (175), wherein the device is a terminal device or a module for the terminal device, and wherein the circuitry is further configured to notify a terminal device of the audio resource pool and the another resource pool in a resource pool serving as a radio resource available for device-to-device communication.

(176)

A device comprising:

circuitry configured to acquire information indicating an audio resource pool serving as a radio resource available for transmitting audio data in device-to-device communication and another resource pool serving as a radio resource available for transmitting another data in device-to-device communication; and control device-to-device communication of a terminal device in a manner that the terminal device transmits audio data in the audio resource pool in device-to-device communication and the terminal device transmits another data in the another resource pool in device-to-device communication.

REFERENCE SIGNS LIST 1 communication system
100 base station
101 cell
150 processing unit
151 information acquisition unit
153 control unit
200 terminal device
241 information acquisition unit
243 control unit
300 terminal device
341 information acquisition unit
343 control unit

The invention claimed is:

1. A device comprising:
circuitry configured to
acquire information indicating a resource pool group that is used by a synchronized terminal device and includes one or more resource pools serving as radio resources available for device-to-device communication, and
perform device-to-device communications in a resource pool in the resource pool group, wherein
the one or more resource pools are resource pools that are selected from among a resource pool set including multiple resource pools, which are determined in advance as candidates for radio resources available for device-to-device communications, and
the multiple resource pools include an in-coverage resource pool serving as a radio resource available for device-to-device communication within a network coverage area and an out-of-coverage resource pool serving as a radio resource available for device-to-device communication outside of the network coverage area, a usage of the in-coverage resource pool and the out-of-coverage resource pool being based on terminal device reception power.

2. The device according to claim 1, wherein the synchronized terminal device includes a terminal device that is synchronized based on a synchronization signal transmitted by one transmission source.

3. The device according to claim 2, wherein the synchronized terminal device further includes a terminal device that is synchronized based on a synchronization signal transmitted by another transmission source synchronized with the one transmission source.

4. The device according to claim 3, wherein the another transmission source includes a transmission source configured to relay the synchronization signal transmitted by the one transmission source.

5. The device according to claim 1, wherein the resource pool group includes two or more resource pools serving as radio resources available for device-to-device communication.

6. The device according to claim 1,
wherein the device is a terminal device of the resource pool group, and
wherein the circuitry acquires from a base station system information indicating the resource pool group.

7. The device according to claim 1,
wherein the device is another terminal device or a module for the another terminal device.

8. A terminal device comprising:
circuitry configured to
acquire information indicating a resource pool group that is used by a synchronized terminal device and includes one or more resource pools serving as radio resources available for device-to-device communication, and
perform device-to-device communication in a manner that the terminal device omits synchronization based on a synchronization signal transmitted in at least one resource pool included in the resource pool group,
wherein
the one or more resource pools are resource pools that are selected from among a resource pool set including multiple resource pools, which are determined in advance as candidates for radio resources available for device-to-device communications, and
the multiple resource pools include an in-coverage resource pool serving as a radio resource available for device-to-device communication within a network coverage area and an out-of-coverage resource pool serving as a radio resource available for device-to-device communication outside of the network coverage area, a usage of the in-coverage resource pool and the out-of-coverage resource pool being based on reception power at the terminal device.

9. A method comprising:
acquiring, with circuitry, information indicating a. resource pool group that is used by a synchronized terminal device and includes one or more resource pools serving as radio resources available for device-to-device communication; and
performing device-to-device communications in a resource pool in the resource pool group, wherein
the one or more resource pools are resource pools that are selected from among a resource pool set including multiple resource pools, which are determined in advance as candidates for radio resources available for device-to-device communications, and
the multiple resource pools include an in-coverage resource pool serving as a radio resource available for device-to-device communication within a network coverage area and an out-of-coverage resource pool serving as a radio resource available for device-to-device communication outside of the network coverage area, a usage of the in-coverage resource pool and the out-of-coverage resource pool being based on terminal device reception power.

10. The method according to claim 9, wherein the synchronized terminal device includes a terminal device that is synchronized based on a synchronization signal transmitted by one transmission source.

11. The method according to claim 10, wherein the synchronized terminal device further includes a terminal device that is synchronized based on a synchronization signal transmitted by another transmission source synchronized with the one transmission source.

12. The method according to claim 11, wherein the another transmission source includes a transmission source configured to relay the synchronization signal transmitted by the one transmission source.

13. The method according to claim 9, wherein the resource pool group includes two or more resource pools serving as radio resources available for device-to-device communication.

14. The method according to claim 9,
wherein the circuitry is included in a terminal device of the resource pool group, and
the method further comprises acquiring from a base station system information indicating the resource pool group.

15. The method according to claim 9,
wherein the circuitry is included in a terminal device or a module of the terminal device.

16. A non-transitory computer-readable medium encoded with computer-readable instructions, the computer readable instructions, when executed by processing circuitry, cause the processing circuitry to perform a method comprising:
acquiring information indicating a resource pool group that is used by a synchronized terminal device and includes one or more resource pools serving as radio resources available for device-to-device communication; and
performing device-to-device communications in a resource pool in the resource pool group, wherein
the one or more resource pools are resource pools that are selected from among a resource pool set including multiple resource pools, which are determined in advance as candidates for radio resources available for device-to-device communications, and
the multiple resource pools include an in-coverage resource pool serving as a radio resource available for device-to-device communication within a network coverage area and an out-of-coverage resource pool serving as a radio resource available for device-to-device communication outside of the network coverage area, a usage of the in-coverage resource pool and the out-of-coverage resource pool being based on terminal device reception power.

17. The non-transitory computer-readable medium according to claim 16, wherein the synchronized terminal device includes a terminal device that is synchronized based on a synchronization signal transmitted by one transmission source.

18. The non-transitory computer-readable medium according to claim 16, wherein the resource pool group includes two or more resource pools serving as radio resources available for device-to-device communication.

19. The non-transitory computer-readable medium according to claim 16, further comprising notifying another terminal device of the system information indicating the resource pool group.

20. The non-transitory computer-readable medium according to claim 16, further comprising being notified by a base station of the resource pool group in at least one resource pool included in the resource pool group.

* * * * *